(12) United States Patent
Bridges

(10) Patent No.: US 12,550,108 B2
(45) Date of Patent: Feb. 10, 2026

(54) EFFICIENT GEOSPATIAL SEARCH COVERAGE TRACKING FOR DETECTION OF DANGEROUS, VALUABLE, AND/OR OTHER OBJECTS DISPERSED IN A GEOSPATIAL AREA

(71) Applicant: Teralcyon Inc., Lewes, DE (US)

(72) Inventor: William Bridges, Ashland, OR (US)

(73) Assignee: Teralcyon Inc.

( * ) Notice: Subject to any disclaimer, the term of this patent is extended or adjusted under 35 U.S.C. 154(b) by 318 days.

(21) Appl. No.: 18/219,660

(22) Filed: Jul. 8, 2023

(65) Prior Publication Data

US 2024/0015690 A1 Jan. 11, 2024

Related U.S. Application Data

(60) Provisional application No. 63/359,611, filed on Jul. 8, 2022.

(51) Int. Cl.
*H04W 64/00* (2009.01)
*H04L 5/00* (2006.01)

(52) U.S. Cl.
CPC ......... *H04W 64/003* (2013.01); *H04L 5/0048* (2013.01)

(58) Field of Classification Search
None
See application file for complete search history.

(56) References Cited

U.S. PATENT DOCUMENTS

2018/0188045 A1* 7/2018 Wheeler ................ G06V 10/98
2021/0343142 A1* 11/2021 Lewis ..................... G01S 19/01

FOREIGN PATENT DOCUMENTS

CN 113628243 A * 11/2021 ............ G06T 7/246
WO WO-2021046005 A1 * 3/2021 ............ G08G 5/55

* cited by examiner

*Primary Examiner* — Adolf Dsouza
(74) *Attorney, Agent, or Firm* — Peter Jensen-Haxel

(57) ABSTRACT

A method includes receiving a geospatial coordinate associated with a location of a first geolocation unit. The method overlays in real time the geospatial coordinate on an area map within a graphical user interface of a coordination device. The method may also communicatively couple the coordination device with a second geolocation unit and read a radius parameter to render a first radius around the geospatial coordinate of the first geolocation unit and the second radius around the geospatial coordinate of the second geolocation unit on the area map within the graphical user interface to provide the instant feedback to the operator of the coordination device as to overlapping coverage.

20 Claims, 22 Drawing Sheets

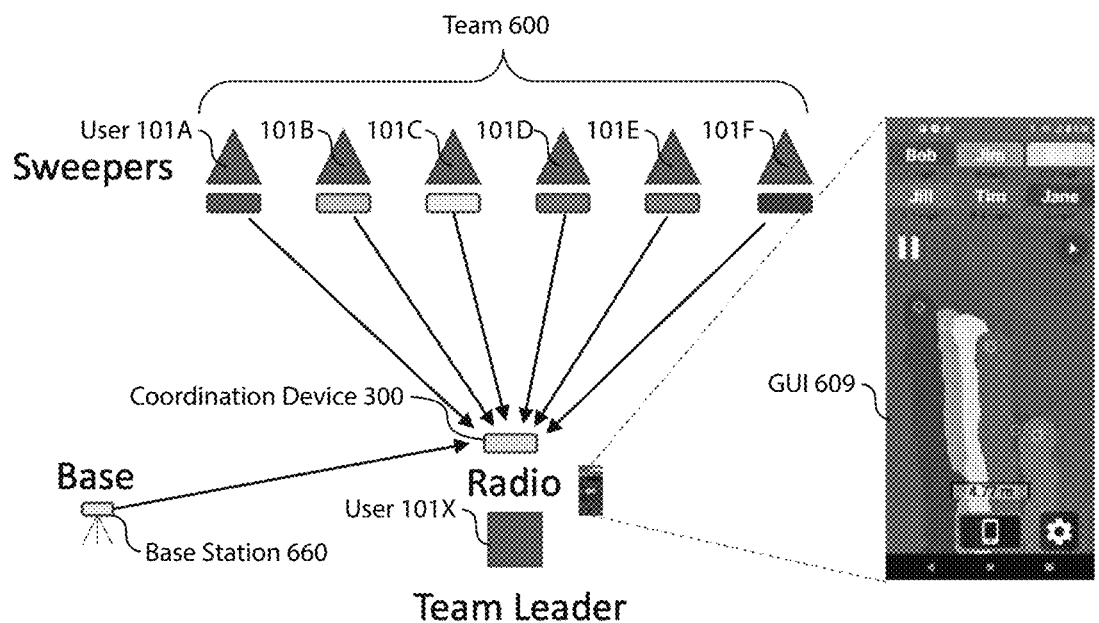
Fig. 6B

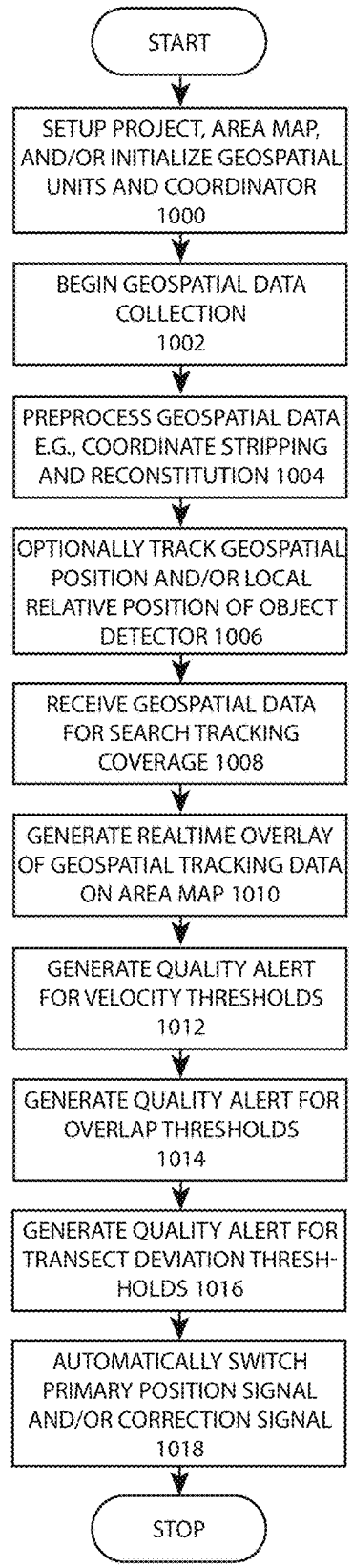
*Fig. 10*    Geospatial Project Tracking Process Flow 1050

Realtime Overlay
Process Flow 1150

Realtime Gap Detection Process Flow 1250

Velocity Warning
Process Flow 1350

*Fig. 14*  Automatic Signal Switching Process Flow 1450

*Fig. 15*  Deviation Warning Process Flow 1550

Coordinate Attenuation Process Flow 1650

Detector Position
Process Flow 1750

EFFICIENT GEOSPATIAL SEARCH COVERAGE TRACKING FOR DETECTION OF DANGEROUS, VALUABLE, AND/OR OTHER OBJECTS DISPERSED IN A GEOSPATIAL AREA

CLAIM FOR PRIORITY

This patent application claims priority from, and hereby incorporates by reference: U.S. provisional patent application No. 63/359,611, titled 'SYSTEM, METHOD, AND/OR DEVICE FOR TRACKING HAZARDS SUCH AS UNEXPLODED ORDINANCE IN A GEOSPATIAL ENVIRONMENT', filed Jul. 8, 2022.

FIELD OF TECHNOLOGY

This disclosure relates generally to object detection, geospatial data, and data processing devices and, more particularly, to a method, a device, and/or a system of efficient geospatial search coverage tracking for detection of dangerous, valuable, and/or other objects dispersed in a geospatial area.

BACKGROUND

A person, company, organization, and/or government may need to search for objects and/or carry out inspections in a geospatial area. For example, geospatial searches or assessments may occur in environmental surveys, environmental remediations, forensic evidence gathering, search and rescue, search and recovery (e.g., downed aircraft, meteorites), treasure hunting, equipment or facility inspection, and other searches.

It can be difficult to track search coverage within a geospatial area, especially when the area is large, includes complex terrain or obstacles, has complex search requirements (e.g., best industry practices, regulatory rules) and/or multiple cooperating (or competing) teams or persons are searching for objects. Global positioning systems (GPS) and other systems of determining local location or geo-position have assisted in tracking search. However, depending on the objects or other points of interest searched for and/or inspected can be inefficient to collect and analyze. It can also be difficult to determine if the process of the search and the collection of geospatial data supporting that process was performed correctly so it can be quality assured or audited.

Some of the more important searches within geospatial areas are those conducted to find and remove dangerous objects, especially unexploded ordinance (UXO) and landmines. Geospatial areas with UXO, for example, include former bombing ranges, training facilities, and current and former warzones. Because of the importance of this work, this type of search may require reliable data for primary analysis, quality control, and/or quality assurance. Factors in data gather and analysis can include, for example, the capability of detection equipment (e.g., magnetometers) and other detailed specifications set forth by relevant agencies (e.g., the U.S. Army Corp of Engineers).

There is a continuing need for new and improved devices, systems, and methods to better track coverage of searches of geospatial areas for object and/or conditions, including more accurate and reliable and/or auditable data gathering. Within the application of UXO remediation and demining, better devices, systems, and methods for search tracking coverage can lower the cost of searches because errors do not have to be re-worked, lowering the cost so contractors gain a competitive advantage of government contracts and ultimately save lives when dangerous objects can be properly discovered and removed.

SUMMARY

Disclosed are a method, a device, and/or a system of efficient geospatial search coverage tracking for detection of dangerous, valuable, and/or other objects dispersed in a geospatial area.

In one embodiment, a method for tracking search coverage of a geospatial area includes communicatively coupling a coordination device to a first geolocation unit through a communication link. The coordination device includes a display of the coordination device, a graphical user interface, and a memory storing an area map of the geospatial area. The first geolocation unit includes a first signal receiver for determining a geospatial coordinate associated with a location of the first geolocation unit within the geospatial area. The method initiates a geospatial database that includes a geospatial coordinate attribute, a geolocation unit ID attribute, and a timestamp attribute, and receives the geospatial coordinate associated with the location of the first geolocation unit and a timestamp associated with generation of the geospatial coordinate associated with the location of the first geolocation unit. The method records the geospatial coordinate of the first geolocation unit in the geospatial database along with a geolocation unit ID and a first timestamp, and overlays in real time the geospatial coordinate of the first geolocation unit on the area map within the graphical user interface. Instant feedback is therefore provided to an operator of the coordination device as to the location of the first geolocation unit within the geospatial area.

The method may also communicatively couple the coordination device with a second geolocation unit, read a radius parameter, and calculate a first radius around the geospatial coordinate of the first geolocation unit and a second radius around the geospatial coordinate of the second geolocation unit. The method may render the first radius around the geospatial coordinate of the first geolocation unit and the second radius around the geospatial coordinate of the second geolocation unit on the area map within the graphical user interface to provide the instant feedback to the operator of the coordination device as to overlapping coverage of the first geolocation unit with the second geolocation unit within the geospatial area.

The method may determine that the first radius around the geospatial coordinate of the first geolocation unit and the second radius around the geospatial coordinate of the second geolocation unit overlap through (i) an adjacency designation, (ii) adjacent travel within the area over a threshold distance of adjacent travel, and/or (iii) adjacent positioning within the area for a threshold time. A non-overlap in the first radius of the geospatial coordinate of the first geolocation unit and the second radius of the geospatial coordinate may be determined for a different threshold distance and/or a threshold area. The method may then generate a coverage alert on the graphical user interface of the coordination device and optionally designate a portion of the area map as uncovered on the graphical user interface of the coordination device.

The method may record two or more geospatial coordinates of the first geolocation unit in the geospatial database along with the geolocation unit ID and a second timestamp, and determine an elapse time between a first geospatial coordinate of the two or more geospatial coordinates and a second geospatial coordinate of the two or more geospatial coordinates. A distance between the first geospatial coordinate and the second geospatial coordinate may be calculated and an instantaneous velocity of the first geolocation unit determined.

The method may determine an average velocity of the first geolocation unit over the first geospatial coordinate of the two or more geospatial coordinates and the second geospatial coordinate of the two or more geospatial coordinates, and determine the average velocity exceeds a velocity parameter. A quality alert may be generated on the graphical user interface of the coordination device and optionally a different portion of the area map may be designated as inadequately covered on the graphical user interface.

The first signal receiver may be a GPS received. The first geolocation unit may be coupled to a detector, and the detector may be a magnetometer, a ground penetrating radar, an infrared sensor, an optical sensor, and/or a LIDAR sensor.

The method may also communicatively couple a support device with the first geolocation unit and/or the coordination device, and associate a device ID of the first geolocation unit with a device ID of the support device. A location of interest data may be received from the support device including a third geospatial coordinate and optionally a text description generated by an operator of the support device and/or a photo data generated by the operator of the support device.

An accuracy of the first geospatial coordinate and the second geospatial coordinate may be within 3 centimeters. The first geolocation unit may include a fastener for mounting to a human operator. The fastener may be utilized for mounting to the human operator permits fastening to the back of the human operator, a vest of the human operator, a head of the human operator, and/or an extremity of the human operator. The first geolocation unit may further include a fastener for mounting to the detector. The two or more geospatial coordinates may be stored in a velocity array receiving and removing data as first-in-last-out and the average velocity is calculated as a rolling average of each of the two or more geospatial coordinates stored in the velocity array. The first geospatial coordinate of the two or more geospatial coordinates may be an initial coordinate in the velocity array and the second geospatial coordinate of the two or more geospatial coordinates is a final coordinate in the velocity array. The communication link may be a satellite communication link.

The method may also communicatively couple a reference device to the first geolocation unit, generate a correction data, and transmit the correction data to the first geolocation unit. The geospatial coordinate associated with the location of the first geolocation unit within the geospatial area may be adjusted with the correction data.

The method may determine the first geospatial coordinate is greater than a threshold distance from a fourth geospatial coordinate of a transect vector data closest to the first geospatial coordinate and generate a deviation alert. The deviation alert may include a low audible tone on a speaker for deviation on a first side of a transect vector and a high audible tone on the speaker for deviation on a first side of the transect vector. A loss of signal may be determined between any two of the first geolocation unit, the coordination device, the support device, and/or the reference device. A signal alert may be generated, and it may be determined that a precision value associated with the first geospatial coordinate is below a threshold precision value. A precision alert may also be generated, where the geospatial database further including a precision field.

The method may include generating a path data from a set of geospatial coordinates generated by the first geolocation unit and plotting the path data on a digital image as a first image overlay, generating a path data from a set of geospatial coordinates generated by the second geolocation unit on the digital image as a second image overlay, and determining the non-overlap based on one or more uncovered pixels in the first image overlay and the second image overlay to decrease computational load associated with geospatial data.

The method may strip one or more leading digits in the third geospatial coordinate to reduce a data transmission size of the third geospatial coordinate generated by the first geolocation unit to an attenuated geospatial coordinate of the third geospatial coordinate, and compare the third geospatial coordinate a reference coordinate of the geospatial area. The method may then reconstitute the leading digits in the third geospatial coordinate and storing the third geospatial coordinate in the geospatial database, strip one or more leading digits in a fourth geospatial coordinate to an attenuated geospatial coordinate of the fourth geospatial coordinate, and determine a nonsequential jump in a leading digit of the attenuated geospatial coordinate of the third geospatial coordinate of the third geospatial coordinate compared to a leading digit of the attenuated geospatial coordinate of the third geospatial coordinate of the third geospatial coordinate compared to within a different threshold time and/or a threshold index number. The leading digits in the fourth geospatial coordinate may be reconstituted and the fourth geospatial coordinate stored in the geospatial database. The support device may include a display of the support device and a graphical user interface of the support device, and the support device may be a smartphone, a tablet, a laptop computer, and/or a wearable device.

In another embodiment, a device for tracking search coverage of a geospatial area includes a housing, a first signal receiver, a first wireless network interface controller, a processor communicatively coupled to the first wireless network interface controller, and a memory communicatively coupled to the processor. The first signal receiver is for determining a geospatial coordinate associated with a location of the device within the geospatial area. The processor is communicatively coupled to the first wireless network interface controller. The memory is communicatively coupled to the processor, the memory storing computer readable instructions that when executed: receive the geospatial coordinate from the first signal receiver, generate a timestamp and a device ID, retransmit the geospatial coordinate, the timestamp, and the device ID through the first wireless network interface controller, and a power source electrically coupled to the first signal receiver, the first wireless network interface controller, the processor, and the memory.

In yet another embodiment, a system for tracking search coverage of a geospatial area includes a first geolocation unit and a coordination device communicatively coupled to the first geolocation unit. The first geolocation unit includes a housing of the first geolocation unit, a first signal receiver of the first geolocation unit for determining a geospatial coordinate associated with a location of the first geolocation unit within the geospatial area, a wireless network interface controller of the first geolocation unit, and a processor of the first geolocation unit. The processor of the first geolocation unit is configured to transmit the geospatial coordinate, a timestamp, and a device ID.

The coordination device is communicatively coupled to the first geolocation unit through the wireless network interface controller of the first geolocation unit and is configured to receive the geospatial coordinate, the timestamp, and the device ID. The tracking coordination device includes a housing of the coordination device, a wireless network interface controller of the coordination device, a display of the coordination device, a graphical user interface, a processor of the coordination device, and a memory of the coordination device. The memory of the coordination device includes the graphical user interface, an area map of the geospatial area, and a geospatial database that includes a geospatial coordinate attribute, a geolocation unit ID attribute, and a timestamp attribute.

The memory of the coordination device also includes a coordinate intake module, a coordinate recording module, and a coverage plotting routine. The coordinate intake module includes computer readable instructions that when executed receive the geospatial coordinate associated with the location of the first geolocation unit and a different timestamp associated with generation of the geospatial coordinate associated with the location of the first geolocation unit.

The coordinate recording module includes computer readable instructions that when executed record the geospatial coordinate of the first geolocation unit in the geospatial database along with a geolocation unit ID and a first timestamp. The coverage plotting routine includes computer readable instructions that when executed overlay in real time the geospatial coordinate of the first geolocation unit on the area map within the graphical user interface to provide instant feedback to an operator of the coordination device as to the location of the first geolocation unit within the geospatial area.

BRIEF DESCRIPTION OF THE DRAWINGS

The embodiments of this disclosure are illustrated by way of example and not limitation in the figures of the accompanying drawings, in which like references indicate similar elements and in which:

FIG. 6B illustrates an example embodiment in which an implementation of the geospatial tracking system was utilized to track UXO search coverage for a team of human operators with backpack-mounted geolocation units and handheld magnetometers, according to one or more embodiments.

FIG. 10 illustrates a geospatial project tracking process flow that can be utilized to set up a project for coverage tracking, configure project site networks for optimal data quality, collect geospatial data, generate real time overlays and data quality alerts for quality control or supervisory personnel, and/or dynamically switch signal sources to maintain efficiency, according to one or more embodiments.

Other features of the present embodiments will be apparent from the accompanying drawings and from the detailed description that follows.

DETAILED DESCRIPTION

Disclosed are a method, a device, and/or system of efficient geospatial search coverage tracking for detection of dangerous, valuable, and/or other objects dispersed in a geospatial area. Although the present embodiments have been described with reference to specific example embodiments, it will be evident that various modifications and changes may be made to these embodiments without departing from the broader spirit and scope of the various embodiments.

Figure 1:
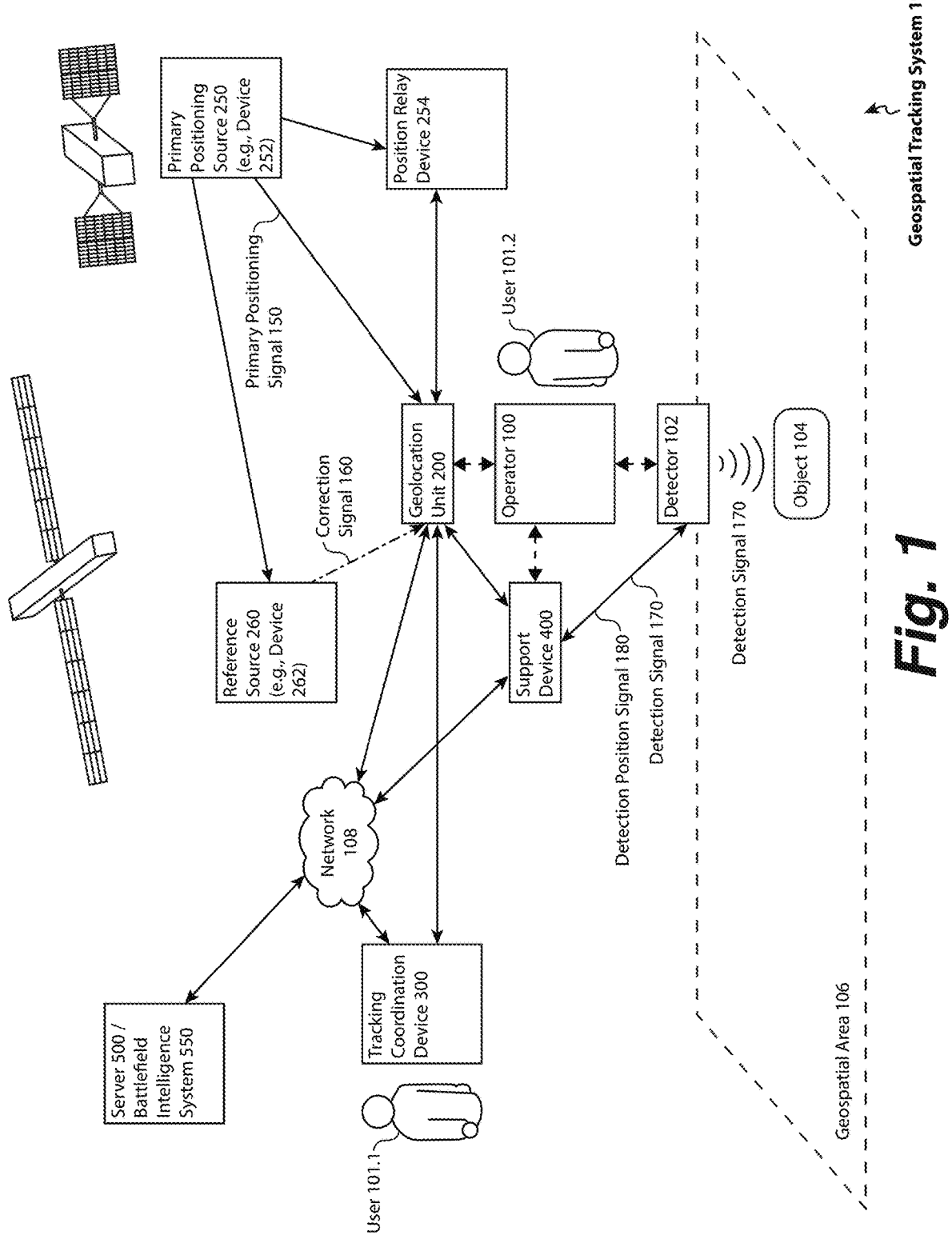
FIG. 1 illustrates a geospatial tracking system in which an operator searching for objects in a geospatial area has its position tracked with a geolocation unit located through a primary position signal and/or a correction signal, geolocation data transmitted to a tracking coordination device that can track search coverage and operation compliance of the operator including in real-time, according to one or more embodiments.

FIG. 1 is a geospatial tracking system 190, according to one or more embodiments. In the embodiment of FIG. 1, an operator 100 may utilize a detector 102 (which may also be referred to as an object detector) to search for one or more objects 104 within a geospatial area 106. Alternatively, or in addition, the detector 102 may be intended to inspect and/or determine a condition of an object 104. The operator 100 may be a person (e.g., the user 101), a vehicle, a remotely controlled vehicle or drone (e.g., an unmanned autonomous vehicle, or UAV), and/or an autonomous vehicle that does not need human remote control for some or all of its operation time. The detector is a detector suitable for detecting the intended object 104. In one or more embodiments, the detector may be a magnetometer for detecting metal instances of the object 104, and the object 104 may be, for example, ancient metal relics or UXO. The geospatial area 106 may be any area, including without limitation a predefined geospatial search area. The geospatial area 106 may have been physically marked (e.g., with flags, ropes, or survey pins), and/or may be defined digitally. The geospatial area 106.

Figure 2:
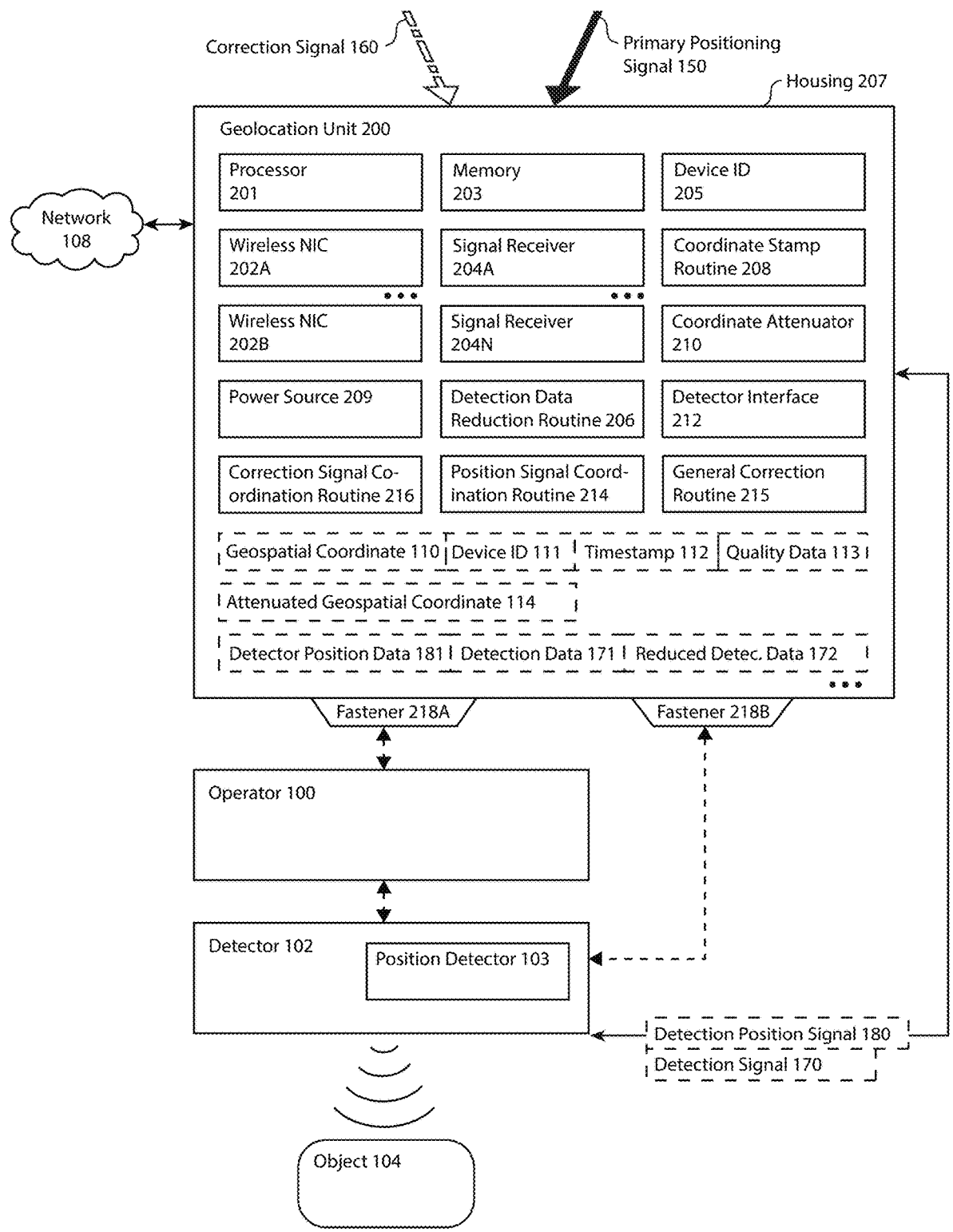
FIG. 2 illustrates an operator system comprising a geolocation unit, an operator (e.g., a user, a robotic user, a manned vehicle, a UAV, etc.), and optionally a detector for detecting an object, according to one or more embodiments.

The operator 100 may include and/or may be associated with a geolocation unit 200 that may generate geolocation data, for example one or more geospatial coordinates 110 and metadata thereof as further shown and described in FIG. 2 and throughout the present embodiments. The geolocation unit 200 may generate the geolocation data based on a primary positioning signal 150 received from a primary positioning source 250 such as a primary positioning device 252. In one or more embodiments, and the embodiment of FIG. 1, the primary positioning signal 150 may be a GPS signal and the primary positioning device 252 may be a GPS satellite.

The geolocation unit 200 may also generate the geolocation data based on a correction signal 160 received from a reference source 260 such as a reference device 262. For example, the correction signal 160 may be received as a radio signal (e.g., emitted from a radio base station), cellular signal (e.g., emitted from a cell phone tower), and/or an L-band radio (e.g., transmitted geostationary satellite), for example as further shown and described in conjunction with FIG. 7A through FIG. 7D.

Geospatial data may be transmitted from the geolocation unit 200 to the tracking coordination device 300. The tracking coordination device 300 may be operated by the user 101.2, and/or may be operating by a different user, the user 101.1. For example, the user 101.1 may be a team leader, project leader, and/or quality assurance person. The user 101.1 may be also shown and described as the user 101X in one or more other embodiments and Figures. The tracking coordination device 300 may be a combination of specialized software running on a smartphone, tablet computer, laptop, or other type of computing device, as further shown and described in FIG. 3. In one or more embodiments, the tracking coordination device 300 may be within or near the geospatial area 106 such that the operator 100 is visible to the user 101.1 utilizing the tracking coordination device 300, for example as shown and described in FIG. 6A.

The tracking coordination device 300 may carry out numerous functions to aid in efficient, accurate, and/or compliant geospatial search, as further described herein. In one or more embodiments, the tracking coordination device 300 may display on a graphical user interface each instance of the operator 100 on a map (e.g., the area map 318 of FIG. 3) of the geospatial area 106, including position and coverage relative to one another. The user interface may be updated in real time to determine if, where, and/or when gaps in search tracking may occur. In one or more embodiments, the tracking coordination device 300 may determine other data quality alerts, for example divergence from transects set up in the geospatial area 106 and/or an operator 100 exceeding velocity constraints, as further shown and described in FIG. 8A and throughout the present embodiments. Although a few examples have been provided in conjunction with FIG. 1, the tracking coordination device 300 may include numerous other functions and advantages to aid in geospatial search and coverage tracking, as further described herein.

Figure 6A:
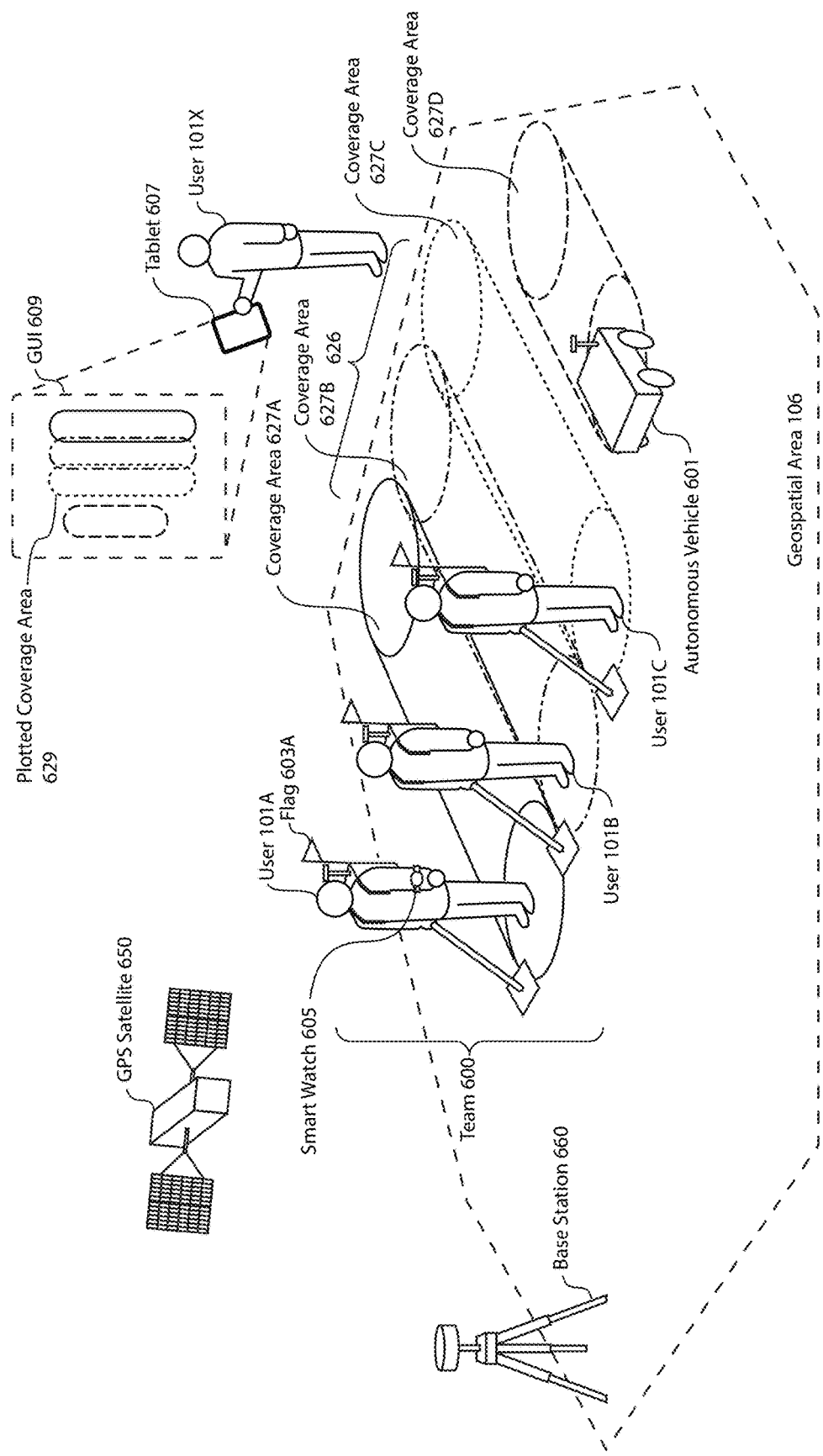
FIG. 6A illustrates an example embodiments in which a team of three human operators, one robotic operator, and a team leader search a geospatial area for UXO utilizing magnetometers and backpack-mounted geolocation units, including enabling real time coverage tracking on a tablet of the team leader and field-consistent visual identifiers, such as equipment coloration, matching visual identifiers on the real time search tracking GUI, such as path rendering color, according to one or more embodiments.

As just one example of implementation, and as further shown and described in conjunction with the embodiment of FIG. 6A and FIG. 6B, the geospatial area 106 may include multiple instances of the operator 100 (e.g., an operator 100A, an operator 100B, etc.), each with a geolocation unit 200 (e.g., a geolocation unit 200A, a geolocation unit 200B, etc.). The tracking coordination device 300 may display each operator 100 relative to the other on the map of the geospatial area 106, including highlighting on the user interface all determined and/or calculated areas of non-overlap in search coverage, sections of transect divergence, and/or areas in which velocity parameters were exceeded.

In one or more embodiments, the operator 100 may also include and/or may be associated with a support device 400. For example, the support device 400 may be a smartphone, tablet, laptop, wearable (e.g., smartwatch) or other computing device. In one or more preferred embodiments, the support device 400 is a small wearable such as a smartwatch to reduces hinderance with operating tools that the operator 100 and/or the user 101.2 may need to utilize (e.g., a metal detector, a Geiger counter, a leak detector, a shovel). The support device 400 may be utilized to provide additional context to geospatial data generated by the geolocation unit 200 and/or change a data collection mode of the geolocation unit 200. For example, in one or more embodiments, the support device 400 may be activated to designate an obstacle, unsearchable area, obstruction, or other specialized point, location, or zone of interest. In one or more other embodiments, the support device 400 may be used to label, tag, classify, or otherwise designate a point of interest or object 104)e/g/. location of interest data 128), including adding any supplemental data (e.g., photos, description).

In one or more embodiments, the detector 102 may produce data related to detection of the object 104, for example the field strength of a detection signal 170. As just one example, the detection signal 170 may be an audible waveform produced by a magnetic field of a magnetometer. The detection signal 170 may be provided to the support device 400 and may be coordinated with geospatial data from the geolocation unit 200, for example to pair, associate, and/or coordinate the detection signal 170 with one or more geospatial coordinates. As further described herein, such pairing may create a rich data set useful in determining likely locations of objects 104, statistical distributions of objects 104, providing quality control and/or quality assurance, and other functions.

In one or more embodiments, a position of the detector 102 may even be determined. In some cases, the geolocation unit 200 may not be able to be easily or practically placed on the detector 102 and/or may move relative to the detector 102. This may be common for metal detectors required to be wielded by human operators, where the geolocation unit 200 may be strapped to the human operator (e.g., the user 101.2 in FIG. 1). In such case, the detector 102 may include one or more sensors to position the detector relative to the geolocation unit 200, for example to provide a "local" position of the detector 102. The signal of the local position is shown as the detection position signal 180 in FIG. 2. The detection position signal 180 may be used to calculate a precision location of the detector 102 based on a known relation to the geolocation unit 200. Tracking of the detector 102 may further increase precision which may be advantageous for important, high risk geospatial searches, including where the object 104 may be small and/or difficult to detect.

In one or more embodiments, behavior of the detector 102 may influence a sampling rate and/or data transmission rate of the detection position signal 180 and/or geospatial data of the geolocation unit 200. For example, an inertial measurement unit (IMU) and/or accelerometer may be used to detect whether the detector 102 is in motion, stopped, accelerating, and/or changing direction. The IMU and/or accelerometer may generate a signal, e.g., an accelerometer signal. A geospatial coordinate 110 may be gathered in any such conditions at various thresholds. This may be useful for maximizing meaningful data collection of hand-wielded tools and/or detectors 102 on robotic arms, as shown and described in FIG. 9B, for example, freeing bandwidth and/or increasing sample rate by reducing transmission of less meaningful and/or redundant data. In one or more embodiments, the detection signal 170 may influence a sampling rate and/or data transmission rate of the detection position signal 180 and/or geospatial data of the geolocation unit 200. For example, and as more particularly described in FIG. 9A and FIG. 9B, detection of a threshold signal strength indicating an object 104 may be present near the detector 102 may generate an increased number of geospatial coordinates 110.

The geolocation unit 200, the detector 102, the support device 400, the tracking coordination device 300, the server 500, and/or the battlefield intelligence system 550 may be connected through one or more communication networks, referred to as the network 108. For example, the network 108 may include Bluetooth®, WiFi®, radio communicators, cellular communications, and/or satellite communications (e.g., to low earth orbit satellites, to geostationary satellites in the Ka band). As just one example, the detector 102 may be connected to the support device 400 through a Bluetooth® link with an approximately low range, the geolocation unit 200 may be connected to the tracking coordination device 300 with a radio capable of transmitting digital data with approximately 200 m range, and the tracking coordination device may be connected to the server 500 through a satellite and/or cellular communication link.

In one or more embodiments, the geospatial tracking system 190 may include a server 500. The server 500 may be used to process, store, and/or transmit geospatial data collected and/or generated by the operator 100, the geolocation unit 200, the support device 400, the detector 102, and/or the tracking coordination device 300. For example, remote personnel or project managers may be able to log in and see data generated created in real time and/or in periodically updated batches, which may assist in monitoring progress and ensuring the project is running efficiently and conforming to specifications. The server 500 may also act as a data backup for the tracking coordination device 300 and/or as a set of secure, auditable data.

In one or more other embodiments, the geospatial tracking system 190 may include a battlefield intelligence system 550, also referred to herein as a BIS 550. The BIS 550 may include a local and/or remote server providing information technology (IT) and support for military intelligence and combat information networks. For example, the user 101.2 may be active duty military personnel sweeping for mines in or around a combat zone. The BIS 550 may be able to securely compile, reconcile, and make available geospatial data from one set of military personnel to another. For instance, a later arriving detachment of specialists may be able to continue work at a finer level of detail or accuracy, with the dataset being transferrable between one set of military personnel (e.g., a minefield breaching and/or sapper team clearing a corridor) or another set of military personnel (e.g., a demining team attempting to remove the entire minefield). In another example, data may be able to be sanitized of sensitive intelligence and provided to humanitarian personnel to designate which areas underwent a thorough search.

FIG. 2 illustrates an operator system 290 comprising a geolocation unit 200, an operator 100, and optionally a detector 102 for detecting an object 104, according to one or more embodiments. The operator 100 may be a mobile living creature, for example a human operator, a trained canine, and/or other trained animal. The operator 100 may be a robotic device, for example a walking, crawling, or tracked conveyance that is remote controlled by human operators and/or autonomous. The operator 100 may be a unmanned autonomous vehicle, for example a drone. The operator 100 may be a vehicle, such as a car, truck, construction vehicle, tracked vehicle, military vehicle, MRAP, APC, and/or tank.

The detector 102 may be any detector suitable for finding the object 104 and/or another point of interest. In one or more embodiments, the detector 102 is a magnetometer, a ground penetrating radar, an infrared sensor, an optical sensor, and/or a LIDAR sensor. The object 104 may be located on or under the ground, especially if UXO, landmines, or relics. In one or more embodiments, the detector 102 is a magnetometer and the object 104 may be UXO, landmines, or other dangerous metal objects. In one or more embodiments, the detector 102 may be a radiological sensor and the object 104 may be radioactive articles or materials. In one or more embodiments, the detector 102 may include a camera processing video with object recognition software, for example AI-based and/or artificial neural network based recognition technologies for determining flora, fauna, hazards, minerals, industrial equipment condition, or other items or objects. In one or more embodiments, the detector 102 may include a gas detector or sniffer and the object 104 may include a chemical, such as a reagent, chemical component of the object 104, an environmental contaminate, etc.

The geolocation unit 200 may be fastened to the operator 100 and/or the detector 102 with one or more fasteners 218. For example, and as shown and described in conjunction with FIG. 6A, the geolocation unit 200 may be attached to a backpack utilizing a mount (e.g., an instance of the fastener 218A), where the backpack can then be worn by a user 101. In one or more other embodiments, the geolocation unit 200 may be placed directly on the detector 102, for example through the fastener 218B. Where the geolocation unit 200 is physically coupled to the operator 100 but it is advantageous to collect geolocation data on an exact location of the detector 102, a detection position signal 180 may be collected and paired with additional geospatial data, as further described below. In one or more embodiments, the fastener 218 may be configured for mounting to a human instance of the operator 100. In one or more embodiments, the fastener 218 may permit fastening to the back of the human operator, the vest of the human operator, the head of the human operator, and/or an extremity of the human operator (e.g., an arm, a leg).

The geolocation unit 200 may include one or more electronic components in a housing 207. In one or more embodiments, the housing 207 may be selected for durability, to be waterproof, hazard resistant (e.g., blast resistant, radiation resistant), dirt resistant, or other favorable characteristics depending on the geospatial area 106 to be searched and/or objects 104 to be searched for. The geolocation unit 200 may be powered by a power source 209, for example a battery, a solar array, and/or another wired or wireless power source. In one or more or more embodiments, the battery may be chargeable within the housing 207.

In one or more embodiments, the power source 209 may be electrically coupled to each of the one or more components of the geolocation unit 200, for example one or more instances of the signal receiver 204, one or more instances of the wireless NIC 202, the processor 201, and/or the memory 203, as each are further described below.

The geolocation unit 200 may include a processor 201 (e.g., a microcontroller, a computer processor) and a memory 203 that is a computer readable memory (e.g., RAM, ROM, solid state memory, etc.). In one or more embodiments, the processor 201 may be configured to transmit the geospatial coordinate 110, a timestamp 112, and/or a device ID 205, to the coordination device 300. The geolocation unit 200 may include the device ID 205 that may be hardware and/or software defined for identification of the geolocation unit 200 relative to other geolocation units 200 within the geospatial area 106 or multiple geospatial areas 106. The device ID for the geolocation unit 200 may be also referred to as the geolocation unit ID, which may be stored in a geolocation unit ID attribute in computer readable memory and/or a database. In one or more embodiments, the device ID 205 may be a globally unique identifier (GUID) such that any geolocation unit 200 can be distinguished from any other geolocation unit 200 (and/or other device) on Earth.

The geolocation unit 200 may include one or more wireless network interface controllers (NICs), shown as and also referred to as the wireless NIC 202A through the wireless NIC 202N. At least one instance of the wireless NIC 202 may be communicatively coupled to the wireless network interface controller of the coordination device 300 (e.g., the wireless NIC 302). In one or more embodiments, a wireless NIC 202A may be utilized for communication with the network 108 including but not limited to a connection to the coordination device 300. As used herein, any connection between two or more of the devices, systems, or elements of the geospatial tracking system 190, for example through the network 108 or otherwise, may be referred to as a communication link. There may be one or more communication links between or among various devices, systems, and/or elements at any given time (e.g., a first communication link, a second communication link, etc). The wireless NIC 202A, for example, may be a 900 Mhz radio point to multipoint data radio (e.g., a Digi xBee 900HP). In one or more embodiments, a Wireless NIC 202B may connect to the detector 102 and/or a sensor of the detector 102, may connect to a support device 400, and/or other close-range equipment or devices (e.g., within 10 meters). For example, the wireless NIC 202B may be a Bluetooth® capable controller.

The geolocation unit 200 may include two or more signal receivers 204, shown as the signal receiver 204A through the signal receiver 204N. The signal receiver 204 may be utilized to determine a geospatial coordinate 110 associated with a location of the geolocation unit 200 within the geospatial area 106. In one or more embodiments, the signal receiver 204A may be selected and/or configured for receipt of a primary positioning signal 150 (e.g., a GPS signal, a laser signal, a LIDAR signal, etc.). In one or more embodiments, the signal receiver 204B may be selected and/or configured to receive a correction signal 160 (e.g., a cellular correction signal, an L-band correction signal, etc.). In one or more embodiments, the signal receiver 204 may be a GPS receiver generating a NMEA data string comprising the geospatial coordinate 110.

Figure 14:
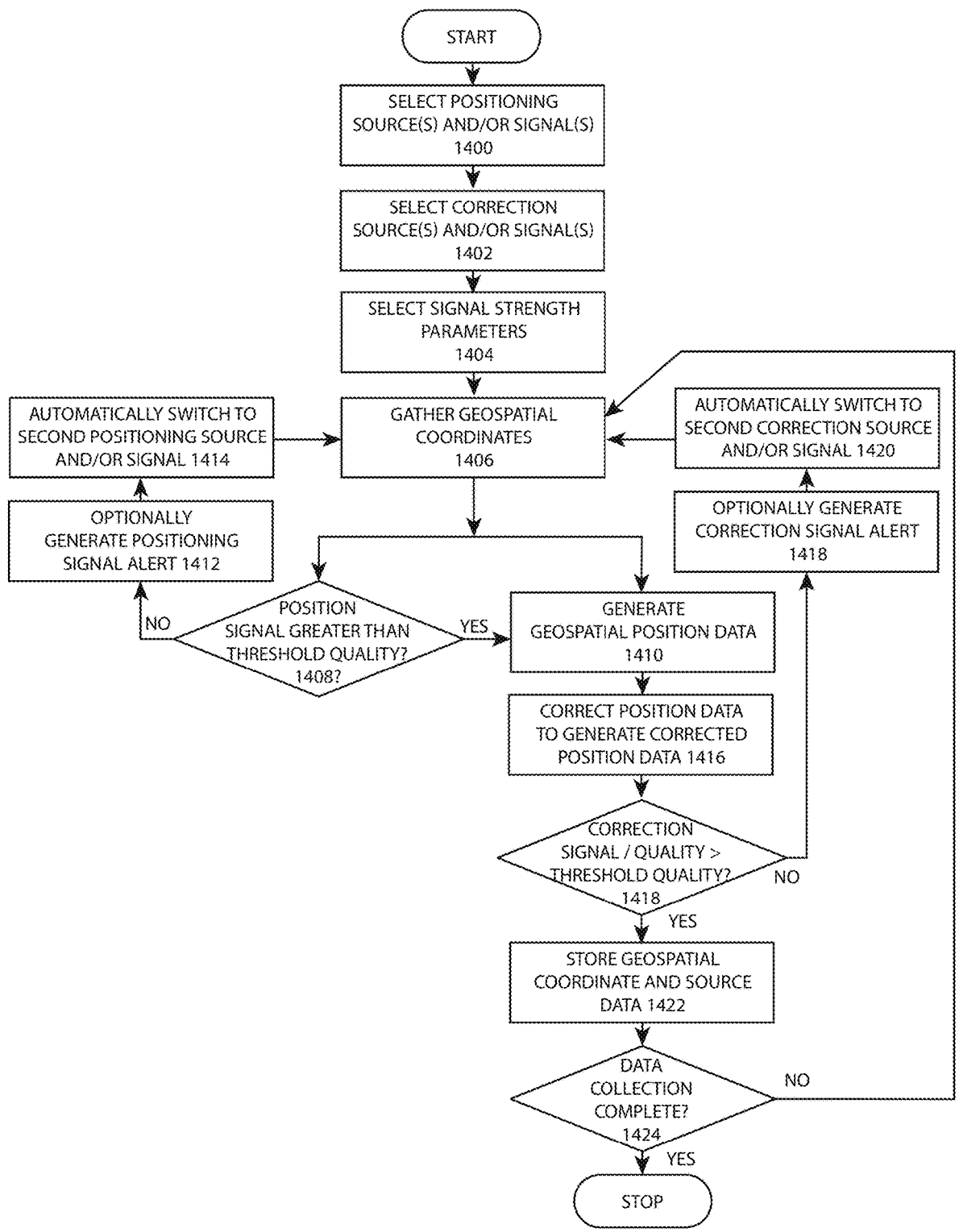
FIG. 14 illustrates an automatic signal switching process flow that may be utilized to switch between primary positioning signals and/or correction signals, according to one or more embodiments.

In one or more embodiments, and as further described in FIG. 14, there may be multiple instances of the signal receiver 204 that may receive the primary positioning signal 150 and/or multiple instances of the signal receiver 204 that may receive the correction signal 160, where sensed and/or dynamic switching may occur to help ensure quality data, precision, and accuracy can be maintained. In one or more embodiments, the correction signal 160 may comprise correction data which may be received on one or more wireless NICs 202.

The geolocation unit 200 may determine a geolocation utilizing the primary position signal 150 and/or the correction signal 160. A geospatial coordinate 110 may be generated, for example in UTM, WGS84, state plane, and/or in a standard NMEA format. The geospatial coordinate 110 may be associated with the device ID 204, for example in the data attribute shown as the device ID 111. The geospatial coordinate 110 may be further associated with a timestamp 112 and/or a quality data 113. The quality data 113 may describe attributes of the geospatial coordinate 110 quality, including for example a precision based on the correction signal 160 and/or an instantaneous velocity. In one or more embodiments, the quality data 113 may include a precision field that may store precision data, for example as may be received by the correction data and/or from the reference source 260.

The geolocation unit 200 may include computer readable instructions that when executed receive the geospatial coordinate 110 from the first signal receiver 204, generate a timestamp 112 and a device ID 111 (e.g., storing the device ID 205), and retransmit the geospatial coordinate 110, the timestamp 112, and/or the device ID 111 through a wireless NIC 202.

The geolocation unit 200 may include a detection data reduction routine 206 that limits the storage of detection data based on contents and/or characteristics of the detection signal 170. The detection data reduction routine 206 may include computer readable instructions that when executed determine a detection event above a threshold detection signal, store the data describing the detection event in a computer readable memory (and optionally associated metadata), and/or discard and/or designate the remaining data for non-transmission.

The geolocation unit 200 may include a coordinate stamp routine 208 that may associate multiple data sources, including without limitation a timestamp 112 and quality data 113 that may include one or more quality value stored in a quality attribute to the geospatial coordinate 110. The quality value may be an instantaneous velocity, a transect deviation value, and/or a precision value of a precision of geospatial data and/or one or more geospatial coordinates 110. The coordinate stamp routine 208 may include computer readable instructions that when executed associates the geospatial coordinate, the timestamp, a precision value, and/or the device ID 111 in a data structure, database, and/or memory (e.g., the memory 203).

The geolocation unit 200 may include a coordinate attenuator 210 that may reduce data in a geospatial coordinate and/or set of geospatial coordinates, for example to conserve memory and/or bandwidth, and/or to increase data transmission speed. In one or more embodiments, the coordinate attenuator 210 may include computer readable instructions that when executed strip one or more leading digits in one or more of the geospatial coordinates 110 to reduce a data transmission size to an attenuated geospatial coordinate 114 of the geospatial coordinate and boost the sampling rate and/or resolution over one or more communication links such as the through the network 108. In one or more embodiments, the coordinate attenuator 210 may reduce at least decimal minutes of the geospatial coordinate 110 to a sixth digit of accuracy. In one or more embodiments, the one or more leading digits may include all digits great than a $1/10°$ latitude value and/or $1/10°$ longitude value. In one or more embodiments, the one or more leading digits may include all digits greater than a 1000 meter northing value and/or easting value.

In just one example, the NMEA string: <$GNGGA, 034259.00,3813.2712855,N,12207.5084988, W,1,12,0.60, 18.681,M,−28.750,M,*4E> may be reduced to: <$GNGGA, 034259.00, 2712855,N,5084988.W,1,12,0.60,18.681,M,−28.750,M,*4E>, where the number of leading digits removed is 4 in latitude and 5 in longitude. Attenuation of coordinates is further shown and described in conjunction with the embodiment of FIG. 16 and throughout the present embodiments.

The geolocation unit 200 may include a position signal coordination routine 214 that may detect signal strength and automatically switch between two or more instances of the primary positioning signal 150, may switch between two or more instances of the correction signal 160, and/or may switch between two or more instances of a communication link (e.g., communicating over the network 108), according to one or more embodiments. In one or more embodiments, the position signal coordination routine 214 may include computer readable instructions that when executed determine a signal strength of a communication link and/or a connectivity of a communication link (e.g., established over a first wireless network interface controller 202A) is below a threshold value and switch to different instance of wireless NIC 202B and/or establish a different communication link. Loss of signal may be due to a weakened signal strength and/or electromagnetic interference. Loss of connectivity may be intermittent signal or electromagnetic interference, especially as may cause issues for data packet transmission. As one example, a first wireless network interface controller 202A might be a 900 Mhz data radio that runs into interference, loss of signal, or loss connectivity under conditions such as interference. Continuing the present example, a second wireless network interface controller 202B may be an LTE cellular modem that provides sufficient signal strength and/or connectivity under similar conditions. Such automatic signal switching as described herein may assist in coverage tracking where the geospatial area 106 is a large area, includes obstructions, and/or other electromagnetic interference signals.

In one or more embodiments, the geolocation unit 200 may include a general correction routine 215 comprising computer readable instructions that when executed adjust the geospatial coordinate 110 associated with the location of the first geolocation unit 200 within the geospatial area 106 with the correction data.

In one or more embodiments, the correction signal coordination routine 216 may include computer readable instructions that when executed determine the correction signal 160 is below a threshold for a signal strength, an intermittent connectivity, and/or a correction precision. The computer readable instructions, when executed, may then switch to a second signal receiver (e.g., a different signal receiver 204 for the correction signal 160) and/or a different correction signal 160. In one or more embodiments, the different second signal receiver may be an L-band receiver, a GPS receiver, and/or a cellular receiver. Where a signal point may be providing the correction signal to multiple geolocation units 200, the coordination device 300 may switch sources.

In one or more embodiments, a detector interface 212 may be configured to receive data from the detector 102. The detection signal 170 may be analog (e.g., an analog waveform from a magnetometer, analog sound from a Geiger counter, etc.) or digital (e.g., a digitized waveform from a magnetometer, an RFID tag from an industrial equipment inspection station, etc.). In one or more embodiments, the detector interface 212 may include an audio jack or other wired connection. In one or more other embodiments, the detector interface 212 may include a wireless NIC (e.g., a wireless NIC 202C) that may communicate with a wireless communication interface in, on, and/or otherwise associated with the detector 102 (not shown in the embodiment of FIG. 2). The detector 102 may generate the detection signal 170.

In one or more embodiments, the detector 102 may include a position detector 103, for example an accelerometer, an IMU, a reflector detected by light, laser, LIDAR, and/or other devices or methods. In one or more embodiments, the location may be measured relative to the operator 100 and/or the geolocation unit 200, and more specifically the signal receiver 204 of the geolocation unit 200. The position detector 103 may be able to provide an exact position of the detector 102, rather than only the geolocation unit 200, which may further increase coverage tracking precision and certainty. The position detector 103 may be calibrated through a variety of methods, for example placing on top of or at a fixed distance from the geolocation unit 200 and "synced". A laser may also me utilized to determine position, where an IMU or accelerometer may continue to track position over periods of time in which the laser is not in visible. The laser may be positioned on the geolocation unit 200, the operator 100, or at any other location having a known relationship to the signal receiver 204. One or more estimated coverage areas and/or volumes may be associated with the location of the detector 102, for example as shown and described in conjunction with FIG. 8A and FIG. 18.

The detector 103 may generate the detection position signal 180. The detection position signal 180 may be a stream of data generated periodically and/or upon certain triggers, for example a change in velocity (e.g., an acceleration). The detector 102 may also generate a detection signal 170 that may be transmitted through the same channel as the detection position signal 180 and/or through a different channel. For example, where the detector 102 is a magnetometer, the detection position signal 180 may be communication from a Bluetooth connection from the detector 102 to the geolocation unit 200, whereas the detection signal 170 may be communicated as an analog waveform over a wired connection to an audio jack (e.g., the detector interface 212). One or more processes of the geolocation unit 200 may coordinate, associate and/or combine incoming data from the detector 102, for example in a data structure, database, and/or the memory 203. As shown in the embodiment of FIG. 2, the detector position data 181 may be stored from the detection position signal 180, and may be associated with detection data 171 (e.g., derived and/or digitized from the detection signal 170). The detector position data 181 and the detection data 171 may be analyzed, reduced, and further coordinated with the geospatial coordinate 110 and any associated data. The position of the detector 102 and detection signal 170, including generation of the reduced detection data 172, is further shown and described in conjunction with the embodiments of FIG. 9A and FIG. 9B.

Figure 3:
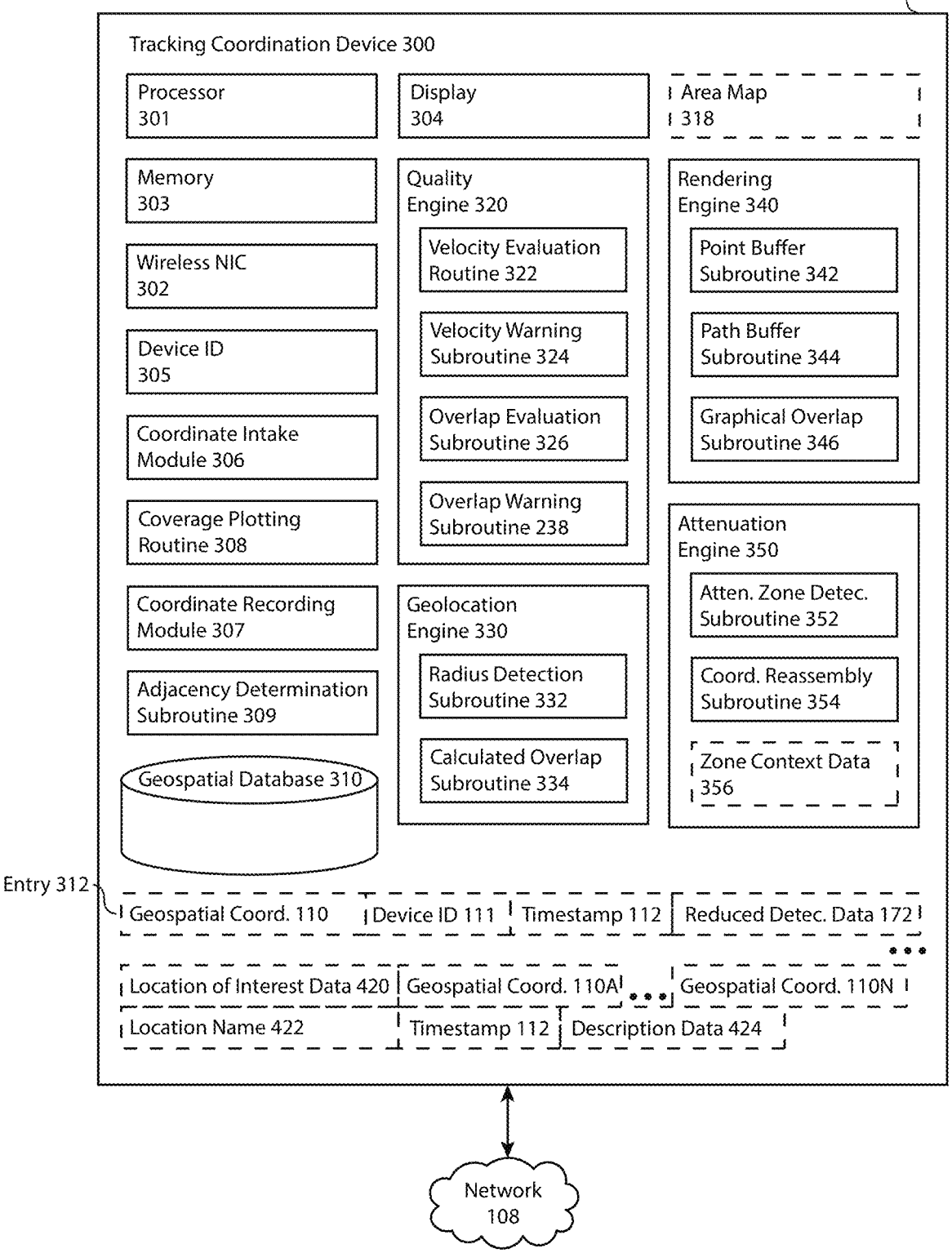
FIG. 3 illustrates a tracking coordination device that may receive and process geospatial data generated by the operator system of FIG. 2, the tracking coordination device including a coverage plotting routine that may plot coverage in real time optionally in conjunction with a rendering engine, a quality engine for detecting data quality lapses, an attenuation engine for managing attenuated data coordinates that may be used to increase data throughput and sampling, and/or other components, according to one or more embodiments.

FIG. 3 illustrates a tracking coordination device 300 (which may also be referred to as the coordination device 300), according to one or more embodiments. The tracking coordination device 300 may include a processor 301 and a memory 303 (e.g., RAM, a hard disk, solid state memory, etc.). The tracking coordination device 300 may include one or more instances of a wireless network interface controller, shown as the wireless NIC 302. The wireless NIC 302 may be utilized for communication with each of one or more instances of the geolocation unit 200, each of one or more instances of the support device 400, and/or for communication each of one or more instances of the server 500 and/or BIS 550. The tracking coordination device 300 may include a display 304, for example an LCD display, a micro LED display, and/or a touchscreen.

The tracking coordination device 300 may include a device ID 305 that may be a unique identifier of the tracking coordination device 300. The device ID 305 may be hardware and/or software defined for identification of the coordination device 300 relative to other geolocation units 200 and/or coordination devices 300 (within or without the geospatial area 106). In one or more embodiments, the device ID 305 may be a globally unique identifier (GUID) such that any coordination device 300 can be distinguished from any other coordination device 300 (and/or other device) on Earth.

The tracking coordination device 300 may include a coordinate intake module 306 configured to receive and process geospatial data from one or more geolocation units 200 and/or other sources of geolocation data. In one or more embodiments, the coordinate intake module 306 may include computer readable instructions that when executed receive the geospatial coordinate 110 associated with a location of a geolocation unit 200 and a timestamp (e.g., the timestamp 112) associated with generation of the geospatial coordinate 110. The tracking coordination device 300 may include a coordinate recording module 307 including computer readable instructions that when executed record the geospatial coordinate 110 of the geolocation unit 200 in a geospatial database 310 along with a geolocation unit ID (e.g., the device ID 205 of the geolocation unit 200) and a timestamp (e.g., the timestamp 112).

The tracking coordination device 300 may include a coverage plotting routine 308 configured to overlay the geospatial data on a graphical user interface that includes a map of the geospatial area 106. The overlay may also be referred to as a graphical overlay. The geospatial data may be overlayed in one or more layers.

In one or more embodiments, the coverage plotting routine 308 includes computer readable instructions that when executed overlay in real time the geospatial coordinates 110 of one or more geolocation units 200 on the area map 318 within the graphical user interface (e.g., as a graphical overlay presented on the display 304) to provide instant feedback to an operator (e.g., the user 101.2) of the coordination device 300 as to the location of the geolocation unit 200 within the geospatial area 106.

The tracking coordination device 300 may include a geospatial database 310, which may store a set of one or more entries 312 recorded for each geolocation unit 200 communicatively coupled with the coordination device 300. The geospatial database 310 may include a geospatial coordinate attribute (e.g., for storing the geospatial coordinate 110), a geolocation unit ID attribute (e.g., the device ID 111), and a timestamp attribute (e.g., for storing the timestamp 112).

For example, a geospatial dataset from just one instance of the geolocation unit 200 may have tens, hundreds, thousands, tens of thousands, or hundreds of thousands of entries 312 in a single 8-hour day. As illustrated, the entry 312 may include the geospatial coordinate 110, the device ID 111 (e.g., storing the device ID 205 of the geolocation unit 200), a timestamp 112, and optionally a detection dataset such as the reduced detection data 172. A set of entries may also include a location of interest data 128. The location of interest data 128 may include a set of one or more geospatial coordinates 110, illustrated in FIG. 3 as the geospatial coordinate 110N (and in FIG. 8A as geospatial coordinate 110B.6 to geospatial coordinate 110B.12), for example that may define a boundary of an obstruction, the extents of a suspected object 104, a location of an anomaly, the location of a working hazard, etc. The location of interest data 128 may also include a location name 422 that may be assigned by the user 101 or automatically, a timestamp 112, and/or a description data 424 that may be assigned by the user 101 or automatically.

The tracking coordination device 300 may include an area map 318. The area map 318 may be data specifying a topographic map, an iconographic map, an aerial photograph, a mosaic of aerial photographs, a satellite photograph, a mosaic of satellite photographs, and/or other maps. In one or more embodiments, the area map 318 may be a set of graphical tiles (e.g., from photographs or satellite images) rendered at different resolutions. The area map 318 may be a two-dimensional (2D) map or a three-dimensional (3D) map. Map data formats may include, for example: .sqlite database, tile package, georeferenced PDF, or another image source. Different area maps 318 may be loaded for different levels of zoom within a graphical user interface.

The tracking coordination device 300 may include an adjacency determination subroutine 309 that may be configured to determine intentional or deliberate adjacency of two or more geolocation units 200. For example, two geolocation units 200 may be deliberately adjacent when walking next to one another and/or when their resulting paths or inferred coverage areas are next to one another.

The adjacency determination subroutine 309 may include computer readable instructions that when executed determine a radius around the geospatial coordinate 110A of a first geolocation unit (e.g., a geolocation unit 200A) and the radius around the geospatial coordinate 110B of a second geolocation unit (e.g., a geolocation unit 200B) overlap. The computer readable instructions when executed may determine the overlap through (i) an adjacency designation, (ii) adjacent travel within the area over a threshold distance (e.g., a threshold distance of adjacent travel), and/or (iii) adjacent positioning within the area for a threshold time. The adjacency designation may be manually selected, for example by a user 101 of the coordination device 300 who may be looking at his team in the field (including any color coding), as further shown and described in conjunction with FIG. 6A. In another example, each operator 100 may be assigned manually to a given transect, either by a team leader and/or by the operator 100. For example, each transect vector 142 may be plotted on the area map 318 as a geospatial data layer and visible on each support device 400 of each user 101, where before beginning to sweep a transect vector 142 the user 101 may be able to select the transect vector 142 he or she will be sweeping. Adjacent travel within the area may be two or more instances of the geolocation unit 200 moving adjacent, parallel, or otherwise in consort for a threshold distance (e.g., and/or having paths 124 running substantially parallel for the threshold distance). Similarly, adjacency may be determined by adjacent positioning of two or more geolocation units 200 within the area for a threshold time (e.g., within 2 meters of each other for 30 seconds; having paths 124 running substantially parallel for a period of time). In one or more other embodiments, linear regressions may be fit to each transect, and then a determination made for a given set of data as to its neighboring datapoints. In one or more other embodiments, other mathematical methods of statistical grouping and/or association may be established.

The tracking coordination device 300 may include a quality engine 320 configured to detect data geospatial data quality degradation, deficiency, and/or data gaps. The quality engine 320 may be able to detect and/or alert regarding data quality, for example a loss in precision of the correction signal 160, loss of connection between one or more devices of the geospatial tracking system 190, etc. However, in one or more embodiments the quality engine 320 may determine and provide alerts for failure to meet specifications for geospatial search coverage, for example velocity of the detector 102 and/or the operator 100, non-overlap of searched or inferred search regions, and/or deviation from one or more transect vector 142 or search lane geofenced boundaries.

The quality engine 320 may include, according to one or more embodiments, a velocity evaluation routine 322 that may be configured to detect a velocity (e.g., of the operator 100, of the geolocation unit 200, and/or the detector 102) and determine the velocity or another motion characteristic (e.g., acceleration, jerk) exceeds a specified value, including as may be specified in a project requirement. The quality engine 320 may also include a velocity warning subroutine 324 that may be configured to alert one or more users or other interested persons and/or systems (e.g., through the coordination device 300, a support device 400, and/or the server 500). In one or more embodiments, the velocity evaluation routine 322 may include computer readable instructions that when executed record two or more geospatial coordinates 110 of the first geolocation unit 200A in the geospatial database (e.g., the geospatial database 310) along with the geolocation unit ID (e.g., the device ID 205). Each of the two or more geospatial coordinates 110 may include a timestamp 112. In one or more embodiments, the velocity evaluation routine 322 may include computer readable instructions that when executed determine an elapse time between a first geospatial coordinate 110A of the two or more geospatial coordinates 110 and a second geospatial coordinate 110B of the two or more geospatial coordinates 110, and then calculate a distance between the first geospatial coordinate 110A and the second geospatial coordinate 110B. In one or more embodiments, the velocity evaluation routine 322 may include computer readable instructions that when executed determine an instantaneous velocity of the geolocation unit 200 and/or determine an average velocity of the geolocation unit 200 over the geospatial coordinate 110A of the two or more geospatial coordinates 110 and the second geospatial coordinate 110B of the two or more geospatial coordinates. As just one example, NMEA GGA data entries 312 each having a geospatial coordinate 110 may have been collected over a period of 5 seconds, where the distance between the first geospatial coordinate 110A and a last geospatial coordinate 110N may be two meters and the instantaneous velocity calculated to be approximately 0.4 m/s. In one or more embodiments, instantaneous velocity may be calculated and stored in association with each entry 312, such that data can be trimmed for efficiency in computer memory, or the instantaneous velocity may be later re-calculated as needed. In one or more embodiments, entries 312 and/or geospatial coordinates 110 utilized to calculate instantaneous velocity may be paired in a first-in-first-out-procedure in a memory buffer. For example, a last geospatial coordinate 110 in a memory buffer may be compared to a newly added geospatial coordinate 110 in the memory buffer, and then the last geospatial coordinate 110 removed from the memory buffer when a next geospatial coordinate 110 is added.

Figure 18:
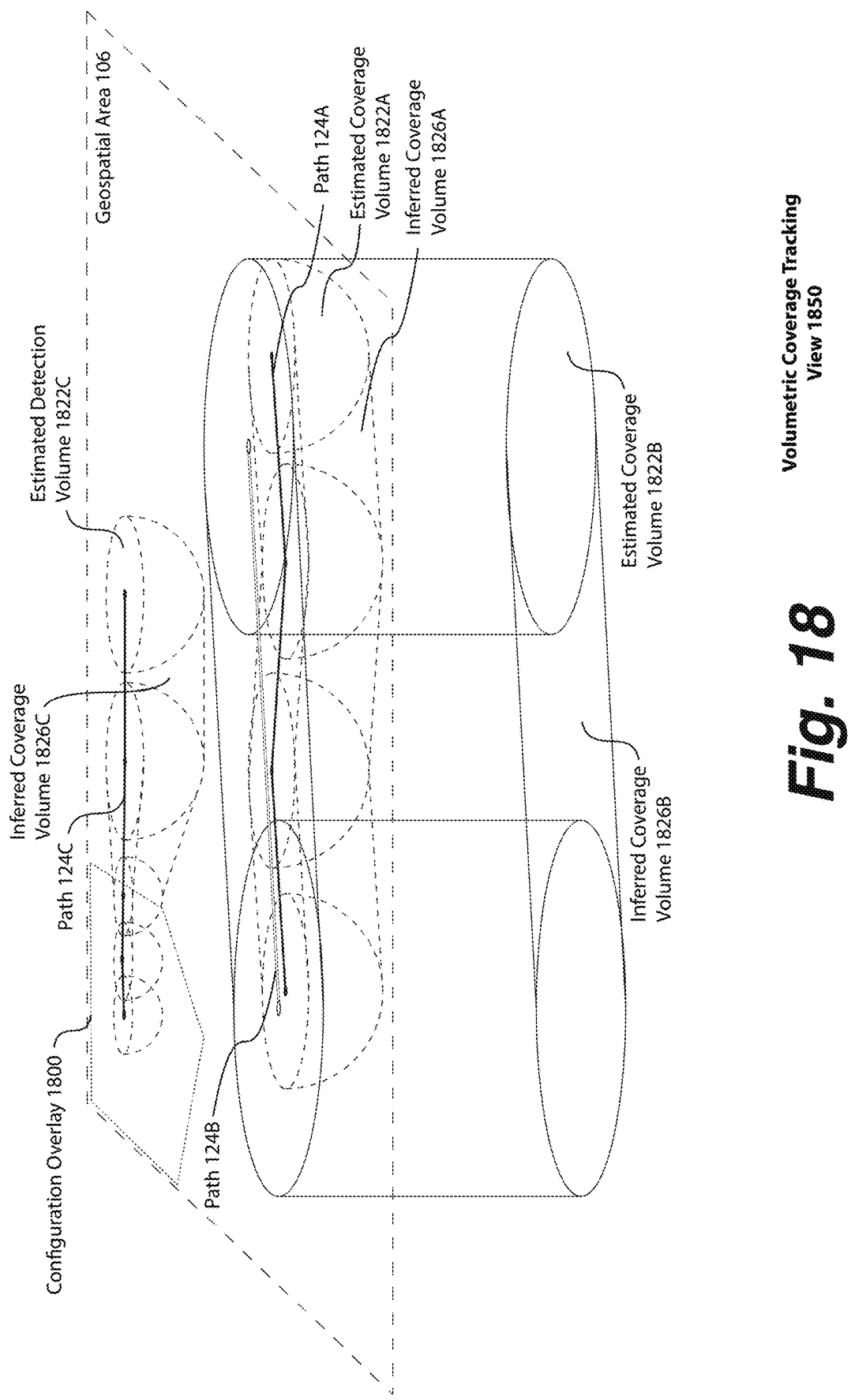
FIG. 18 illustrates a volumetric coverage tracking view in which an estimated coverage volume of one or more detectors may be mapped in three dimensions on and/or below a surface of the geospatial area, and further illustrates overlap detection among varying types of detector and configuration overlay resulting in automatic coverage tracking parameter adjustment, according to one or more embodiments.

In one or more embodiments, the quality engine 320 may include a velocity warning subroutine 324 that may be configured to generate a message, notification, and/or alert to one or more users 101 on one or more devices of the geospatial tracking system 190 when a velocity specification and/or parameter is exceeded. The parameter may be automatically or manually set, and may differ depending on the capability of the operator 100, capability of the detector 102, configuration overlays (e.g., as shown in FIG. 18), and/or type of project. For example, detection and removal of UXO may have two velocity parameters, a first parameter for a warning that instantaneous velocity is close to being exceeded (e.g., 0.4 meters per second), and a second warning in which data in unusable per a specification of the Army Corp. of Engineers (e.g., 0.45 meters per second).

In one or more embodiments, a velocity warning subroutine 324 may include computer readable instructions that when executed: (i) determine the average velocity exceeds a velocity parameter, and (ii) generate a quality alert (e.g., on the graphical user interface of the coordination device 300, on the support device 400, and/or on the server 500). In one or more embodiments, the velocity warning subroutine 324 may include computer readable instructions that when executed optionally designate a portion of the area map 318 as inadequately covered on the graphical user interface. For example, an area that is inadequately covered may be designated with a specific color, overlay, or map layer, including specification in common data formats such as .kml, .kmz, .json, .csv, or .shp files. In one or more embodiments, any inadequately covered areas may be automatically stored in a separate database (e.g., a different instance of the geospatial database 310, not shown in the embodiment of FIG. 3) to ensure clear and auditable data for quality assurance, quality control, and/or auditing purposes. The generated alert may be textual (e.g., a message describing that the velocity parameter is exceeded), sound-based (e.g., a tone, a voice describing that the velocity parameter is exceeded), a visual signal (e.g., a flashing light on the detector 102, operator 100, etc.), and/or through other devices and methods. Data quality, including velocity parameters, evaluations and/or warnings are further shown and described in conjunction with the embodiments of FIG. 8A and FIG. 13. The automatic determination of velocity and warnings related thereto may occur in real time, which may greatly assist in identifying and addressing data quality issues for search coverage of the objects 104.

Sounds based alerts may be applied to any of the one or more data quality alerts described herein. As just one example, a velocity alert may include a low audible tone on a speaker for approaching a first velocity threshold, and a high audible tone on the speaker for approaching the second velocity threshold. Similarly, in one or more embodiments, a deviation alert may include a low audible tone on a speaker for deviation on a first side of the transect vector and a high audible tone on the speaker for deviation on a second side of the transect vector 142.

The quality engine 320 may include an overlap evaluation routine 326 configured to determine an area (e.g., within the geospatial area 106) of non-overlap of search and/or detection coverage, according to one or more embodiments. In one or more embodiments, the overlap evaluation routine 326 may include comprising computer readable instructions that when executed determine a non-overlap (e.g., the non-overlap 130 shown and described in conjunction with FIG. 8A). In one or more embodiments, the overlap evaluation routine 326 may include comprising computer readable instructions that when executed determine a first radius of the geospatial coordinate 110A (e.g., an estimated coverage area 122A) of a first geolocation unit 200A and a second radius of the geospatial coordinate 110B (e.g., an estimated coverage area 122B). The non-overlap 130 may be determined for a threshold distance, a threshold time, and/or a threshold area. For example, the non-overlap may be determined where the threshold distance between the first geospatial coordinate 110A (and/or a point on the estimated coverage area 122A) is exceeded compared to the geospatial coordinate 110B (and/or a point on the estimated coverage area 122B). In another example, the threshold distance may be a length of a transect (e.g., the transect vector 142) over which the non-overlap occurs. In yet another example, the non-overlap may be determined based on the calculated area of non-overlap. For example, there must always be an overlapping area calculated between the coordinate radius of at least one geospatial coordinate 110 from a first geolocation unit 200A and at least one geospatial coordinate 110 from the second geolocation unit 200B. In one or more embodiments, if the sample rate is relatively low such that radii drawn around geospatial coordinates 110 will still generally not be overlapping, a non-overlap 130 in coverage may be detected and/or calculated with overlap of inferred coverage area 126, as shown and described in conjunction with the embodiment of FIG. 8A.

In one or more embodiments, the quality engine 320 may include an overlap warning subroutine 328 comprising computer readable instructions that when executed generate a coverage alert (e.g., on a graphical user interface and/or speaker of the support device 400, the server 500, the coordination device 300, etc.) and optionally designating a portion of the area map 318 as uncovered. For example, an area that is inadequately covered may be designated with a specific color, overlay, or map layer, including specification in common data formats such as .kml, .kmz, .json, .csv, or .shp files. In one or more embodiments, any inadequately covered areas may be automatically stored in a separate database (e.g., a different instance of the geospatial database 310, not shown in the embodiment of FIG. 3) to ensure clear and auditable data for quality assurance, quality control, and/or auditing purposes. The generated alert may be textual (e.g., a message describing that the velocity parameter is exceeded), sound-based (e.g., a geospatial, a voice describing that the velocity parameter is exceeded), a visual signal (e.g., a flashing light on the detector 102, the operator 100, etc.), a vibration (e.g., through the support device 400) and/or through other devices and methods. Data quality, including velocity parameters, evaluations and/or warnings are further shown and described in junction with the embodiments of FIG. 8A and FIG. 12. The automatic determination of non-overlap and warning may occur in real time, which may greatly assist in identifying and addressing data quality issues for search coverage of the objects 104.

In one or more embodiments, the coordination device 300 may include a geolocation engine 330 configured to calculate radii of points and/or offset buffer lines generated from geospatial data. For example, in one or more embodiments the coordination device 300 may be configured to calculate radius around a geospatial coordinate 110, an offset of lines drawn between geospatial coordinates 110 and/or an offset of a line drawn or mathematically fit two or more geospatial coordinates 110, for example as shown and described in conjunction with FIG. 8A. In addition to calculating radii, offsets, and other spatial relationships from geospatial data, the geolocation engine 330 may also mathematically compare and/or calculate areas, for example to determine overlap and/or non-overlap. In one or more embodiments, the geolocation engine 330 may act as a mathematical check on any rapid overlap detection and/or determination methods, for example as may be effected by the rendering engine 340, described below, and as further shown and described in conjunction with the embodiment of FIG. 12. Although a "radius" is described, it should be noted that any shape can be employed and/or offset from a geospatial coordinate 110. For example, it may be known that the detector 102 has a certain shape in which estimated effective detection occurs. As just one example, where a center point of the detector 102 is known, and the detector 102 detects metal objects in a rectangular area under the head of the detector 102, then the estimated coverage area may be modeled as a rectangle centered on (or offset from, as the case may be) the detector 102. Studies or calibrations for various instances of the detector 102 may be carried out to set the size and shape of the inferred detection area. Specification of the size and shape of the inferred detection may be stored in an estimated coverage area parameter optionally for each detector 102. Estimated coverage volumes may also be specified, for example as shown and described in conjunction with FIG. 18.

In one or more embodiments, the geolocation engine 330 may include a radius detection subroutine 332. The radius detection subroutine 332 may include computer readable instructions that when executed read a radius parameter (e.g., a radius parameter 121, e.g., 10 meters, 2 meters, 1 meter, 10 centimeters) and calculate a first radius (e.g., around the geospatial coordinate 110A of a geolocation unit 200A) and a second radius (e.g., around the geospatial coordinate 110B the second geolocation unit 200B). In one or more other embodiments, the radius detection subroutine 332 also may be configured to calculate a path offset based on a line calculated between two geospatial coordinates 110 and/or a line that is fit to three or more geospatial coordinates 110. Any path offsets may form closed and/or bounded areas for further assessment, for example by the geolocation engine 330. An example of the inferred coverage area 126, calculated as the offset of a line between to geospatial coordinates 110, is shown and described in conjunction with the embodiment of FIG. 8A and FIG. 9B. In one or more embodiments, the radius parameter 121 may depend upon the precision of the geospatial coordinates 110. For example, if precision data (e.g., which may be reported as part of a NMEA string) is imprecise, the radius of an inferred search area may be reduced.

The geolocation engine 330 may also include a calculated overlap subroutine 334 configured to calculate any overlap in one or more radii and/or bounded areas resulting from offsets and/or line buffering. In one or more embodiments, the overlap subroutine may include computer readable instructions that when executed calculate an overlap area between (i) radii or other inferred search area offsets between two instances of geospatial coordinates; and (ii) two enclosed areas offset from lines or paths. The output may be an area of overlap, a percentage of overlap, and/or a probability of overlap based on known precision, etc.

The coordination device 300 may include one or more area maps 318. The area map 318 may be stored data that may be viewed on a graphical user interface on the display 304. The area map 318 may include one or more layers storing photographic data, geophysical data, topographic data, biological data, site plans or schematics, spectroscopic data, infrared photography data, geologic or soils data, and/or geologic data. As just one example, layers may be defined in formats such as .kml, kmz, .shp, .gpx, .csv, or .gdb. In one or more embodiments, the area map 318 may be a satellite photograph calibrated to geospatial control points in the geospatial area 106. In one or more embodiments, the area map 318 can be an aerial photograph of the geospatial area 106, for example taken by a commercial camera-enabled drone flown over the geospatial area 106. Calibration of satellite imagery may occur through a process such as site calibration using known points. Calibration of aerial photography may occur through a process such as site calibration using known points. In one or more embodiments, layers may be easily added to the area map 318. For example, layers may include but are not limited to property boundaries, points of interest, and/or contextual data. In one or more embodiments, geospatial data generated and stored in the geospatial database 310 may be integrated into, projected on, and/or added as a layer to the area map 318. Such data from the geospatial database 310 may be automatically added and/or reviewed in real time on the display 304, e.g., to be reviewed by a user 101.1 such as a project manager or team leader, according to one or more embodiments.

In one or more embodiments, the coordination device 300 may include a rendering engine 340 which may be configured to render geospatial data (e.g., data stored in the geospatial database 310, including one or more entries 312 or data derived therefore), including without limitation on the area map 318. The rendering engine 340 may include a point buffer subroutine 342, a path buffer subroutine 344, and/or a graphical overlap subroutine 346, according to one or more embodiments.

In one or more embodiments, the point buffer subroutine 342 may be configured to determine a radius or other area (e.g., or receive a radius or other area, for example from the radius detection subroutine 332) and render the radius or other area on the area map 318.

In one or more embodiments, the point buffer subroutine 342 includes computer readable instructions that when executed render a first estimated coverage area 122A around a geospatial coordinate 110A of a first geolocation unit 200A and a second estimated coverage area 122B around a geospatial coordinate 110B of a second geolocation unit 200B on the area map 318 within a graphical user interface. The result may provide instant feedback to the operator of the coordination device 300 (e.g., the user 101.1 in FIG. 1) as to overlapping search, trading, and/or inspection coverage of the first geolocation unit 200A with the second geolocation unit 200B within the geospatial area. Where the radius parameter 121 was specified in a unit of geospatial distance (e.g., meters), the point buffer subroutine 342 may specify the radius or other offset in pixels that depend on both the screen resolution and/or current scale of the area map 318 on the display 304.

The path buffer subroutine 344 may be configured to buffer a line or path calculated between two or more geospatial coordinates 110 and/or a line or path fit to three or more geospatial coordinates 110.

In one or more embodiments, the path buffer subroutine 344 may include computer readable instructions that when executed generate a path data (e.g., of a path 124) from a set of geospatial coordinates 110 generated by a geolocation unit 200 and plot the path data on a digital image (e.g., an image as a layer of the area map 318) as a first image overlay (e.g., as an overlaid and/or transparent layer). In one or more embodiments, the path buffer subroutine 344 may include computer readable instructions that when executed offset the path data by a distance, for example 2 meters, 1 meter, 10 centimeters, or 1 centimeter. The offset may result in a bounded area projected equidistant from the path 124 modeled by the path data. The area may represent the inferred search coverage area, according to one or more embodiments. The path data (e.g., of a path 124A) may be rendered for first geolocation unit 200A and a second geolocation unit 200B, where the bounded areas generated from the buffer offset may be utilized to compare and ensure search coverage overlap (e.g., representing thoroughness and/or meeting coverage specifications).

The graphical overlap subroutine 346 may be configured to determine overlap based on graphical approximations of point buffers and/or path buffers projected on the area map 318. In one or more embodiments, the graphical overlap subroutine 346 includes computer readable instructions when executed determine a non-overlap (e.g., of two inferred search areas) based on one or more uncovered pixels in a first image overlay and a second image overlay. For example, the inferred coverage area of two operators 100 may color coded in the user interface, e.g., yellow for a first operator 100A and orange for a second operator 100B. The graphical overlap subroutine 346 may include one or more graphical analysis instructions that may determine that after two operators 100 (e.g., an operator 100A and an operator 100B) passed near one another (and/or a single operator 100 completed adjacent transects) that there remains "uncolored" areas when both overlays (e.g., search coverage for the operator 100A and the operator 100B) are graphically compared. As a result, there may be a decrease computational load associated with geospatial data analysis compared with calculating distances or mathematical area overlaps. Decreased computational load may have numerous advantages, including being able to implement the tracking coordination device 300 on smaller, less expensive, and/or more flexible devices (e.g., an Android® device), being able to receive and process more data streams (e.g., five, ten, twenty, or more instances of the geolocation unit 200), and reducing device power usage.

In one or more embodiments, geospatial layers may be sectionalized, for example bounded or defined by geospatial points or coordinates, and any graphical images or graphics overlayed scaled within each section during a zoom function of a graphical user interface. In one or more embodiments, path buffers and/or radii rendered around geospatial coordinates 110 of search coverage may be converted into pixel-based image overlays in each sectionalized quadrant, for example in batches. The image overlays may enable faster overlays and zoom responsiveness on a graphical user interface, which may require re-rendering at various zoom levels. Faster image overlays and zoom responsiveness may assist in real-time evaluation of search coverage by the team leader such as the user 101.1. Sectionalized image overlays may additionally save computational resources in re-rendering, improving scalability and battery life of the coordination device 300 and/or other devices.

The tracking coordination device 300 may include an attenuation engine 350, according to one or more embodiments. The attenuation engine 350 may be configured to assist in the attenuation and/or reconstruction of geospatial data that may be reduced in size. The attenuation may be advantageous to increase bandwidth (e.g., over the network 108 and/or the link between the geolocation unit 200 and the coordination device 300), increase sample rate (e.g., the generation of an increased number of entries 312 which may lead to greater precision and/or data quality), and/or decrease power consumption. In one or more embodiments, the attenuation engine 350 may include an attenuation zone detection subroutine 352, a coordinate reassembly subroutine 354, and/or store or have access to a zone context data 356.

As further shown and described in conjunction with the embodiment FIG. 2, the geolocation unit 200 may include a coordinate attenuator 210 that may be configured to strip one or more leading digits in the geospatial coordinate 110 to reduce a data transmission size. The attenuation engine 350 may receive attenuated geospatial coordinates 114 from the geolocation unit 200 and may reconstitute the attenuated geospatial coordinates 114 (e.g., back to the geospatial coordinates 110) for storage in the geospatial database 310.

In one or more embodiments, the coordinate reassembly subroutine 354 may include computer readable instructions that when executed reconstitute the leading digits in the geospatial coordinate 110 (e.g., restore the attenuated geospatial coordinate 114) and store the geospatial coordinate 110 in the geospatial database 310. In one or more embodiments, reconstitution may occur, for example, by re-using leading digits from a full NMEA string sent periodically (e.g., once per 100 samples) by the geolocation unit 200. In one or more embodiments, a zone context data 356 may also be utilized which may describe the extents of the geospatial area 106 and/or the minimum or maximum expected values for the leading digits of geospatial coordinates 110.

In one or more embodiments, the attenuation zone detection subroutine 352 may include computer readable instructions that when executed determine a nonsequential jump in a leading digit of the attenuated geospatial coordinate 114 (e.g., an attenuated geospatial coordinate 114B) compared to a leading digit of a previously generated attenuated geospatial coordinate 114 (e.g., an attenuated geospatial coordinate 114A) occurring within at least one of a threshold time and a threshold index number. The threshold time, for example, may be 1 minute, 1 second, or 100 milliseconds. The threshold index number may be, for example, set to 1, 10, or 100. The threshold time or the threshold index number may depend on the sample rate or the known or calculated land, air, or water speed of the operator 100. For example, what might be determined to be a non-sequential jump in a leading digit may be different depending on whether the operator 100 is a human, a vehicle such as a truck, boat, or a flying quadcopter drone. The non-sequential jump may modify an approach of the coordinate reassembly subroutine 354. For example, a set of attenuated geospatial coordinates 114 may be buffered until a full NMEA string is reported, and/or reference may be made to the zone context data 356 to determine a most likely set of leading digits of the attenuated geospatial coordinate 114. For example, where the operator 100 who is a user 101 walked with the geolocation unit 200 such that a quadrant boundary was crossed, based on a vector of the user 101 and/or a directionality of the increase or decrease in the values of the attenuated geospatial coordinates 114, it may be inferred as to the values of the leading digits.

In a still more specific example, a NMEA string may include a coordinate 4158.8441367, where '41' is degrees, '58' minutes, and '8441367' decimal minutes. The '4158' may be dropped and/or attenuated, and the decimal minutes reported except for the '7', which may be rounded. Therefore, the attenuated NMEA string may be reported as "844137." Similarly, for altitude, 0255.747 may be reported as "55.75".

Although not shown, the coordination device 300 may include a field rendering module for associating and/or calibrating a visual identifier of one or more operators 100. In one or more embodiments, the rendering module may be configured associate a first visual identifier with an overlay a coordination device 300 and/or of one or more geospatial coordinates 110 of the coordination device 300 on the area map 318, which may be repeated for each coordination device 300 on the team 600. In one or more embodiments, the visual identifier may a first color coordinated with an overlay color of one or more geospatial coordinates 110, rendered radii, and/or path buffer offsets on the area map 318.

In one or more embodiments the tracking coordination device 300 may be implemented on a smartphone, for example an Android phone, an iPhone, etc. In one or more embodiments the tracking coordination device 300 may be implemented on a tablet computer or laptop computer.

Figure 4:
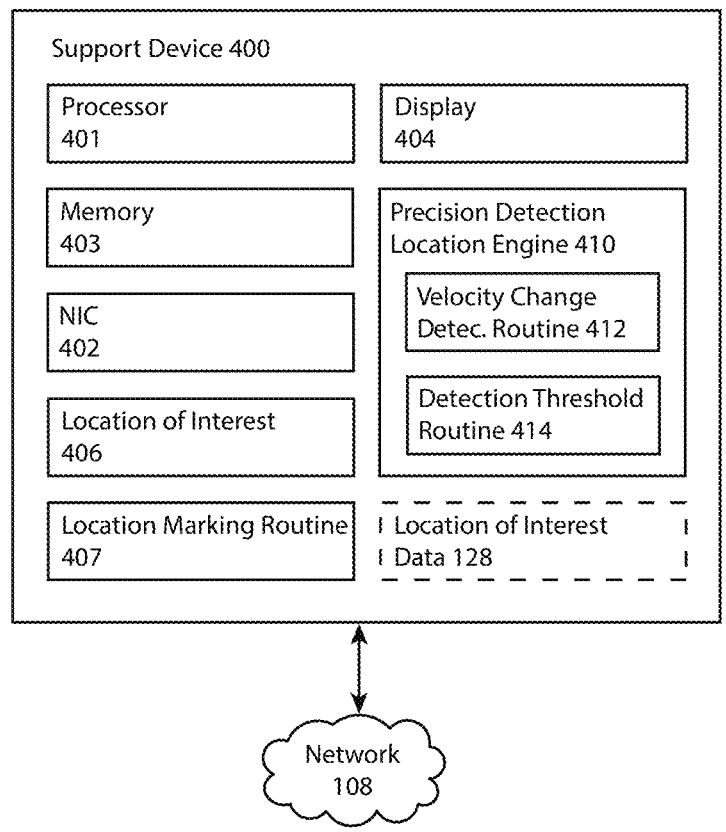
FIG. 4 illustrates a support device that may be utilized by the operator for one or more support functions including, for example, to mark locations of interest, communicate alerts, and/or to process additional data such as the exact and/or local location of the detector relative to the geolocation unit, according to one or more embodiments.

FIG. 4 illustrates a support device 400, according to one or more embodiments. The support device 400 may include a processor 401 (e.g., a computer processor, a microcontroller, an MCU), a memory 403 (e.g., computer memory, RAM, solid state memory), one or more network interface controllers 402 (which may be wireless interface controllers 402), and/or a display 404.

In one or more embodiments, the support device 400 may be configured to specify that one or more geospatial coordinates 110 generated and/or collected by the geolocation unit 200 are associated with a location of interest, point of interest, or other geolocation intended to be marked. For example, the user 101 may select a button (a physical button, a button on a graphical user interface) or provide other input (e.g., voice activation) that may send a point of interest definition request to the coordination device 300 that may designate that any geospatial coordinates 110 received from the geolocation unit 200 are to be grouped and/or associated with a point of interest within the geospatial database 310. When activated, the button(s) may initiate a designation mode whereby the geospatial coordinates 110 may not be associated with a primary tracking coverage path and/or specifications, but rather with designation of point of interest and/or location of interest data (e.g., the location of interest data 128 as shown and described in conjunction with FIG. 3). Information may be entered by the user 101 to name, describe, and/or otherwise designate a location of interest and/or point of interest (e.g., the location name 422, the description data 424, etc.). The location of interest data 128 may be entered on a separate geospatial layer for the area map 318 within the geospatial database 310. The designation mode may be manually terminated by the operator 100 and/or the user 101. In one or more embodiments, the designation mode may also be automatically terminated.

The designation mode may or may not be selected and/or preselected to be coextensive with search coverage. For example, in some cases the geolocation unit 200 could be used to walk around a large boulder, but search would not be assumed to have occurred in walking around the boulder. In other cases, a point of interest may be assumed and/or designated to be searched. For example, where an ambiguous signal of the detector 102 may occur, the user 101 may enter the designation mode to both create a point of interest in and around the ambiguous signal while also doing additional detection attempts. A user 101 may be able to designate whether the location of interest was searched, for example which may automatically cause the radii, buffering, and/or data quality alerts to apply to such data.

In one or more embodiments, the support device 400 may include a location of interest module 406 configured to generate a request to switch data storage modes, designate locations of interest, and/or to associated additional data with the data specifying the location of interest.

The location of interest module 406 may include a location marking routine 407, according to one or more embodiments. In one or more embodiments, the location marking routine 407 may include computer readable instructions that when executed generate a location of interest data 128 comprising at least one geospatial coordinate 110 and optionally a text description (e.g., the description data 424) generated by an operator 100 and/or a photo data generated by the operator 100 of the support device 400. In one or more embodiments, a request may be generated by the support device 400 and communicated through the network 108 to the coordination device 300 such that all geospatial coordinates 110 received are to be group and/or designated as part of the location of interest data 128 until a condition occurs, for example a set time expires, a closed loop of connected points have been defined, and/or a second request for termination of the designation mode is sent. Sample rate or attenuation may be altered by the designation mode, for example the sample rate increased and/or the attenuation ceased, to increase the probability of acquiring quality data, according to one or more embodiments. An example of the support device 400 is further shown and described in conjunction with the embodiment of FIG. 6A.

In one or more embodiments, the support device 400 may include a precision detection location engine 410. The precision detection location engine 410 may be configured to detect a location of the detector 102, a sensor or emitter having a known fixed relationship with the detector 102, and/or a sensor or emitter otherwise representing and/or associated with an estimated coverage area of the detector 102. As just one example, the precision detection location engine 410 may calibrate a location of the support device 400 to a location of the detector 102 and a location of the coordination device 300, then receive a stream of inertial measurement unit (IMU) data by which a local location of the detector 102 may be determined (e.g., an example of the detection position signal 180).

In one or more or more embodiments, the precision detection location engine 410 may be configured to process a data stream from the detector 102, e.g., the detection signal 170 and/or the detection position signal 180. In one or more embodiments, the detection signal 170 may determine which data from the detection position signal 180 is maintained. For example, and as further shown and described in the embodiments of FIG. 9A and FIG. 9B, local location data and/or coordinates may be retained where the detector 102 undergoes a change in acceleration, a change in direction, and/or occurs in conjunction with a certain aspect of the detection signal (e.g., occurring over a threshold signal strength, detection with data having a certain detection signature, etc.).

In one or more embodiments, the velocity change detection routine 412 may be configured to detect a velocity change in the detector 102, for example by detection of its location through laser location, IMU, accelerometer, or other data. In one or more embodiments, the velocity change detection routine 412 includes computer readable instructions that when executed detect a change in velocity of the detector 102, for example through analysis of the detection position signal 180, and optionally extract a local coordinate of the location of the velocity change which may be added to the detector position data 181. An example of the collection of local coordinates is shown and described injunction with the embodiment of FIG. 9B.

In one or more embodiments, a detection threshold routine 414 may be configured to determine the detection signal 170 is above a strength threshold, match a detection signature of the object 104, and/or otherwise detect data and/or signals indicative of the object 104 or a different object. In one or more embodiments, the detection threshold routine 414 may include computer readable instructions that when executed determine a detection signal 170 is above a threshold strength and/or determine a matching detection signature, determine the local coordinate of the detector 102 associated with the detection signal exceeding the threshold strength and/or matching the detection signal, associate the local coordinate and portion of the detection position signal 180 (e.g., to form the reduced detection data 172), and transmit the associated data, e.g., to the geolocation unit 200 and/or the coordination device 300. An example of local coordinate collection and/or recordation is further shown and described in conjunction with the embodiment of FIG. 9A.

In one or more embodiments, the detection signature may be a machine learning and/or "artificial intelligence" (AI) algorithm for recognition of the object 104. In such case, the support device 400 may run specialized software and/or hardware implementing the machine learning and/or AI algorithm, or with network connectivity to a remote server or service providing the machine learning or AI algorithm. Training sets may include geophysical test data from real or test instances of the geospatial area 106. As just one example, where a certain metal detector (e.g., an instance of the detector 102) is utilized to detect unexploded ordinance, a dataset that includes the detection signals 170 associated with the actual result (e.g., the type, depth, and/or orientation of excavated ordinance) may be used to train machine learning and/or AI models, including but not limited to artificial neural networks. In one or more other embodiments, where the detector 102 is a camera, the detection signal 170 may be photos and/or an audio stream, and a visual machine learning and/or AI recognition software may be utilized to provide the object 104 recognition.

In one or more embodiments the support device 400 may be implemented on one or more of a smartphone (for example an Android phone, an iPhone, etc.), a tablet device, and/or a wearable device (e.g., smartwatch). The support device 400 may also be a laptop device or other computing device. In one or more preferred embodiments, the support device 400 may be implemented such that it does not interfere with the operator 100. For example, where the operator 100 is a user 101 with a handheld magnetometer (e.g., the detector 102), a smartphone and/or wearable device may be advantageous. The support device 400 may also be mounted (e.g., to the user 101, to the detector 102, etc.).

In one or more embodiments, the support device 400 or functions thereof may be integrated with the operator 100 and/or the geolocation unit 200. For example, the geolocation unit 200 may include the location of interest module 406, the location marking routine 407, the precision detection location engine 410, the velocity change detection routine 412, and/or the detection threshold routine 414.

In one or more other embodiments, determination of a local location of the detector 102 may occur by determining the location of the detector 102 and/or a point with a fixed location relative to the detector 102, relative to the location of the geolocation unit 200. For example, the geolocation unit 200 may include a laser emitter and detector, and the detector 102 may include a reflector and/or an IMU. A local location of the detector 102 may be sensed through reflection of the laser from the reflector. In one or more embodiments, where the reflector may become partially or completely obscured for period of time (e.g., 1 second, several seconds, several minutes), the IMU may be used maintain location tracking from the last detected location until the reflector is again detected. In one or more other embodiments, the detector 102 may include an emitter (e.g., the laser) and the geolocation unit 200 may include the detector for the emitter and/or a reflector. The emitter may also be LIDAR. One skilled in the art will appreciate many additional devices, systems, and methods for determining the local location of the detector 102 relative to the geolocation unit 200.

Reference is made back to FIG. 1. In one or more embodiments, the geospatial tracking system 190 may include a reference device 262 that may provide the correction signal 160 to increase precision of the geolocation unit 200. In one or more embodiments, the reference device 262 may be a base station with a relatively powerful (relative to the geolocation unit 200) and stationary (e.g., once set-up, for example on a tripod or other mount) geolocating capability that is able to establish a known point with high precision. The known point may be established with the primary positioning signal 150 and/or an existing survey control point established in or near the geospatial area 106.

In one or more embodiments, a base station (e.g., the base station 660 of FIG. 6) may include: an RTK GPS unit, an internet backhaul unit, and a data radio.

Figure 5:
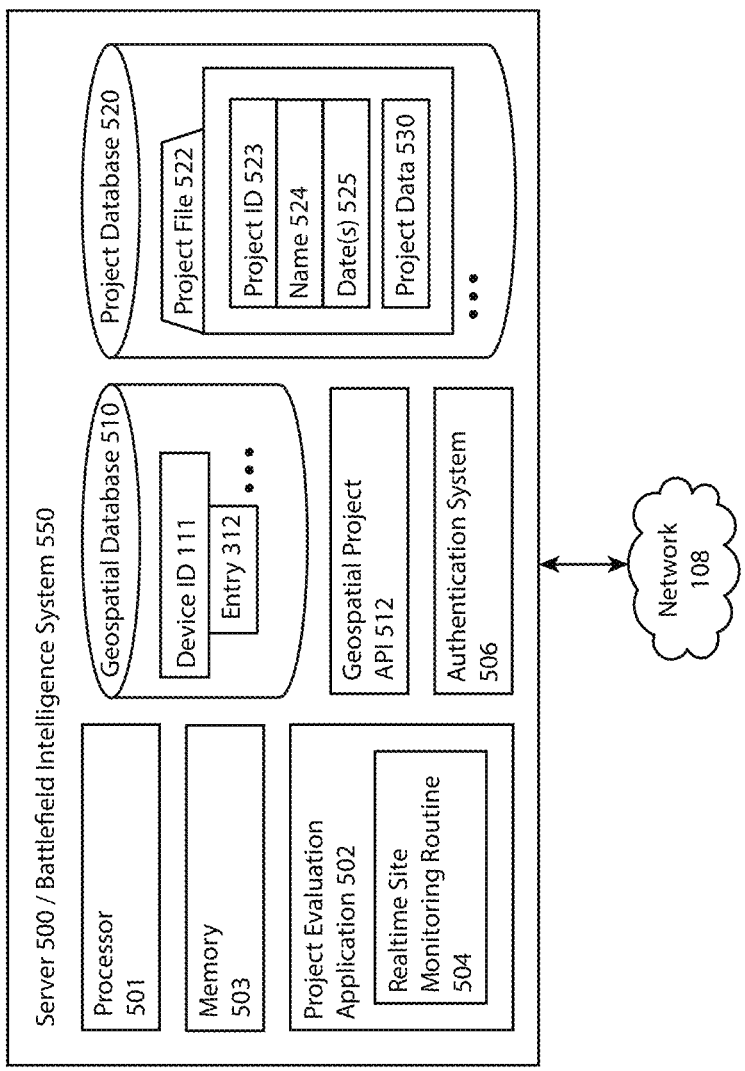
FIG. 5 illustrates a server and/or a battlefield intelligence system, including a real time site monitoring routine enabling a project manager to review activity and real time geospatial data generated within the geospatial area, and further including a project database storing and/or organizing project data of the geospatial area, according to one or more embodiments.

FIG. 5 illustrates a server 500 and/or a battlefield intelligence system 550 (which may be a specialized instance of the server 500, referred to herein as the BIS 550), according to one or more embodiments. In one or more embodiments, the server 500 may include a processor 501, a project evaluation application 502, a memory 503, a real time site monitoring routine 504, an authentication system 506, a geospatial database 510, a geospatial project API 512, and/or a project database 520, according to one or more embodiments. The server 500 may be connected to the network 108, for example a wide area network (WAN), a local area network (LAN), virtual private network (VPN), and/or the internet.

The project evaluation application 502 may be configured to allow a user such as an off-site project manager, quality assurance personnel, quality control personnel, and/or other person or system (not shown in the embodiment of FIG. 1) to log in and monitor, inspect, and/or audit the geospatial data from the geospatial area 106. For example, geospatial data may be plotted in real time on the area map 318, as previously shown and described herein, including without limitation as shown and described in conjunction with the embodiment of FIG. 3.

In one or more embodiments, a geospatial database 510 may store and/or mirror some or all geospatial data collected on the project and/or geospatial area 106. In one or more embodiments, data stored in the geospatial database 510 may be data backhauled or otherwise received from the geospatial database 310. In one or more other embodiments, the data stored in the geospatial database 510 may be directly received from one or more geolocation units 200, support devices 400, and/or other system or network components. In the embodiment of FIG. 5, data for a geolocation unit 200 is illustrated, including a set of entries 312 organized by device ID 111. There may be multiple instances of the device ID 111 tracked per given project (e.g., a device ID 111A for a geolocation unit 200A through a device ID 111G for a geolocation unit 200G), each of which may have hundreds, thousands, tens of thousands, or millions of entries 312 representing collected geospatial data.

Geospatial data may be additionally arranged and/or stored by project, for example in the project database 520. A project file 522 may include a project ID 523 that may be a unique identifier for a project, a name 524 that may be a project and/or location name of, or associated with, the geospatial area 106, and/or one or more dataset 525 of project definition, setup, configuration, data collection, and/or data analysis. The project file 522 may additionally include project data 530 including overlays, geophysical data associated with the area map 318, one or more geospatial layers, and/or all geospatial data collected by the geospatial tracking system 190, one or more instances of the geolocation unit 200, the coordination device 300, and/or any other system and network components.

The authentication system 506 may be utilized to authenticate one or more users attempting to access the server 500 or utilize the data therein. In one or more embodiments, the authentication system 506 may be used to check credentials of any device attempting to contribute to, access, and/or manipulate the data of the server 500. This may be advantageous, for example, where the objects 104 are landmines, and corrupted and/or falsified data may represent a risk to field personnel, humanitarian organizations, and/or active military personnel. In one or more embodiments, digital or physical device and/or software certificates may be implemented in one or more components of the geospatial tracking system 190, including without limitation the coordination device 300 and/or the geolocation unit 200 for security purposes.

It should be noted that some or all of the functions of project management and/or project oversite may occur remotely. For example, in one or more embodiments, some or all of the functions of the coordination device 300 may be carried out by the server 500. In one or more embodiments, the project evaluation application 502 may include one or more area maps 318, the quality engine 320, the geolocation engine 330, and/or the rendering engine 340. In such case, each geolocation unit 200 may include wireless network interface controller (e.g., a wireless NIC 202) for direct connection to the server 500 through the network 108. Geospatial data may be processed by the server 500, and any alerts (e.g., quality alerts such as velocity and/or transect deviation alerts) generated and returned to the operator 100 in the field (e.g., a notification to the support device 400 of the user 101 that a quality metric was violated).

In one or more embodiments, the server 500 may be a battlefield intelligence system (e.g., the BIS 550), which may also be referred as a battlefield management system (BMS) and/or battlefield information system. The BIS 550 may include one or more servers and/or pieces of computing hardware and/or software for generating, controlling, securing, and/or managing data in military operations areas and/or active combat zones. The BIS 550 may be a system meant to integrate information acquisition and processing to enhance command and control of a military unit. For example The BIS 550 may sync updated maps showing landmine clearance status for an area. In another example, the operators 100 may be active mine sweeping units, including mechanized units with mine rollers or other demining equipment, with the resulting geospatial data integrated into the BIS 550 for communication to other military units. For example, area of search coverage for landmines may be utilized to designate a safety corridor from ingress, egress, and crossing of the geospatial area 106.

FIG. 6A illustrates an example embodiment in which a team 600 searching for unexploded ordinance (UXO) using magnetometers generates geospatial data for coverage tracking, according to one or more embodiments. In the present example, the unexploded ordinance is an example of the objects 104, and the magnetometer 602 is an example of the detector 102. The geospatial area 106 may be a former bombing range, former war zone, and/or active minefield. In the embodiment of FIG. 6A, there may be a team leader (e.g., the user 101X), three human operators 100 (e.g., the user 101A, the user 101B, and the user 101C), and a robotic operator 100 (e.g., the autonomous vehicle 601). Each human instance of the operator 100 may have mounted on their person, for example through a backpack as shown, an instance of the geolocation unit 200. For example, the geolocation unit 200B may be removably fastened to the user 101B. The autonomous vehicle 601 may have an integrated instance of the geolocation unit 200 (e.g., a geolocation unit 200D).

In the example of FIG. 6A, each geolocation unit 200D may include a primary positioning signal 150 from a GPS satellite 650 and/or other satellite navigation systems, for example GLONASS. The primary positioning signal 150 and/or a different primary positioning signal may be used to generate a reference source 260, in this case generated by a reference device 262 that is the base station 660. For example, the base station 660 may be a multiband GNSS receiver. The base station 660 may generate the correction signal 160 received by each of the geolocation units 200 to increase precision.

In one or more embodiments, each operator 100 may have a visual designation that is fastened or otherwise associated. In the present example, each operator 100 includes a flag 603 that may be uniquely colored, patterned, and/or symbolized within the team 600 (e.g., the user 101A has attached to their backpack a flag 603A). Alternatively, or in addition, the clothing of the users 101, the backpacks and/or geolocation units 200 mounted on the backpacks may bear the visual designation or color.

Collectively, the operators 100 of the team 600 may search within the geospatial area 106 to create a coverage area 626. The coverage area 626 may be the aggregation of the coverage area of each individual operator 100 (e.g., the user 101B generates the coverage area 627B). The coverage area 626 and/or each coverage area 627 may be an aggregate of both direct (and/or estimated) and inferred coverage areas, as further shown and described in conjunction with FIG. 8A and FIG. 8B. In the present embodiment, a different type of broken line has been utilized to illustrate the coverage area 627 of each operator 100, where a circle centered on the geolocation unit 200 is utilized to approximate the sweep location, e.g., an estimated search location. As further described in FIG. 9A and FIG. 9B, even great precision of estimated and/or inferred tracking may be accomplished to increase certainty of tracking coverage.

As described extensively herein, geospatial data may be generated by each of one or more geolocation units 200, for example utilizing the GPS signal and the base-station correction signal. The geolocation data may be structured in a common format such as NMEA string and communicated through a communication link and/or the network 108. For example, the communication link may be made through a radio connection such as 900 Mhz data radio. The NMEA string and/or other data may be attenuated, and/or position data relative to a single full NMEA string coordinate may be defined, to decrease bandwidth usage and/or increase sampling rate.

The geolocation data may be communicated to the coordination device 300, in this case implemented by the tablet 607. The tablet 607 may be connected to each of the geolocation units 200 through a radio, for example where the tablet 607 has a wired and/or Bluetooth connection to a 900 Mhz data radio. The user 101X who may be the leader of the team 600, and/or a quality control or quality assurance personnel, may review the graphical user interface (GUI) 609 on the tablet to see the area map 318 of the geospatial area 106, along with an overlay of the geospatial data generated by each operator 100 of the team 600. For example, a radius from geospatial coordinates 110 and/or an offset from a geospatial path (e.g., the path 124) may be generated as a geospatial layer and overlayed on the area map 318. In one or more embodiments, the path may be buffered, converted to partially transparent pixilated images (e.g., JPEG, PNG), and overlayed, including in any rendering tiles and/or quadrants. In one or more embodiments, and as illustrated in FIG. 6A, each operator 100 may have their own color assigned (e.g., red, orange, cyan, etc.), which may be coordinated with the color of the plotted coverage area 629 in the GUI 609 (which may also be referred to as the graphical user interface 609). For example, the user 101A may have a flag 603A that is purple, where the plotted coverage area 629A is colored purple and/or a transparent purple as the plotted coverage area 629A as overlaid on the area map 318.

One or more users 101 may also have a support device 400 that is also communicatively coupled to the tablet 607, either directly, through the network 108, and/or through communications capabilities of the geolocation unit 200. In the embodiment of FIG. 6A, the user 101A has a wearable instance of the support device 400, shown and labeled as the smart watch 605. One user 101A may be able to utilize the smart watch 605 to change a data gathering made and/or data designation of data sent back to the tablet 607. For example, the user 101A may select a button on the smart watch 605 that changes the designation of received data to "obstacle" (e.g., the location name 422) and allows the user 101A to record audio describing the obstacle. Where the support device 400 is a smartphone or otherwise includes a camera, a user 101 may also be able to upload photo or video. The user 101A may then walk around the obstacle, or otherwise designate it according to predetermined criteria (e.g., standing still for 10 seconds next to the obstacle) to generate geospatial data (e.g., as may be stored in the location of interest data 128).

The smart watch 605 may also be utilized to communicate back to the users 101, according to one or more embodiments. For example, where a data quality alert occurs (e.g., a threshold velocity is exceeded, a threshold precision is lost, etc.), the data quality alert may be communicated to the user 101 through the smart watch 605, e.g., a sound, vibration, and/or textual or graphical on a display of the smart watch 605.

The user 101X may also be made aware of multiple alerts related to data quality, as shown and described throughout the present embodiments. For example, the user 101X may be alerted on the tablet 607 where an operator 100 exceeds a parameter or specification, for example moving too quickly (e.g., resulting in a velocity warning), deviating from a "lane" (e.g., a transect warning), resulting in non-overlapping coverage (e.g., two instances of the coverage area 627 are adjacent but do not overlap in an area), that precision dropped below a required threshold (e.g., as a result of a weak correction signal 160), that a user 101 did not fully specify a location of interest at the time designated, and/or other data quality issues. Other alerts may be made for safety, e.g., a previous dataset of an unresolved issue, or a present team-wide communication (e.g., an incoming adverse weather event such as a lightning storm, heatwave, or a different hazard such as an enemy recon unit or incoming artillery barrage).

FIG. 6A illustrates that a variegate team of operators is possible 100, for example both the human operator 100 and the robotic operator 100. In one or more embodiments, each type of operator 100 may have a different detector type and/or capability, and may be mapped as separate layers. For example, especially where the object 104 may be highly dangerous (e.g., a landmine), the autonomous vehicle 601 may make a first pass. The user 101X may review the coverage area 626 from the autonomous vehicle 601 before sending in the users 101. In one or more other embodiments, each instance of the operator 100 may have a different tool, function, and/or capability, and there may be multiple instances of the coverage area 626 generated (e.g., a coverage area 626 for a visual inspection of the geospatial area 106, a coverage area 626B for a hand-held magnetometer, a coverage area 626C for geophysical sensing, etc.).

The example of FIG. 6A may illustrate a highly efficient system, method, and/or one or more devices for tracking search coverage of a geospatial area 106. One advantage includes the ability to coordinate multiple geospatial layers and visualize those layers on-site, according to one or more embodiments and the embodiment of FIG. 6A. An advantage includes the capability for an on-site project manager or quality control person to watch progress and see data quality alerts in real time so any issues can be corrected quickly, according to one or more embodiments and the embodiment of FIG. 6A. This may be especially helpful to prevent costly "re-works" if geospatial data is collected but then analyzed at a later time, off-site. In another advantage, multiple operators 100 and/or operator types (e.g., human, vehicle, robotic, flying) may work concurrently and/or within the same geospatial area 106, according to one or more embodiments and the embodiment of FIG. 6A. In yet another advantage, visual coordination of the visual identifiers (e.g., the flag 603A) and the GUI 609 coloration may assist in the rapid determination of operator 100 location, coverage, and data quality, according to one or more embodiments and the embodiment of FIG. 6A. In one or more embodiments, a visual identifier may be visible at a distance of at least 100 feet by a user 101 with 20/20 vision.

FIG. 6B illustrates an experimental field test in which six human operators 100 (e.g., "sweepers", designated as a user 101A through a user 101F) and a team user (e.g., the user 101X) had search coverage tracked while detecting for unexploded ordinance (UXO) in a former U.S. military live fire range. The team 600 is shown, using handheld magnetometers and conducting a UXO search by walking in a parallel line approximately 1.5 meters apart. The total geospatial area 106 was an irregular shape about 0.08 square kilometers.

Each of the users 101 utilized a backpack-mounted instance of the geolocation unit 200. In the present example, the geolocation unit 200 was instantiated as a piece of custom-built hardware including a UBlox ZED-F9P (e.g., a GPS chip), xBee 900HP (e.g., a radio module), and Arduino Pro Micro (e.g., a micro controller), powered with a lithium ion battery. Data was generated in a NMEA stream, at approximately 1 sample per second.

The tracking coordination device 300 was implemented as a smartphone running Android® operating system and a custom developed software application including one or more of the functions described herein and/or processes of the tracking coordination device 300 as described in conjunction with FIG. 3. A graphical user interface 609 of the custom application is illustrated, with the instantaneous velocity and plotted tracking coverage of each user 101 (e.g., the 101A through the user 101F) displayed to the user 101X. In the present example, the user 101X may closely monitor the velocities and/or overlap of the plotted tracking coverage and provide feedback to the team 600 and/or its users 101 (e.g., the user 101X may speak, shout, provide visual signals, and/or call on radios or phones). The resulting dataset may be stored as a KML file, including a collection of geospatial coordinates 110 and instantaneous velocities. An example of the coverage data generated is further shown and described in conjunction with the embodiment of FIG. 8B.

As a result of the use of the systems, devices, and/or methods shown and described in conjunction with FIG. 6B, the team 600 was benefited from several advantages. Site setup can be straitforward, with the area map 318 loaded as a .sqlite file including aerial photography of 1 m per pixel resolution in which on-the-ground visual extents could be determined by the team leader (e.g., the user 101X) and therefore not necessarily requiring survey markers. The team 600 was able to gather geospatial data in all search areas, rather than "rope off" lanes to maintain order and/or consistency. Velocity data was gathered and/or calculated in association with the geospatial coordinates 110 generated by each user 101, providing auditable information to prove velocity specifications were met. Similarly, because the location of each user 101 was known, as sampled periodically, an inferred coverage area could be calculated according to preset parameters, or even evaluated against future parameters. The team leader (e.g., the user 101X) could easily and quickly view the activity of team members (e.g., the user 101A through the user 101G) and their field locations utilizing visual color-coded indicators. The team leader 101X, through the android device implementing the coordination device 300, was also able to monitor velocities, equipment errors, equipment battery life, and other data quality warnings. In yet another advantage, the team leader 101X can easily pause or restart data collection gathering of any geolocation unit 200 used by the team 600 from the GUI 609, helping to ensure a clean and coherent dataset, and reduce or eliminate the need for post processing to represent actual search coverage within the geospatial area 106. This may be especially useful if a user 101 has to take a break in the middle of a transect and/or other traverse of the geospatial area 106, or if there is a unexpected hazard (e.g., a lightning storm requiring that the team 600 stop work and follow safety procedures).

In one or more embodiments, one additional advantage of the relatively rich geospatial dataset demonstrated in FIG. 6A, FIG. 6B, and through the present embodiments, is that if specifications later are changed, it can be determined if older projects meet those specifications, and/or what sub-area(s) of the geospatial area 106 does not meet the new specifications. For example, where a velocity specification drops from 1 m/s to 0.5 m/s, previously completed project data may be assessed to determine if and to what extent it is compliant with the new velocity specification. In another example, the Army Corp. of Engineers may determine a certain tool or product (e.g., the detector 102) is not capable of a certain performance standard, and therefore post facto lower its velocity threshold and/or estimated search area. Therefore, the geospatial areas 106 can be re-evaluated and less expensive bids prepared to correct and sub-areas in which any issues are identified.

Figure 7A:
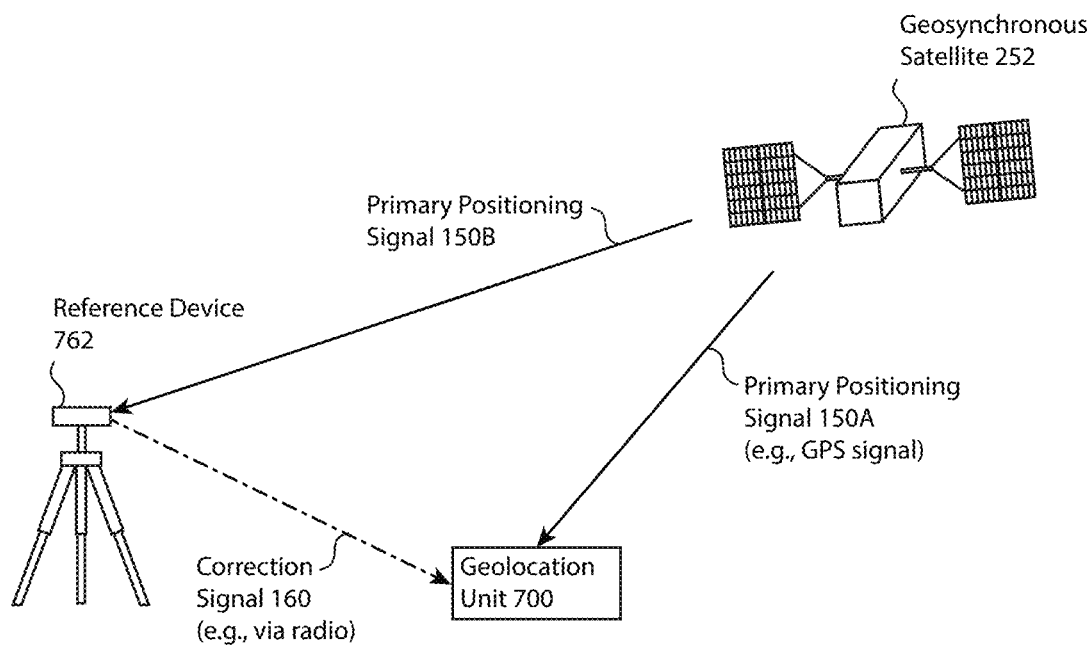
FIG. 7A illustrates an example configuration of positioning signals that can be utilized to generate geospatial data, specifically a geosynchronous satellite for a primary positioning signal and a reference device for a correction signal, according to one or more embodiments.
Figure 7B:
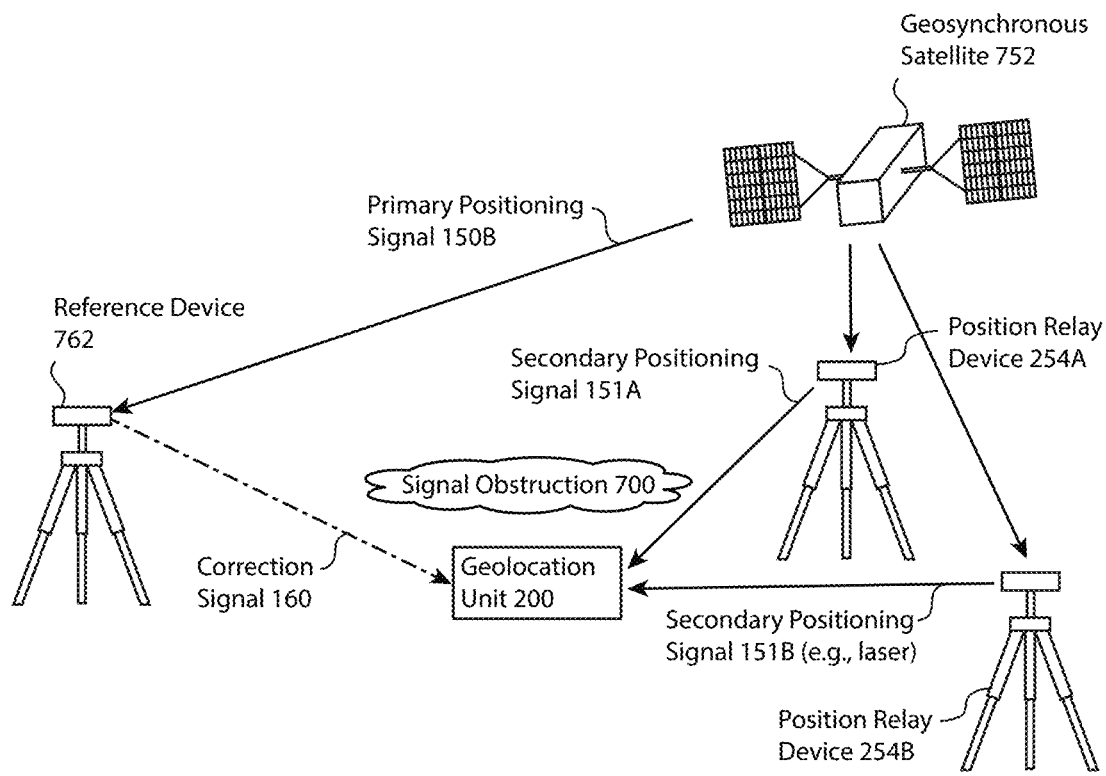
FIG. 7B illustrates another example configuration of positioning signals that can be utilized to generate geospatial data, specifically a geosynchronous satellite for a primary positioning signal, one or more position relay devices providing a secondary positioning signal, and a reference device for a correction signal, according to one or more embodiments.
Figure 7C:
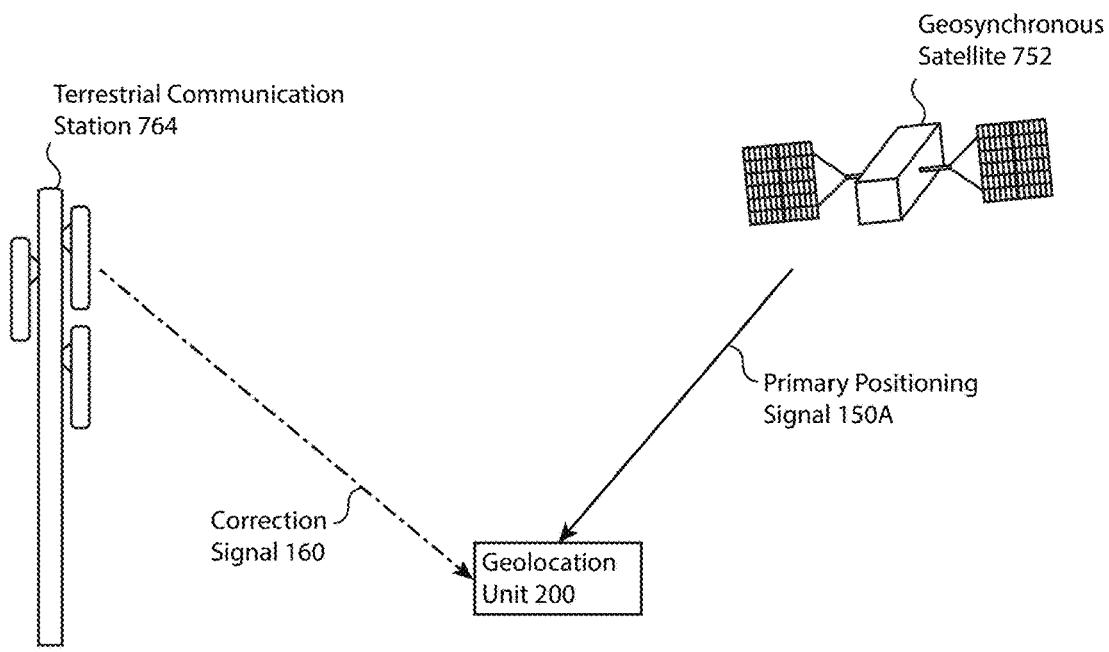
FIG. 7C illustrates yet another example configuration of positioning signals that can be utilized to generate geospatial data, specifically a geosynchronous satellite for a primary positioning signal and a terrestrial communication station providing a correction signal, according to one or more embodiments.

FIG. 7A through FIG. 7C illustrate various configurations for providing positioning signals, including the primary positioning signal 150A and a correction signal 160. FIG. 7A illustrates an example configuration of positioning signals that can be utilized to generate geospatial data, specifically a geosynchronous satellite 752 for the primary positioning signal 150 and a reference device 762 for a correction signal 160, according to one or more embodiments. The geosynchronous satellite 752 may, for example, be a satellite from a global navigation satellite system, such as a GPS satellite and/or GLONASS satellite. The geolocation unit 200 may receive the primary positioning signal 150 on a UBLOX ZED-F9P (i.e., the chip name). The reference device 762 may receive the primary positioning signal 150B and generate correction data that may be communicated to the geolocation unit 200 to increase precision. The reference device 762 may be, for example, a tripod-mounted, survey-grade base station for providing correction data. In one or more embodiments, the reference device 762 may be and/or may be comprised of Xbee Pro 900HP in communication with the geolocation unit 200 through 802.15.4 900 mhz link.

FIG. 7B illustrates another example configuration of positioning signals that can be utilized to generate geospatial data, specifically a geosynchronous satellite 752 for a primary positioning signal, one or more position relay devices 254 (e.g., shown as the position relay device 254A and the position relay device 254B) providing secondary positioning signals 151 (e.g., the secondary positioning signal 151A and the secondary positioning signal 151B), and optionally the reference device 762 for a correction signal 160, according to one or more embodiments. The position relay devices 254, for example, may convert one type of positioning signal (e.g., a GPS signal) to another (e.g., laser and/or LIDAR) in order to obtain position of the geolocation unit 200 despite an obstruction 700 that may be a physical obstruction (e.g., bushes, trees, concrete ceilings) and/or surface of interference (e.g., electromagnetic interference that may require a more powerful stationary receiver on the position relay device 254 to overcome). In one or more embodiments, use of one or more position relay devices 254 may also provide enough precision and/or accuracy such that a reference device 762 may not be needed. In one or more embodiments, for example, the position relay device 254 may be a Trimble® X12 laser scanner (which is specific LIDAR model). Many configurations of emission and/or detection are possible with respect to the geolocation unit 200 and the position relay devices 254. For example, the geolocation unit 200 may include an emitter detected by the position relay devices 254, a detector for receiving a signal emitted by the position relay devices 254, and/or a reflector for reflecting a signal emitted by the position relay devices 254 back to an emission detector on position relay devices 254.

FIG. 7C illustrates yet another example configuration of positioning signals that can be utilized to generate geospatial data, specifically a geosynchronous satellite 752 for a primary positioning signal 150A and a terrestrial communication station 764 providing a correction signal 160, according to one or more embodiments. In one or more embodiments, the terrestrial communication station 764 may be a cell phone tower providing correction data over 3G, 4G, LTE, 5G and/or other cellular data protocols. In one or more embodiments, the protocol utilized may be NTRIP. In another example, the terrestrial communication station 764 may be a specially setup and configured station for providing geospatial correction data, for example RTCM3. Although not shown, the terrestrial communication station 764 may also function to backhaul data and/or implement the network 108 (including without limitation providing communicative coupling between and among the geolocation unit 200, the coordination device 300, support device 400, and/or server 500).

Figure 7D:
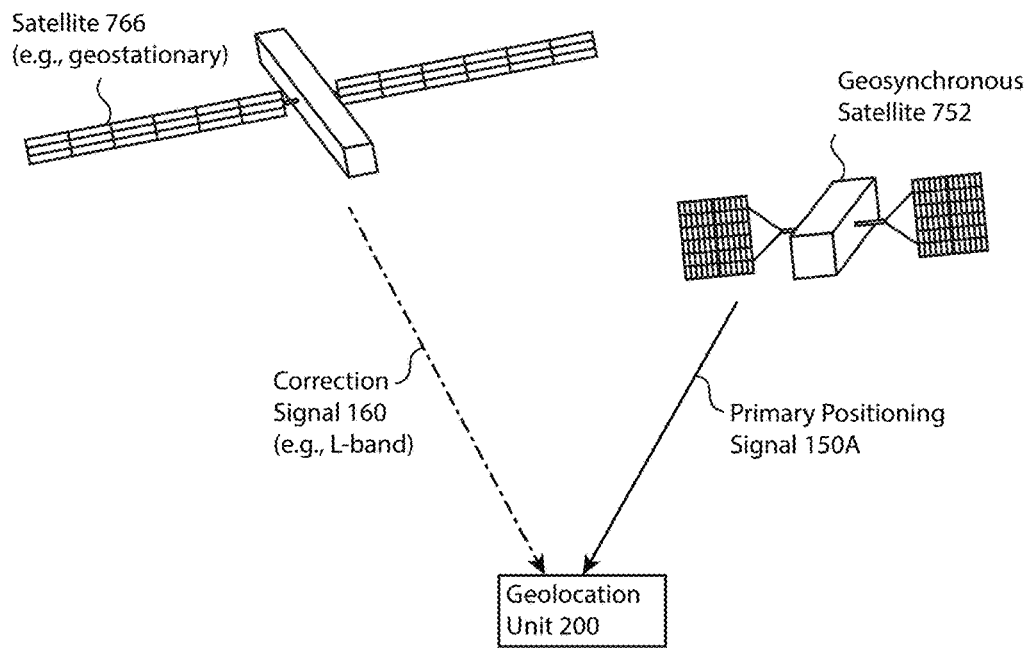
FIG. 7D illustrates still another example configuration of positioning signals that can be utilized to generate geospatial data, specifically a geosynchronous satellite (e.g., a mid Earth orbit (MEO) satellite and/or low Earth orbit satellite (LEO)) for a primary positioning signal and another geosynchronous satellite (e.g., a geosynchronous orbit (GEO) satellite) providing a correction signal, according to one or more embodiments.

FIG. 7D illustrates still another example configuration of positioning signals that can be utilized to generate geospatial data, specifically a geosynchronous satellite 752 (e.g., a mid Earth orbit satellite and/or low earth orbit satellite) for a primary positioning signal 150A and another geosynchronous satellite 766 (e.g., a geostationary satellite) providing a correction signal 160, according to one or more embodiments. For example, the correction signal 160 may be an L-band correction signal broadcast from a PointPerfect® geostationary satellite, where the geolocation unit 200 may receive the L-band signal on a Ublox® NEO-D9S signal receiver.

FIG. 7A through FIG. 7C, although generally a single instance of a satellite and/or reference device 762 is shown in each figure, it will be obvious to one skilled in the art that multiple instances may be utilized and/or contribute to positioning, including from mixed and/or coordinating systems. For example, a primary positioning signal 150 may be provided by both GPS satellites and GLONASS satellites to improve positioning accuracy. In addition, it will be appreciated that, while four possible configurations are shown, sources for the primary positioning signal 150, secondary positing signal 151, and/or correction signal 160 may have elements mixed, matched, recombined, and/or replaced. There may be multiple instances of a primary positioning signal 150 and/or a correction signal 160 available to the geolocation unit 200, which may be selected from based on availability, signal strength, precision, and/or other electromagnetic signal qualities or data/signal processing considerations. Automatic switching between primary positing signals 150 and/or correction signals 160 are further shown and described in conjunction with the embodiments of FIG. 2, FIG. 14, and throughout the present embodiments.

In one or more embodiments, and although not shown in conjunction with the embodiments of FIG. 7A through FIG. 7D, it will be appreciated that the correction signal 160 and/or correction data may be provided to the geolocation units 200 through the network 108 or another data connection, for example determined by and relayed through the coordination device 300.

Figure 8A:
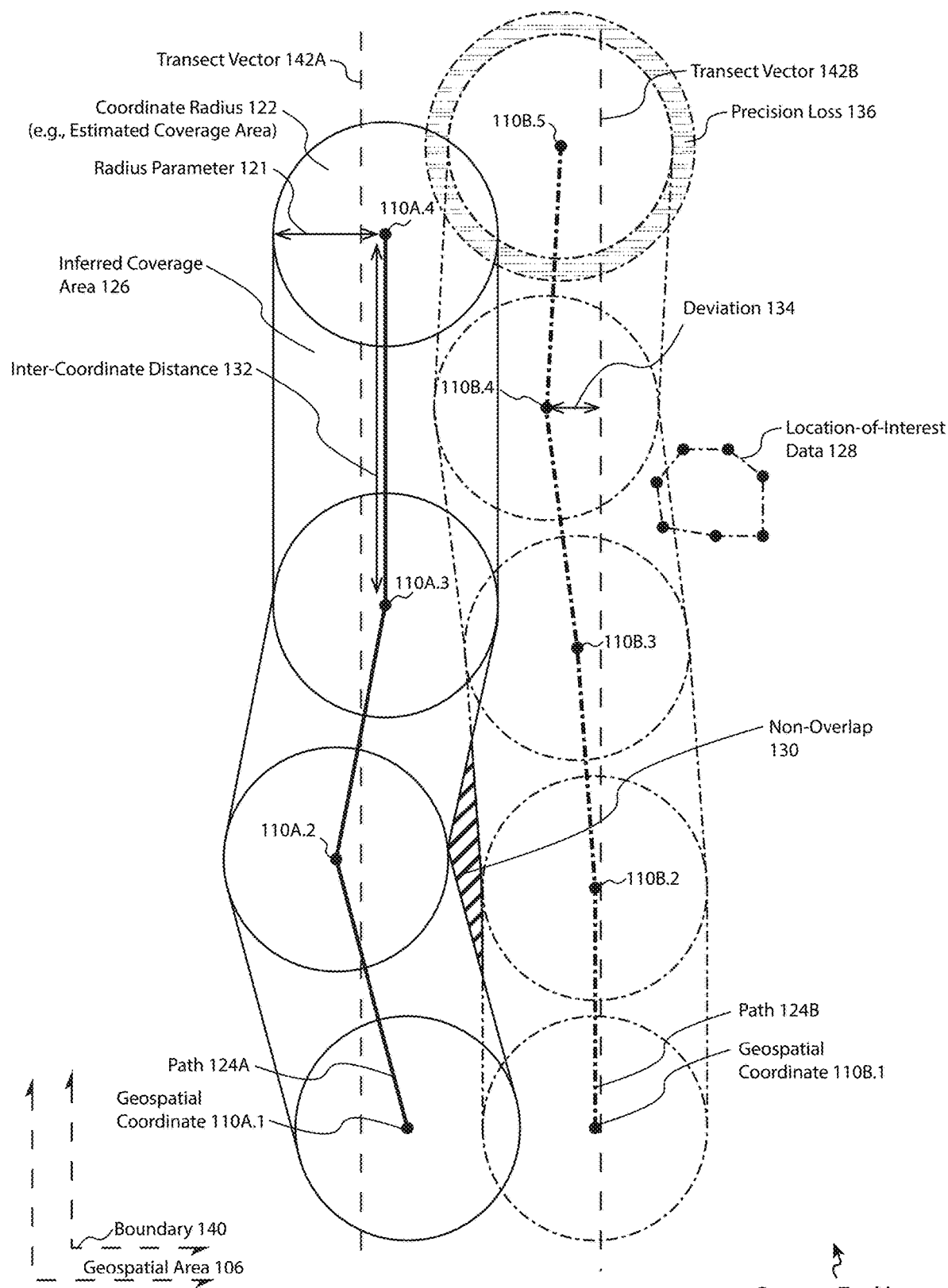
FIG. 8A illustrates a coverage tracking view in which geospatial coordinates may be generated (e.g., by the geolocation unit of FIG. 2 and processed within the geospatial area, e.g., by the coordination device of FIG. 3), including generation of a path, determining of estimated coverage area of a detector, generation of inferred coverage area, and multiple data quality alerts, for example coverage non-overlap alerts, a precision alert or precision alerts designating a loss of threshold precision, and/or transect deviation alerts, according to one or more embodiments.

FIG. 8A illustrates a coverage tracking view 850A, according to one or more embodiments. In one or more embodiments, the geospatial area 106 may include a boundary 140 that may be defined in data, for example as a collection of geospatial coordinates and/or geofence that when connected forms and includes area and/or volume. Within the geospatial area 106 and/or within the boundary 140 may be defined additional data to assist one or more operators 100 in searching for the object 104, for example transect vectors 142 that may have been defined to assist in orderly and/or efficient search, and/or optional "digital rope lanes". The transect vector 142 also may be utilized to specify "lanes". In the present application, "transect vector" (e.g., the transect vector 142) does need not to be strait, nor need to transect one or more side of the geospatial area 106 and/or boundary 140. For example, the transect vector 142 may be a curved path or irregular path intended to be followed by one or more operators 100. In one or more embodiments, however, it should be noted that no transect vectors 142 are needed and/or utilized. One advantage to one or more of the present embodiments is the ability to track search coverage and overlap without the use of preexisting geospatial site setup for the geospatial area 106. The path 124 may be stored as a path data, which may include for example coordinates for each point within the path.

In one or more embodiments and the embodiment of FIG. 8A, an operator 100A associated with a geolocation unit 200A (both of which are omitted in the figure) detects along a path within the boundary 140 of the geospatial area 106. The path may be along a predefined transect vector 142A. The geolocation unit 200A samples as a predefined rate, randomly, and/or upon certain conditions. As shown, the geolocation unit 200A produces the geospatial coordination 120A.1, the geospatial coordination 120A.2, the geospatial coordination 120A.3, and the geospatial coordination 120A.4. The detector 102 may have an estimated coverage area that may be defined through an estimated coverage area 122 generated by a radius parameter 121. As just one example, a human user 101A with a backpack-mounted geolocation unit 200A and a handheld magnetometer may be assumed to have an estimated detection diameter of 1 meter or 1.5 meters from each geospatial coordinate 110 having sufficient precision compared to a predetermined value. In such example, the radius parameter 121 may be 0.5 meters or 0.75 meters, respectively, and the estimated coverage area would be a circle with radius equal to 0.5 meters or 0.75 meters. As previously noted, other shape and size parameters may be utilized as well when determining estimated coverage area around one or more geospatial coordinates 110.

In one or more embodiments, a path 124 may be calculated between two or more geospatial coordinates. In the present example, a path 124A is calculated between each of the geospatial coordinate 110A through the geospatial coordinate 110D. The path 124A is illustrated as directly connected between each of the geospatial coordinate 110A through the geospatial coordinate 110D, however, in one or more other embodiments the path 124 may be mathematically fit to, or otherwise placed with respect to, the geospatial data generated by the geolocation unit 200.

An inferred coverage area 126 may be calculated along the path 124. For example, the inferred coverage area 126 may be calculated as an offset from the path (e.g., an offset by the radius parameter 121 or a different parameter). In one or more embodiments, however, it should be recognized that a path 124 and/or inferred coverage area 126 need not be calculated. For example, especially where the sample rate of geospatial coordinates 110 is relatively high (e.g., every 100 ms for an operator 100 moving an average of 1 meter per second), the entire search tracking coverage may be determined from estimated coverage area calculated as the estimated coverage area 122 around each instance of the geospatial coordinate 110 in the geospatial dataset.

In one or more embodiments, an instantaneous velocity may be calculated for the geolocation unit 200, for example at each geospatial coordinate 110. In a simple example, a timestamp of a first geospatial coordinate 110A.3 (e.g., the timestamp 112A.3), minus the timestamp of the second geospatial coordinate 110A.4 (e.g., the timestamp 112A.4), divided by the inter-coordinate distance 132 between geospatial coordinates, may result in an instantaneous velocity at the second geospatial coordinate 110A.4. In one or more other embodiments, the instantaneous velocity may be calculated as an average across three or more points. For example, the instantaneously velocity at the geospatial coordinate 110A.4 may be calculated by subtracting a timestamp associated with the geospatial coordinate 110A.4 from the timestamp associated with the geospatial coordinate 110A.2, divided by the distance of a portion of the path 124A from the geospatial coordinate 110A.2 from the geospatial coordinate 110A.4 (or, alternatively, a direct path or distance calculated from the geospatial coordinate 110A.2 to the geospatial coordinate 110A.4).

In one or more embodiments, each of the geospatial coordinates 110 for calculation of an instantaneous velocity and/or an average velocity may be stored in computing memory and/or buffered in memory (e.g., the memory 203, the memory 303, the memory 304). The memory configured to store the geospatial coordinates for calculation of the instantons and/or average velocity may be referred to as a velocity array. In one or more embodiments, two or more geospatial coordinates 110 may be stored in a first-in-last-out velocity array and the average velocity may be calculated as a rolling average of each of the two or more geospatial coordinates 110 stored in the velocity array. For example, in the present embodiment of FIG. 8A, where the velocity array stored four geospatial coordinates 110, a first-in geospatial coordinate 110 would be the geospatial coordinate 110A.1, which would then be removed from the velocity array when a new geospatial coordinate 110A.5 (not shown) entered the velocity array. In such case, the instantiations velocity may be calculated between the geospatial coordinate 110A.1 and the geospatial coordinate 110A.4. In a next round, the instantiations velocity may be calculated between the geospatial coordinate 110A.2 and the geospatial coordinate 110A.5, etc. In one or more embodiments, the first geospatial coordinate 110 (e.g., the geospatial coordinate 110A.1) of the two or more geospatial coordinates 110 may be an initial coordinate in the velocity array and the second geospatial coordinate (e.g., the geospatial coordinate 110A.4) of the two or more geospatial coordinates 110 may be a final coordinate in the velocity array.

FIG. 8A also illustrates tracking coverage of either (a) a second geolocation unit 200B having a detector 102B (not shown), or (b) the same instance of the geolocation unit 200A on a second and/or later traverse. For illustration purposes only, the present discussion will proceed as if a different geolocation unit 200B was utilized to follow the transect vector 142B. The geolocation unit 200B may generate the geospatial coordinates 110B.1 through the geospatial coordinate 110B.5. While searching, the operator 100B may discover and/or may wish to mark a point of interest, for example an obstruction, an area of unusual detection activity of the detector 102, and/or another point of interest. The operator 100 may make a selection to change data modes, and/or otherwise engage in behavior that may be identified as a point of interest, to result in the location of interest data 128. Specifically, as shown, the location of interest data 128 may be a collection of seven geospatial data points, the geospatial coordinate 110B.6 though the geospatial coordinate 110B.12. In one or more embodiments, when the selection mode is deactivated, a path may be calculated to close all geospatial points such that a bounded area and/or volume may be created.

The coverage tracking view 850A may be used to demonstrate several instances of data quality alerts. In one aspect, a data quality alert may involve calculation of an instantaneous velocity, for example as shown and described above. A data quality alert may be automatically determined by comparing the instantaneous velocity to a predetermined threshold. The data quality alert may be communicated to one or more operators 100 on one or more devices and/or servers (e.g., the support device 400, the tracking coordination device 300, the server 500). In one or more embodiments, the velocity violation may be designated (e.g., on the area map 318) in one or more ways, for example by highlighting the geospatial coordinate 110 and all area within the estimated coverage area 122. In another example, an entire distance over which the instantons velocity and/or average velocity is calculated may be designated and/or highlighted on a graphical user interface. For example, as shown in FIG. 8A, where the velocity array compared the geospatial coordinate 110A.1 and the geospatial coordinate 110A.2, all estimated coverage area and inferred coverage area 126 shown for the path 124A.

In another aspect, a quality alert may include a non-overlap 130. The non-overlap 130 region, area, and/or location may be calculated through a variety of means based on the geolocation data of one or more geolocation units 200. The non-overlap 130 may be calculated mathematically and/or graphically, as shown and described herein, and/or through other methods that may be known in the art of geospatial data processing. In one method, as shown and described throughout the present embodiments, the non-overlap 130 may be calculated as an uncovered area existing between the offsets and/or estimated coverage area 122 is extended away from each of the path 124A and the path 124B. In one or more other embodiments, the non-overlap 130 may be determined and/or calculated graphically, for example by plotting and overlaying points, paths resulting therefrom, and/or radii or path buffers and then providing graphical analysis to determine uncovered pixels. In one or more embodiments, coordinate and/or vector data may be periodically converted to scalable pixel maps to purge computation-heavy data (e.g., once per second, once per 10 seconds, once per operational pause as may be initiated by the coordination device 300, etc.) The area of non-overlap 130 may be designated on a graphical user interface (e.g., on the area map 318).

In one or more embodiments, a data quality alert may include a deviation 134 from a transect vector 142B and/or crossing or nearing another geospatial point or boundary (and/or other geospatial feature within a geospatial dataset, e.g., the boundary 140, the edge and/or offset of another path 124, etc.). A deviation alert may be communicated to one or more operators 100 on one or more devices and/or servers (e.g., the support device 400, the tracking coordination device 300, and/or the server 500). A location and/or area of deviation 134 may be designated on a graphical user interface, for example on an overlay of the area map 318. The deviation may be graphically designated with a color or visual texture around a geospatial coordinate 110 where the deviation 134 was calculated, and/or an area extending along a path 124 until geospatial coordinates 110 are within a deviation parameter, e.g., in order to conservatively designate an area for re-covering with the search and/or the detector 102.

In one or more embodiments, a data quality alert may include a precision loss 136. There may be a precision value associated with each geospatial coordinate 110, as may be improved and/or provided by the correction signal 160, e.g., a precision value in the NMEA string. Where the precision value exceeds a threshold precision (which may be referred to as a threshold precision value), at a geospatial coordinate 110, a quality alert may be generated. A location and/or area of precision loss may be designated on a graphical user interface, for example on an overlay of the area map 318. The loss of precision may be graphically designated with a color and/or visual texture around a geospatial coordinate 110 where the loss of precision was detected, and/or an area extending along a path 124 until geospatial coordinates 110 are within a precision threshold, e.g., in order to conservatively designate an area for re-covering with the search, inspection and/or the detector 102.

Figure 8B:
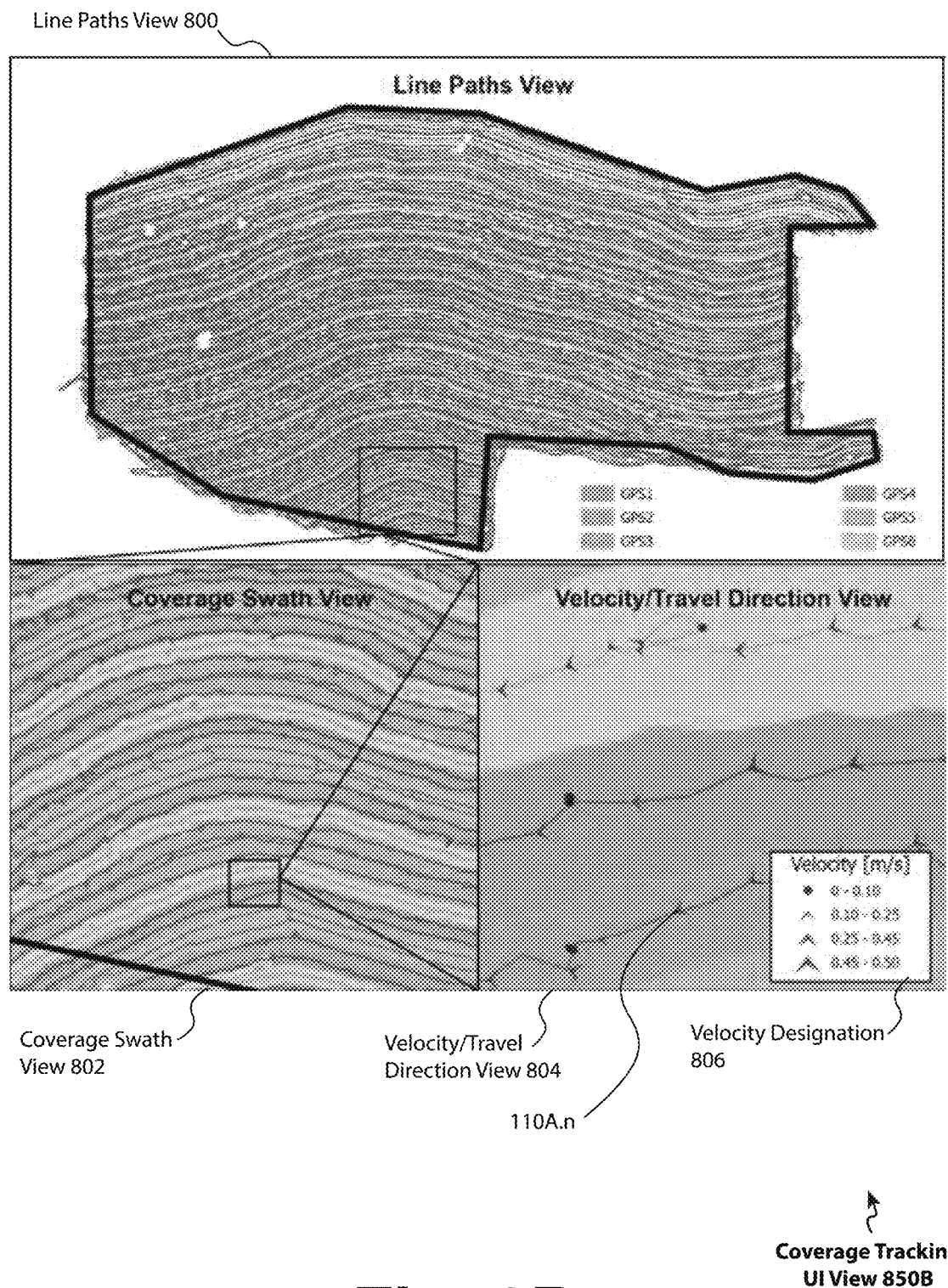
FIG. 8B illustrates a coverage tracking view of example data gathered from the example of FIG. 6B, including a line path view of the geospatial area, an expanded coverage swath view, and an even more expanded velocity/travel direction view which can include auditable data on instantaneous velocity, according to one or more embodiments.

FIG. 8B illustrates a coverage tracking view 850B, according to one or more embodiments. FIG. 8B shows example data gathered from the example of FIG. 6B, including a line path view 800 of the geospatial area (located at the top of FIG. 8B), an expanded coverage swath view 802 (located in the bottom left of FIG. 8B), and an even more expanded velocity/travel direction view 804 (located in the bottom right of FIG. 8B), according to one or more embodiments. The line path view 800 illustrates a visualization of the geospatial data of the paths (e.g., the paths 124) of six operators 100, labeled as "GPS1" through "GPS6". The geospatial area 106 may have been defined by a boundary 140 that may be a bounded eighteen-sized polygon of irregular shape. For context, the area inside the boundary is about 19 acres. In the present example, an exterior boundary at the top of the geospatial area 106 was initially used as a guide by the team 600 (e.g., the top boundary). The team 600 moved across the geospatial area 106, sweeping the area in a back-and-forth pattern. Although not shown in color, it will be appreciated that each of the line paths were six different colors when represented on a graphical user interface.

A portion of the line paths view 800 is shown expanded to illustrate the coverage swath view 802. Coverage swath view 802 illustrates an inferred coverage area 126 of each operator 100. A radius parameter 121 and/or a path offset buffer was set to 1.5 meters from geospatial coordinates 110 and the path 124 derived therefrom.

A portion of the coverage swath view 802 is again expanded to illustrate the velocity/travel direction view 804. Each collected instance of the geospatial coordinate 110 may include a velocity designation 806. The velocity designation 806 can be visibly represented on the graphical user interface. In the present embodiment, the velocity designation 806 is shown as an arrow indicating a direction of travel, with a size of the arrow indicating an instantaneous and/or average velocity in meters per second, and a solid dot indicating a slow or unmoving instance of the geospatial coordinate 110. In the present example, sample rate was set to 1 HZ, and the users 101 who acted as the operators 100 moved at approximately 0.5 meters per second. The project specification was at or below 0.5 m/s.

In the present example, the team leader, the user 101X, viewed the instantaneous velocity of each user 101 who was a member of the team 600. However, the geospatial dataset collected and shown in FIG. 8B includes sufficient information to determine if traverse and/or swath met the search specifications and/or criteria for velocity and overlap. In one or more embodiments, the line paths view 800, the coverage swatch view 802, and the velocity/travel direction view 804 may be available in real time on the coordination device 300 and/or through the server 500, where each view may be a degree of zoom on the graphical user interface.

Figure 9A:
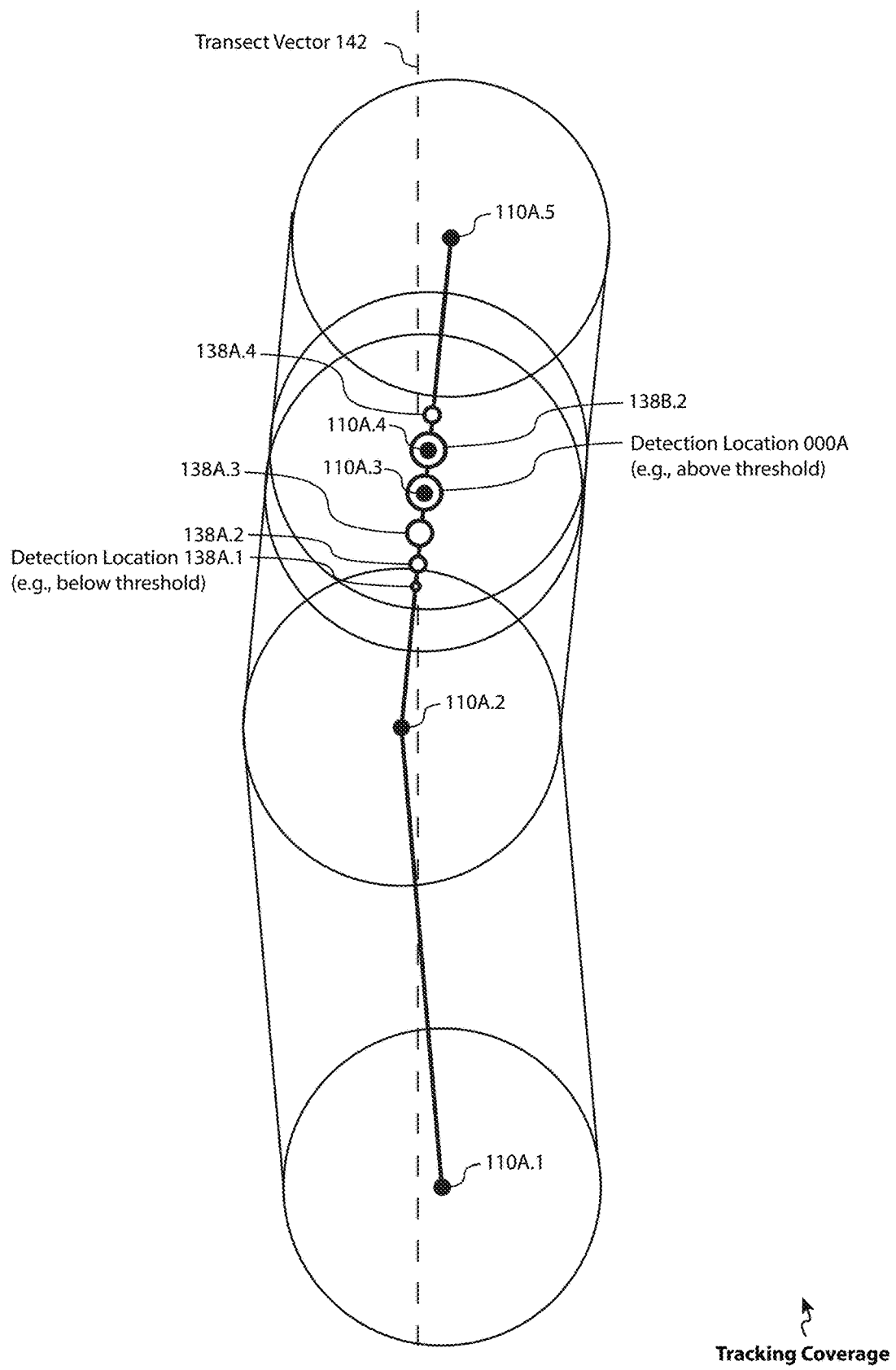
FIG. 9A illustrates a tracking coverage view in which geospatial data generation, transmission, and/or storage may be based on and/or triggered by an event such as a detection signal above a detection threshold, according to one or more embodiments.

FIG. 9A illustrates a coverage tracking view 950A, according to one or more embodiments. In one or more embodiments and the embodiment of FIG. 9A, the operator 100 such as a user 101 may be searching through the geospatial area 106, for example as shown and described in conjunction with the embodiment of FIG. 8A and throughout the present embodiments. For example, the user 101 may be following a transect vector 142 alone or in coordination with a team 600. The geolocation unit 200 may have a standard sample rate based on time and/or distance (e.g., one geospatial coordinate 110 transmitted per second, one geospatial coordinate transmitted per meter of travel).

Alternatively, or in addition, FIG. 9A illustrates that the generation, transmission, and/or storage of geospatial coordinates 110 may be based on signals and/or data generated by the detector 102. In one or more embodiments, the detector 102 may generate a signal and/or data (e.g., the detection signal 170) that indicates whether the object 104 is likely near the detector 102, the nature or type of the object 104, and/or the probability of the object 104 being near the detector. The signal and/or data (e.g., the detection signal 170) may be compared to a threshold value and/or or criteria that can me matched against (including, without limitation, a signature recognition process and/or a pattern recognition process). Where the threshold is exceeded or a signature or pattern is determined to be present, geospatial data may be generated, for example for transmission to the coordination device 300.

As illustrated in FIG. 9A, the geospatial coordinate 110A.1, the geospatial coordinate 110A.2, and the geospatial coordinate 110A.5 may be periodic geospatial coordinate locations produced according to the sample rate. In contrast, the geospatial coordinate 110A.3 and the geospatial coordinate 110A.4 may be produced as a result of exceeding a detection threshold. For example, as the operator 100 searches, the detector 102 may produce a weak detection signal at the detection location 138A.1, indicated by a small unfilled circle. Shortly thereafter, the detection signal may increase at the detection location 138A.2, and then increase again at the detection location 138A.3, both also indicated by unfilled circles. At the detection location 138B.1, the detector threshold may be exceeded and the geolocation coordinate 110A.3 generated and/or transmitted, for example from the geolocation unit 200 to the coordination device 300. Similarly, at the detection location 138B.2, the detector threshold may be exceeded and the geolocation coordinate 110A.3 generated and/or transmitted. In one or more embodiments, the sample rate may be increased depending on the detection strength and/or threshold. For example, the sample rate may be increased from once per second to once per 100 milliseconds the first time that the detection threshold is exceeded.

Data quality alerts may also result from detection thresholds. For example, where a detection threshold is exceeded but the operator 100 and/or geolocation unit 200 does not produce geospatial data indicating that a pace of traverse and/or a travel velocity slowed or stopped, and/or a location of interest is not defined, it may indicate that an object 104 was missed or not investigated. In another example of a data quality alert, if a detection signal exceeds a threshold but no point of interest or other required data is defined (e.g., the location of interest data 128), then the object 104 may have been missed or not investigated.

Although not shown in FIG. 9A, another example of a data quality alert can be a temporal overlap violation, for example that coverage did not overlap within a time threshold (e.g., 10 seconds, 1 minute, 1 day, 1 year). This may be an appropriate parameter where the object 104 searched for may move within a time horizon and/or with an expected or potential velocity. For example, for a tortoise survey to determine live tortoises in a sample area, it may be appropriate to set the overlap to 5 minutes. In another example, where small bodies of isolated water are to be searched for a floating instance of the object 104, a bounded geofence may be established as a geospatial layer (e.g., the boundary 140 of the geospatial area 106) and the temporal overlap requirement applied to the area within the boundary 140.

Figure 9B:
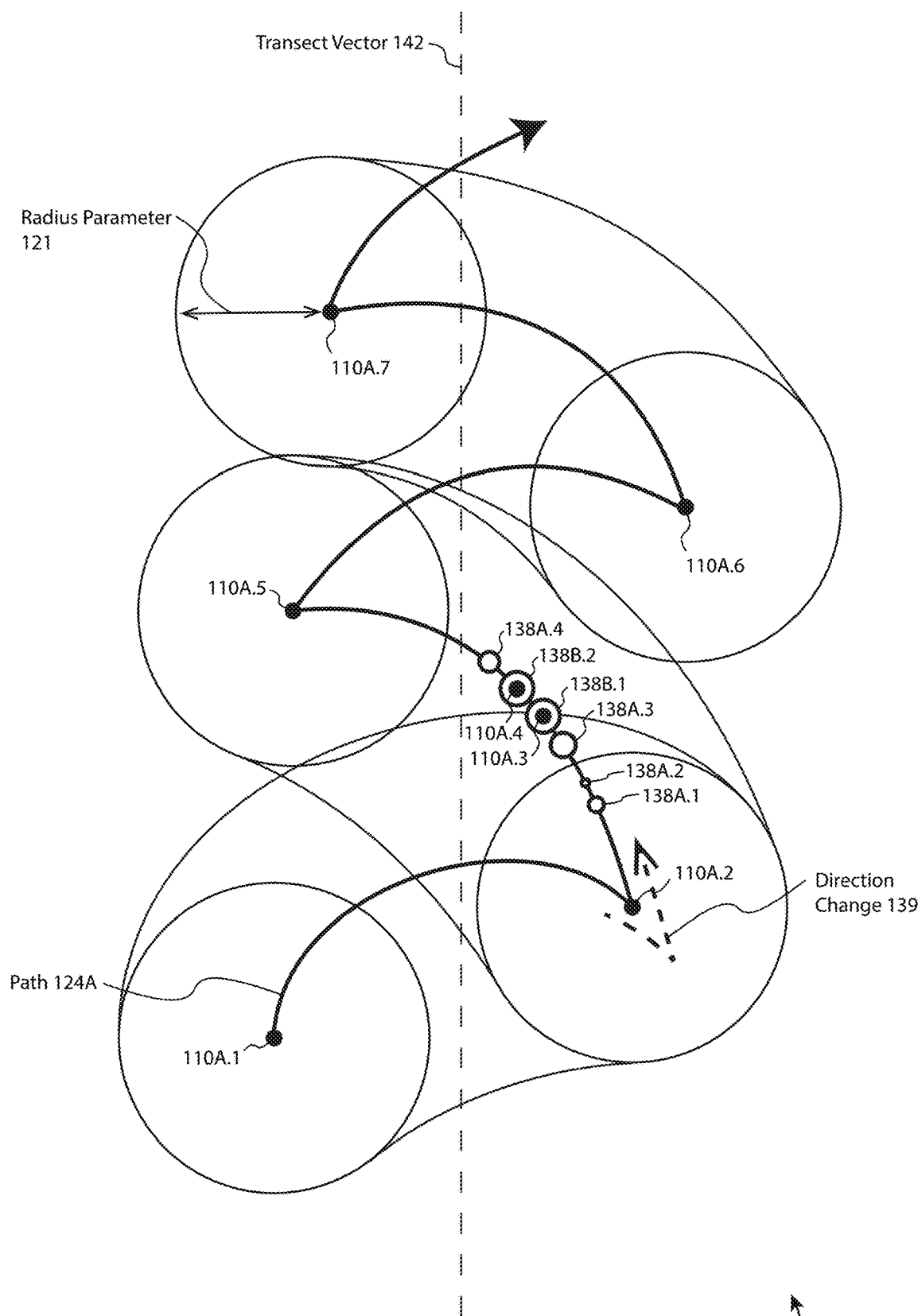
FIG. 9B illustrates a coverage tracking view in which a direction change and/or acceleration change of the detector may be utilized to initiate generation of a geospatial coordinate, for example to detect a change in direction of a magnetometer, and further illustrates a path that may be an arc determined from accelerometer and/or IMU data and/or inferred from a set of geospatial coordinates initiated by direction changes of the detector, according to one or more embodiments.

FIG. 9B illustrates a coverage tracking view 950B, according to one or more embodiments. In one or more embodiments and the embodiment of FIG. 9A, a detector 102, an operator 100, a geolocation unit 200, and/or the support device 400 may include position detector 103 (e.g., as further shown and described in conjunction with FIG. 2). The position detector 103 may be, for example, an IMU and/or accelerometer. In one or more embodiments and the embodiment of FIG. 9B, a detected change in acceleration, velocity, direction, and/or jerk may initiate generation, recordation, and/or generation of a geospatial coordinate 110. In the present example, a geospatial coordinate 110A.1 may be initiated to start coverage tracking of a detector 102 having physically associated position detector 103. An operator 100 such as a user 101 may then swing the magnetometer to the "right" as the search progresses (e.g., which may be along a "forward" direction of the transect vector 142). When the user 101 stops the detector 102 to initiate the direction change 139, the position detector 103 may initiate, record, store, and/or generate the geospatial coordinate 110A.2. The process may repeat for each direction change occurring at the geospatial coordinate 110A.5, the geospatial coordinate 110A.6, and the geospatial coordinate 110A.7 (the geospatial coordinate 110A.3 and the geospatial coordinate 110A.4 may result from processes other than the direction change 139, and are further discussed below). A path 124 may be inferred between each geospatial coordinate 110. The shape or function of the inferred path may be dependent on an estimated or anticipated motion of the detector 102 and/or the element to which the position detector 103 is physically associated. In one or more embodiments and the embodiment of FIG. 9A, the path 124A may be an arc equal to an approximate swing radius of a detector head of a hand-held magnetometer when "sweeping" to the left or right in front of the user 101. For example, a typical arc swing length, depending on the type of magnetometer, the size of the user 101, and the position which the user 101 is holding their arm, may be approximately 1 meter. The arc shape or radius may be further determined from data processing of geolocation data. For example, a higher sample rate may be initially utilized to determine a typical arc of a team 600 and/or individual users 101. The arc may be fit through a variety of methods known in the art. As just one example, a line may be used to correct two points (e.g., an arc or circle of the appropriate radius is fit such that two points on the arc or circle include the geospatial coordinate 110A.1 and the geospatial coordinate 110A.2). Although arcs are discussed, any other anticipated shape can be fit, for example zig-zag patterns, sinusoidal waves, or other travel patterns.

FIG. 9B also illustrates generating geospatial data from a direction change 139 in combination with geospatial data initiated, stored, collected, and/or generated as a result of the detection signal 170. As further shown and described in conjunction with FIG. 9A, a first detection signal 170 below a threshold may occur at detection location 138A.1 and detection location 138A.2, whereas a detection signal 170 above a threshold may occur at detection location 138B.1 and detection location 138B.2, resulting in a geospatial coordinate 110A.3 and geospatial coordinate 110A.4. Other geospatial data collection modes are also possible to be used in combination, for example periodic and/or random sampling.

The position detector 103 may also be utilized to trigger data quality alerts. For example, even where the geolocation unit 200 is moving under a velocity threshold, a data quality alert may occur where the detector 102 and/or position detector 103 exceeds a velocity threshold. This may help prevent a magnetometer or other detector 102 moving too quickly over a local area, even where the geolocation unit 200 is proceeding within the velocity threshold.

FIG. 10 illustrates a geospatial project tracking process flow 1050, according to one or more embodiments. Operation 1000 initiates project setup. Personnel may define a geospatial area 106, including optionally setting up boundaries 140 and/or transect vectors 142, or other guides or information. Additional data layers may also be incorporated, for example geospatial data from past tracking coverage, known obstacles or hazards, areas of sensitive environmental concern, overlayed configuration parameters, areas of high or low estimated concentrations of the object 104, etc. Operation 1000 may occur off-site (e.g., pre-project setup), and/or may be completed or supplemented solely in the field. For example, in one or more embodiments the user may access a user interface (e.g., on the coordination device 300) where the user 101 can select an aerial or satellite photograph, define broad geospatial boundaries 140, and then set transect vectors 142. In one or more embodiments, one advantage is setup can occur solely in the field, including adapting to any present site conditions.

Operation 1000 may initialize the coordination device 300 and/or one or more geolocation units 200. In one or more embodiments, a user interface of the coordination device 300 (e.g., on the display 304) may be used to select and connect to one or more geolocation units 200 through detection, entry, and/or selection of one or more device IDs 205. Similarly, a reference source 260 may be selected or set up, for example a reference device 262 such as a base station 660. In one or more embodiments, a user (e.g., the user 101.1 of FIG. 1) may also test network connectivity or test signal strength, including for the network 108, the primary position signal 150, and/or any correction signal 160, and where options are available, switch to, prioritize, and/or set defaults for each. Other parameters that may be set up may include data quality thresholds (e.g., based on velocity, transect deviation), and data collection modes (e.g., a periodicity of a sample rate, a contingent geospatial coordination generation event such as the detection signal 170 and/or the direction change 139, etc.).

Figure 11:
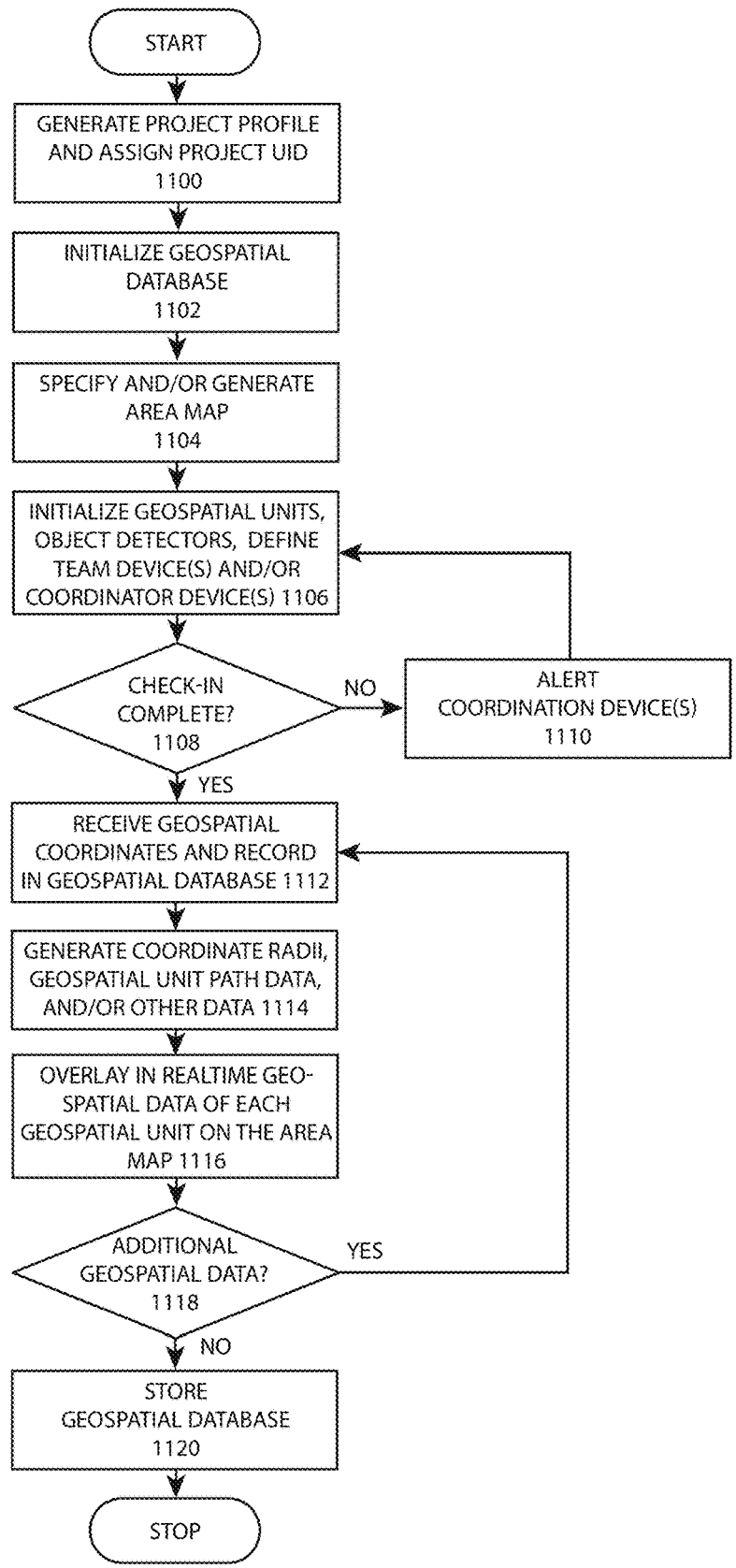
FIG. 11 illustrates a real time overlay process flow in which geospatial data may be overlayed in real time on the coordination device and/or a client device communicating with the server, for example to determine the progress, status, and/or nature of search coverage, according to one or more embodiments.

In one or more embodiments, an initialization process may include operation 1100, operation 1102, operation 1104, operation 1106, operation 1008, and/or operation 1110, as shown and described in conjunction with FIG. 11.

In one or more embodiments, an initialization process may be as follows. One or more geolocation units 200 may be booted (and/or any associated support devices 400), and an operator may wait for positional data to be broadcast to the tracking coordination device 300. Each geolocation unit 200 may be checked on a control point and, once accuracy tolerance is achieved (as ma be viewable on the tracking coordination device 300), recording of positional data and/or generation of the geospatial coordinates 110 may be enabled.

Operation 1002 may begin the collection of geospatial data. For example, a leader of the team 600 (e.g., the user 101.1) may select "start data collection" on a user interface of the coordination device 300 and verbally or otherwise (e.g., through a message sent to the support device 400) request for the team 600 to start collecting geospatial data. The user 101.1 may be able to start or stop data collection on any or all of the members of the team 600 (e.g., any operator 100), and/or switch data collection modes on one or more members (e.g., to mark an obstacle or define a location of interest data 128). In one or more embodiments, each operator 100 may also be able to start or stop data collection. For example, an instance of the operator 100 that is a user 101 may be able to select a button and/or user interface element on the support device 400 and/or directly on the geolocation unit 200 that may start, stop, and/or change data collection modes.

Operation 1004 preprocesses geospatial data collected by one or more geolocation units 200. In one example, a continuous high-sample stream of geolocation data may be generated by each geolocation unit 200, but only a portion selected and/or transmitted to the coordination device 300, e.g., at a reduced sample rate. As another example, an instantaneous velocity may be calculated, as shown and described in conjunction with FIG. 3 and FIG. 13, but occurring in the geolocation unit 200 and/or support device 400, such that each geospatial coordinate 110 communicated to the coordination device 300 may include an associated instantaneous velocity. In another example, coordinate attenuation and/or stripping may occur, such as shown and described in conjunction with FIG. 2 and FIG. 16. Operation 1000 may also reconstitute the attenuated and/or stripped data, for example at the coordination device 300 and/or the server 500, as shown and described throughout the present embodiments. In yet another example, data for a detection signal 170 may be paired with geospatial coordinates 110, including selection of paired geospatial coordinates 110 for transmission based on the detection signal 170. Other data preprocessing can include digital geophysical mapping It should be noted that, in one or more other embodiments, each entry 312 generated may include full data as to geospatial coordinate 110, instantaneous velocity data, and/or detection signal 170 data, such that the geospatial data may be conducive to a greater set of data transformations and/or manipulations. For example, where all data for detection signal 170 is transmitted, a heatmap may be able to be generated and/or normalized based on all detection data, not just that received over a certain threshold.

Operation 1006 optionally tracks geospatial position and/or local relative position of an detector 102. Tracking geospatial position and corresponding generation of geospatial coordinates 110 may be conducted as shown and described throughout the present embodiments. Determination of local relative position of the detector 102 is shown and described in conjunction with FIG. 2, FIG. 3, FIG. 9A, FIG. 9B, FIG. 17, and throughout the present embodiments. It should be noted that in one or more embodiment, no detector 102 is required, but rather human perception may be utilized to track search and/or inspection coverage. In one or more embodiments, the detector 102 is a canine or other animal (e.g., a canine trained to smell scent).

Operation 1008 receives geospatial data for search tracking coverage. For example, the geospatial data may be received at the coordination device 300 and/or the server 500 (or the instance of the server that may be the battlefield intelligence system 550). It is also possible for geospatial data to be received and stored on computer readable memory local to and/or dedicated to each geolocation unit 200. For example, in one or more embodiments, including in cases where the geolocation unit 200 may have limited memory, the support device 400 can also receive and store a complete copy of all data generated by the geolocation unit 200 during data collection. This may be beneficial, for example, where the coordination device 300 fails or its data gets corrupted and field data may need to be re-created from each of the support devices 400. As another example, the coordination device 300 may only collect reduced or attenuated data (e.g., to ensure adequate storage on the coordination device 300 and/or efficient bandwidth use of the network 108), but additional data may need to be retrieved from the support device 400 in certain instances (e.g., an accident occurs). In one or more embodiments, full datasets may also be uploaded and/or backhauled from each of the geolocation units 200 to the server 500, either during or after fieldwork.

Operation 1010 generates a real time overlay of the geospatial data on the area map, as shown and described in FIG. 3, FIG. 8B, FIG. 11, and throughout the present embodiments. Operation 1012 may generate quality alerts for data thresholds, for example as shown and described in conjunction with FIG. 3, FIG. 8A, FIG. 13, and throughout the present embodiments. Operation 1014 may generate data quality alerts for overlap thresholds, for example as shown and described in conjunction with FIG. 3, FIG. 8A, FIG. 12, and throughout the present embodiments. Operation 1016 may generate data quality alerts for transect deviation thresholds, for example as shown and described in conjunction with FIG. 3, FIG. 8A, FIG. 15, and throughout the present embodiments. At any time following operation 1002, operation 1018 may automatically switch a primary positioning signal 150 and/or a correction signal 160, for example as shown and described in conjunction with FIG. 3, FIG. 14, and throughout the present embodiments. Although not shown in FIG. 10, additional data quality alerts may be utilized, for example where a detection signal 170 exceeds a threshold but no investigation occurs as inferred from geospatial data and/or lack of a location of interest data 128.

FIG. 11 is a real time overlay process flow 1150, according to one or more embodiments. Operation 1100 generates a project profile that describes the project, designates a storage location for its files, associates one or more users with the project, and assigns a unique identifier. In one or more embodiments, Operation 1100 may define a project file 522 as shown and described in conjunction with FIG. 5, including any generation and/or assignment of a project UID. Operation 1102 initializes a geospatial database such as the geospatial database 510. In one or more embodiments, operation 1102 may initialize the geospatial database in .csv, .shp. .gdb, .pdf, of other formats. Operation 1104 specifies and/or generates an area map 318. The area map 318 for example may be downloaded from a third party government or non-government source (e.g., company archives, Google Earth®, the United States Geological Survey (USGS), Planet Labs®), and/or may be defined through on-site aerial photography, including use of aerial photography from drones. On-site aerial photography may be calibrated through the use of one or more visual control points on the ground, including natural and/or artificial control points. Operation 1106 may then initialize one or more geolocation units 200, detectors 102, define any team devices (e.g., support devices 400), and/or one or more coordination devices 300. In one or more embodiments, initialization may occur as shown and described in conjunction with FIG. 10.

In one or more embodiments, each device communicating over the network 108 and/or otherwise in communication may be mapped on a network map displayed on the user interface of one or more of the coordination devices 300, where each device mapped may be able to be pinged if in two-way communication, or where a last signal received can be listed or displayed, along with any connectivity, signal strength, precision, and/or data quality warning indicator visible. A system status may be visible indicating that all defined elements and/or devices are in communication and within nominal operation and quality parameters.

In one or more embodiments, each of the operators 100 may also check in prior to data collection. This may be useful, for example, where each element or device of the network 108 and/or geospatial tracking system 190 are in communication but the project is such that is beneficial if all operators 100 move or act in concert. For example, at least one procedure for search coverage may include the team 600 progressing side-by-side as an area is "swept." With one or more of the present embodiments and the detailed data resulting, such process is likely not required, but still may remain an industry practice, a required operating procedure in manuals or regulations, or general method of organization to assist efficiency. A team leader (e.g., the user 100.1) may send a signal, ping, and/or request for one or more of the geolocation units 200 to check in. The requests may be one or more electronic requests that may be sent to the support device 400, for example for each user 101 of the team 600 to confirm on a graphical user interface.

Operation 1108 determines if the check-in is complete, for example each device such as each coordination device 300 and/or support device 400 has "checked in" or indicated they are ready. If not, operation 1108 may proceed to operation 1110 which may generate an alert at each of the one or more coordination devices 300, for example a status indicator on the network map, a graphical user interface pop-up, and/or another indicator. If the check-in is successfully completed, operation 1108 may proceed to operation 1112.

Operation 1112 receives one or more geospatial coordinates 110 and records the one or more geospatial coordinates 110 in a geospatial database, for example the geospatial database 310. The one or more geospatial coordinates 110 may be received as, and/or stored as, part of each entry 312. Operation 1114 may generate a coordinate radius, geolocation unit path data, and/or other data, for example an offset from the geospatial path data. The coordinate radii may be generated based on a radius parameter 121, for example for an estimated coverage area 122 around each geospatial coordinate 110. Alternatively, or in addition, the geolocation unit path data may be generated, for example data specifying a path 124 that is fit to and/or drawn between two or more instances of the geospatial coordinates 110. Optionally, a path buffer may be determined from the path data (which may be based on the radius parameter 121 or a buffer parameter). In one or more embodiments, especially where the sample rate of geospatial coordinates 110 is relatively high (e.g., 1 per 10 milliseconds, 1 per 100 milliseconds at 0.5 meters per second velocity, 2 per second at 1 meter per second velocity), only coordinate radii may be utilized. In one or more other embodiments, especially where sample rate may be relatively low, paths and path offsets and/or buffers may be calculated and utilized.

The generation of coordinate radii and/or path offsets may optionally occur through a graphical method. In one or more embodiments, the radius parameter and/or an offset parameter may be graphically defined at a given resolution or level of zoom of the area map 318. For example, as the map zooms in or out, the coordinate radii may be scaled using a formula based on pixel scale for that zoom level.

Operation 1116 may overlay in real time geospatial data of each geolocation unit 200 on the area map 318. For example, as each geospatial coordinate 110 is received from each geolocation unit 200, the estimated coverage area 122 may be determined and each geospatial coordinate 110 (and/or any path 124 and optional offset) plotted on the area map 318, for example as a distinct layer of geospatial data. The plotted data may be cumulative, for example ensuring that all or a portion of the previously covered search area remains visible. A user 101.1 may then be able to view and determine the real time positions of each operator 100 and associated tracking coverage.

Operation 1118 determines if there is additional geospatial data for collection. For example, if one or more data streams from operators 100 cease, or the user 101.1 selects to stop collection of data from a user interface of the coordination device 300, then no additional geospatial data may be received. If additional geospatial data is to be received, operation 1118 returns to operation 1112. If no additional geospatial data is received, operation 1118 proceeds to operation 1120. Operation 1120 stores the geospatial database 310, for example in the memory 303 of the coordination device 300, and/or through upload or backhauled to the server 500, according to one or more embodiments. One skilled in the art will recognize that the geospatial coordinates 110 may be continually received and stored, including in the geospatial database 310, in real time and/or in batches, as they are received in operation 1112.

In one or more embodiments, no radius or path offset is required in rendering the geospatial data in real time. For example, the area map 318 may just have plotted points representing the geospatial coordinates 110, and/or lines representing paths 124.

Figure 12:
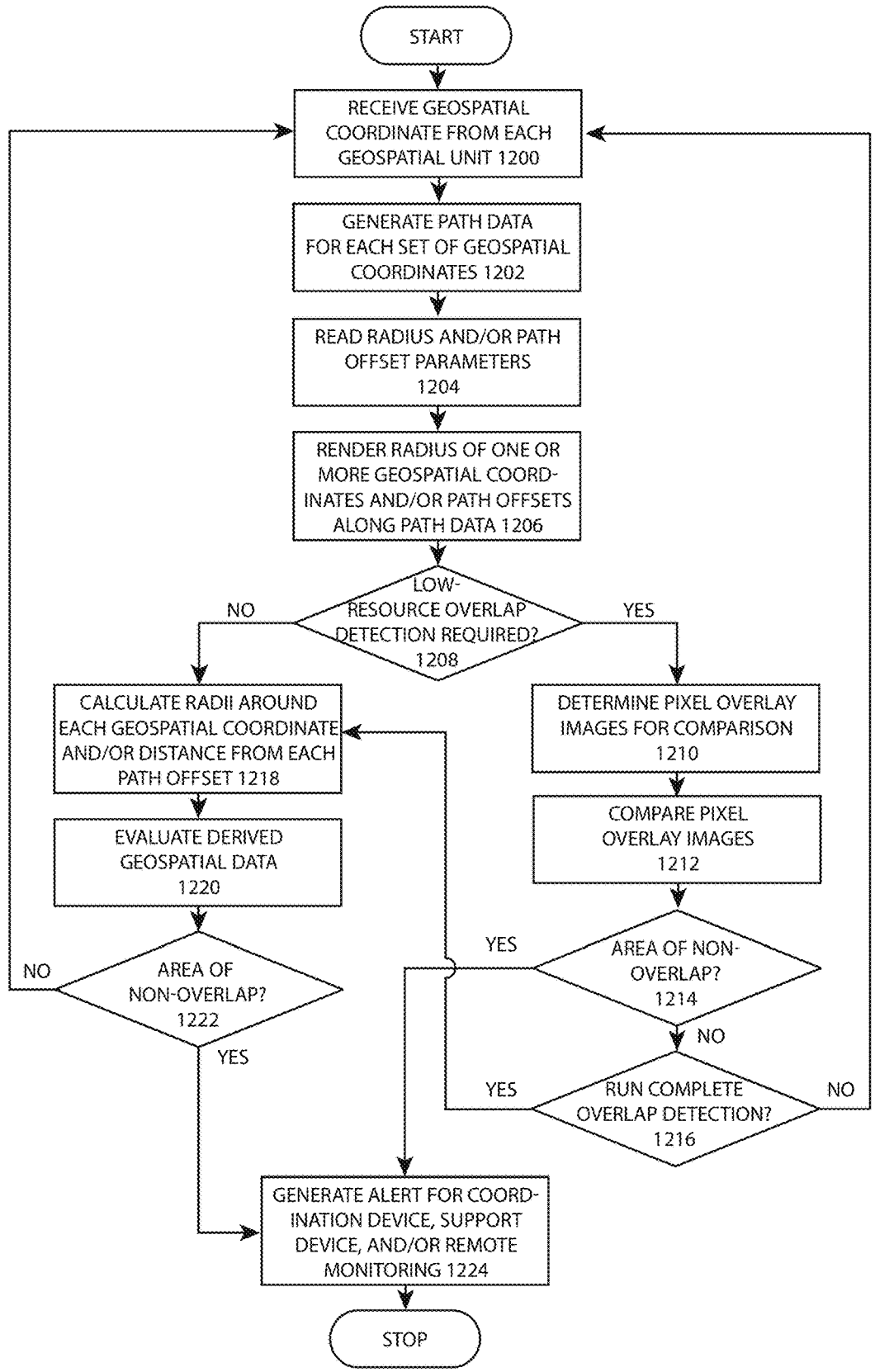
FIG. 12 illustrates a real time gap detection process flow including options for both a low-resource overlap detection process and/or a complete overlap detection process, according to one or more embodiments.

FIG. 12 illustrates a real time gap detection process flow, according to one or more embodiments. Operation 1200 receives one or more geospatial coordinates 110 from each of two or more geolocation units 200, for example a set of one or more geospatial coordinates 110A (e.g., the geospatial coordinate 110A.1 through the geospatial coordinate 110A.n) and a set of two or more geospatial coordinates 110B (e.g., the geospatial coordinate 110B.1 through the geospatial coordinate 110B.n). Optionally, operation 1202 may generate a path data for each of two or more geospatial coordinates 110 within the set of two or more geospatial coordinates 110. Operation 1206 may render a radius of one or more geospatial coordinates 110 and/or render path offsets along each path data.

Operation 1208 may determine whether low resource overlap detection or a complete resource overlap detection is required. In one or more embodiments, a low resource overlap detection may be beneficial: (a) to reduce computing resources for calculating gap detection; (b) more rapid detection of gaps to result in less lag when rendering real time data; (c) to reduce power consumption, for example for rending or geospatial calculation on the coordination device 300; and/or (d) when simultaneously plotting multiple geolocation units 200, including possibly processing many data streams (e.g., five geolocation units 200, ten geolocation units 200, hundreds or thousands of geolocation units 200). Where a low resource overlap detection is required, operation 1208 may proceed to operation 1210. Otherwise, where a complete overlap detection is required, operation 1208 may proceed to operation 1218. In one or more other embodiments, as further described below, both processes may run concurrently, and/or run in different locations. For example, the coordination device 300 may initiate operation 1210, whereas the server 500 may initiate operation 1218, where any data quality alerts may be provided from either source or both sources. For example, there may be some cases in which a gap may not be detected graphically, but may be then detected mathematically based on geospatial data.

Operation 1210 determines two or more pixel overlay images to compare. The determination may be detected based on two adjacent transect vectors 142, may be made manually through a user interface (e.g., a team 600 sweep line may be set up such that a geolocation unit 200 associated with a "red" color is always next to a geolocation unit 200B associated with an "orange" color), may be automatically detected (e.g., adjacent or proximate travel over a set distance or time period), etc. The pixel overlay images may be a pixelized or other graphic translation form of the rendered radius of the two or more geospatial coordinates 110 and/or path offsets along two or more path data as may be generated in operation 1206. For example, where operation 1206 initially may render based on vector data, operation 1210 may translate the vector data into two or more pixel overlays. This may occur periodically in batches, and/or upon certain user-interaction events (e.g., inactivity of all geolocation units 200, a "pause" of data streams by the team leader, etc.). However, in one or more other embodiments, operation 1206 may have directly generated pixelized data. Operation 1212 compares the pixel overlay images. The comparison may be made between geospatial data generated by two different instances of the geolocation unit 200 (e.g., a geolocation unit 200A and a geolocation unit 200B), and/or between the same instance of the geolocation unit 200 at different times (e.g., a geolocation unit 200A traversing two adjacent transect vectors 142.

Operation 1214 determines if an area of non-overlap exists between the two or more pixel overlay images. For example, graphical analysis may determine that the underlying pixels of the area map 318 can be "seen" through the overlay pixels of the geospatial data associated with the compared pixel overlay images. The comparison may wait until a bounded, non-overlap region is formed (e.g., where the geolocation unit 200A and the geolocation unit 200B are overlapping, then diverge, then overlap again, as a result forming a bounded non-overlap region for the period of divergency). In one or more other embodiments, an area of non-overlap may be detected when the geospatial data from each geolocation unit 200 is generated far enough from the area of divergence that it is unlikely that each geolocation unit 200 will change direction to close the gap (e.g., 1 meter, 10 meters, 100 meters, which may be a predefined distance and/or learned value dependent on the radius parameter 121 and/or a velocity of the operator 100). The result may be an unbounded gap which, if the team 600 moves to a new set of transect vectors 142, may form an un-covered "wedge" leading to the outside of the geospatial area 106. Where an area of non-overlap is detected, operation 1214 may proceed to operation 1224. Otherwise, operation 1214 may proceed to operation 1216.

Operation 1216 determines whether to run a complete overlap detection 1216. The complete overlap detection may be based on mathematical and/or geospatial data calculation. In one or more embodiments, operation 1210 through operation 1214 may provide a fast, real-time assessment of gap detection, whereas operation 1218 through operation 1222 may provide a precise and/or mathematically rigorous method for gap detection. If no complete overlap detection is to be initiated, operation 1216 may return to operation 1200 where additional geospatial coordinates 110 may be received. If a complete overlap detection is to be run, operation 1216 proceeds to operation 1218. In one or more embodiments, a low resource overlap detection of operation 1210 through operation 1214 may be executed on the coordination device 300, while a complete overlap detection of operation 1218 though operation 1222 may be executed on the server 500. In one or more other embodiments, a low-resource overlap detection may be run on the coordination device 300 while geospatial data is being collected by the team 600, while a background process with allocated computing resources (e.g., processing time, computing memory) may run the complete overlap detection process.

Operation 1218 may calculate radii around each geospatial coordinate and/or distance from each path 124 offset. Operation 1218 may generate a set of derived geospatial data and/or geospatial coordinates 110 that can be compared for overlap. Operation 1220 may evaluate derived geospatial data. For example, a first circle calculated around a geospatial coordinate 110A and a second circle calculated around a geospatial coordinate 110B can be compared to determine that no point exists within an area inside both the first circle and the second circle. As another example, it can be calculated with regard to a first path offset of a first path 124A forming a first area, and second a path offset of a second path 124B forming a second area, that there is no point shared by both the first area and the second area. Other methods of mathematical comparison will be evident to one skilled in the art of geospatial data processing and/or mathematics. Operation 1222 determines an area of non-overlap. Where a non-overlap is determined, operation 1222 may proceed to operation 1224. Where no area of non-overlap is detected, operation 1222 may return to operation 1200.

In one or more embodiments, especially in such case each detector 102 has a similar estimated coverage area 122, operation 1218 may calculate a distance between each path at one or more points (e.g., the path 124A and the path 124B), where operation 1220 may then compare each distance to a distance threshold to determine a location in which a non-overlap 130 has occurred.

Operation 1224 may generate an alert for one or more devices, for example for the coordination device 300, the support device 400, and/or the server 500 (which may be communicated to a client device communicatively coupled with the server 500, for example for remote monitoring purposes). The alert may be a data quality alert. In one or more embodiments, the alert may include highlighting a portion of the user interface of the coordination device 300 for the user 101.1, may include a subtle notification to the support device 400 (e.g., a vibration of a wearable device), and/or an alert to a quality control specialist. If unaddressed within a certain time period, additional reminders or escalated alerts may be generated (e.g., a text notification generated by the server 500 and transmitted to quality assurance personnel).

Figure 13:
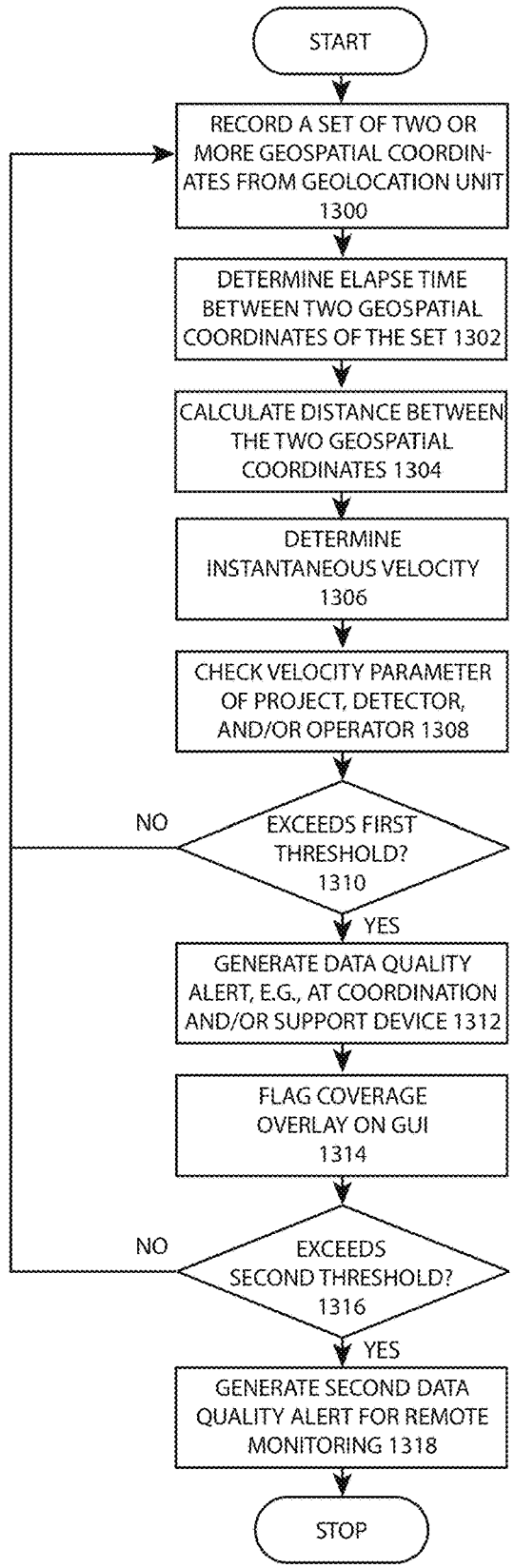
FIG. 13 illustrates a velocity warning process flow usable to increase the probability that an operator does not exceed detection capabilities of a detector and/or velocity project requirements or regulations, according to one or more embodiments.

FIG. 13 is a velocity warning process flow 1350, according to one or more embodiments. Operation 1300 records a set of two or more geospatial coordinates 110 from a geolocation unit 200. For example, the two or more geospatial coordinate 110 may be a first geolocation coordinate 110A.1 and a second geolocation coordinate 110A.2 In another example, there may be one hundred geospatial coordinates, e.g., a geospatial coordinate 110A.1 through a geospatial coordinate 110A.100.

Operation 1302 determines an elapse time between two of the two or more geospatial coordinate 110. For example, an elapse time may be determined between a timestamp of the geospatial coordinate 110A.1 (e.g., the timestamp 112A.1) and a timestamp of the geospatial coordinate 110A.2 (e.g., the timestamp 112A.2). In another example, an elapse time may be determined between a timestamp of the geospatial coordinate 110A.1 (e.g., the timestamp 112A.1) and a timestamp of the geospatial coordinate 110A.100. Operation 1304 may calculate a distance between the two geospatial coordinates 110 compared in operation 1302.

Operation 1306 may determine an instantaneous velocity, for example based on the distance between the two geospatial coordinate 110 and the elapse time between the two geospatial coordinates 110. In one or more embodiments, the instantaneous velocity may become associated with the second geospatial coordinate (e.g., the geospatial coordinate 110A.2 or the geospatial coordinate 110A.100, respectively, in the two present examples). For example, the association may occur within an entry 312 as a portion of the quality data 113. As shown and described in conjunction with the embodiment of FIG. 8B, the instantaneous velocity may be utilized to provide a velocity designation 806 to geospatial data recorded and/or plotted on the area map 318.

Operation 1308 may check a velocity parameter. The velocity parameter may be based on, for example, a project requirement, a regulation, a capability of the detector 102 (e.g., varying strengths of magnetometer), and/or a capability of an operator 100 (e.g., a novice versus an expert user 101). The velocity parameter may be able to be defined in a project configuration file, as may be provided by a quality control specialist or a standard file for an agency (e.g., the Army Corp. of Engineers). In one or more embodiments, there may be one or more thresholds defined in association with the velocity parameter. In one or more embodiments and the embodiment of FIG. 13, the velocity parameter includes a first threshold and a second threshold.

Operation 1310 determines whether a first velocity threshold has been exceeded. Where the first threshold is not exceeded, operation 1310 may return to operation 1300. In the above examples, operation 1300 through operation 1306 may be repeated for two new instances of the geospatial coordinates 110. For example, a geospatial coordinate 110A.2 and a geospatial coordinate 110A.3, or a geospatial coordinate 110A.2 and a geospatial coordinate 110A.101, respectively, in the two running examples). Where the velocity threshold is exceeded, operation 1310 may proceed to operation 1312 which may generate a data quality alert, for example at the coordination device 300, the support device 400, and/or the server 500. Operation 1314 may flag coverage overlay on a graphical user interface, for example of the support device 400. As just one example, and referring to FIG. 8B, a velocity designation 806 may change color (e.g., may be colored red), receive a dynamic visual appearance (e.g., flashing, fading in and out), and/or receive a symbol indicating a data quality violation. Graphical modification to alert a user 101 to velocity violations may be applied before and/or after a geospatial coordinate 110A in which the velocity violation was determined, for example extending backward and forward along each portion of the path 124 to additional geospatial coordinates 110 in which no velocity violation occurred, which may designate an entire portion of tracking coverage which may violate the rules, requirements, regulations, and/or detector 102 or operator 100 capabilities associated with the velocity parameter.

As a particular example, for UXO clearance, the Army Corp of Engineers may specify a velocity of 1 mile per hour (approximately 0.44704 meters per second). Data may need to be re-collected where it is determined that the velocity was exceeded for specific areas.

Operation 1316 determines whether a second threshold has been exceeded. If the second threshold has not been exceeded, operation 1316 may return to operation 1300. Where the second threshold has been exceeded, operation 1316 may proceed to operation 1318. Operation 1318 may generate a second data quality alert for remote monitoring, e.g., transmitted to the server 500 and/or a client device communicatively coupled to the server 500. For example, where the second parameter is exceeded, it may indicate that even less care is being taken in search coverage.

Alternatively, or in addition, the two or more thresholds may be set to create self-regulation of the operators 100 without overwhelming a project manager (e.g., the user 101.1). For example, the first threshold may be below, but close to, a velocity maximum for the project. The alert generated in operation 1312 may be generated and/or received on only the support device 400, for example a small vibration of a smartwatch to remind a user 101.2 that they are close to the velocity threshold. In such example, the second threshold may then be a violation of the velocity threshold prescribed by a project specification or regulatory requirement, resulting in notification to the coordination device 300 for the user 101.1, and a different signal to the user 101.2 (e.g., a more intense vibration, an audible alert) indicating the velocity threshold has been violated and that the user 101.2 should retrace their steps at proper velocity to ensure complete tracking coverage. In one or more embodiments, the velocity parameter may be variable based on numerous factors, for example the type of detector 102, the type of operator 100, weather conditions, visibility, local vegetation (e.g., sand dunes versus high grass), and other factors.

In one or more embodiments, a geospatial layer of parameters may be defined on the area map 318. For example, a geofence or other boundary designation showing an area with one set of configuration parameters may be specified in one area, whereas a different set of parameters may be specified in a different area. As just one example, a flat agricultural field may have specified a configuration parameter including a velocity threshold of 1.5 m/s, whereas an adjacent woodlot may have a specified configuration parameter of a velocity threshold of 1.2 m/s. This may also assist in accommodating the capabilities of different positioning signals such as the secondary positing signal 151A.

FIG. 14 illustrates an automatic signal switching process flow 1450, according to one or more embodiments. Operation 1400 selects one or more positioning sources (e.g., a primary positioning source 250) and/or signals (e.g., the primary positioning signal 150). For example, the project configuration file may specify the primary positioning source 250, the user 101.1 may manually select the primary positioning source 250, and/or a best (e.g., highest signal strength) instance of the primary positioning source 250 may be selected. Operation 1402 may similarly select one or more correction sources (e.g., reference source 260) and/or signals (e.g., the correction signal 160) through a project configuration file, manual selection, and/or automatic evaluation.

Operation 1404 selects a signal strength parameter. The signal strength parameter may data specifying be one or more requirements for positioning and/or correction signal strength (e.g., for the primary positioning signal 150 and/or the correction signal 160). The signal strength parameter may be specified in the project configuration file, manually entered, and/or otherwise set.

Operation 1406 gathers a set of geospatial coordinates 110. Operation 1406 may then proceed to and initiate operation 1408 and/or operation 1410, where operation 1410 may then proceed to operation 1416. Operation 1408 and operation 1416 may run concurrently and/or independent of one another. Operation 1408 may determine if the position signal (e.g., the primary positioning signal 150) is greater than a threshold quality value. If the position signal is greater than the threshold quality value, operation 1408 may proceed to operation 1410. If less than the threshold quality value, operation 1408 may proceed to operation 1412, which may optionally generate a positioning signal alert. In one or more embodiments, the threshold quality may also be a geospatial coordinate precision value. The positing signal alert may be an instance of a quality alert based on signal strength. The alert may be transmitted to one or more members of the team 600, for example to the user 101.1 of the coordination device 300 and/or to the user 101.2 on the support device 400 associated with the coordination device 300 experiencing the positioning signal quality failure. Operation 1412 may then proceed to operation 1414. In one or more embodiments, there may be periodic pings or check-ins between devices through one or more communication links, for example communicating over the network 108, where failure to check in may result in warnings or alerts on one or more of the devices.

Operation 1414 automatically switches to a second instance of the positioning source (e.g., a primary positioning signal 150B). As just one example, if first primary positioning source 150A is GPS, the second primary positioning source 150B may be GLONASS (in one or more other embodiments, both GPS and GLONASS may be utilized simultaneously as a single example of the primary positioning source 250). In another example, a first primary positioning source 150A may be GPS, and a second primary positioning source 150B may be LIDAR utilized to generate geospatial coordinates 110 from a previously determined geospatial control point. In another example, a first primary positioning source 150A may be radio triangulation, and a second primary positioning source 150B may be an inertial positioning unit. Operation 1414 may then proceed back to operation 1406.

Where operation 1408 is within a threshold quality, operation 1408 may proceed to operation 1410 which may generate geospatial position data. The geospatial position data may be uncorrected and may be held in abeyance (e.g., in computer memory) for corresponding correction data from the correction signal 160. Operation 1410 may then proceed to operation 1416.

Operation 1416 may correct the position data to generate a corrected position data. For example, the geospatial position data held in abeyance may be matched with and/or corrected by a correction factor as determined through the correction signal 160 received concurrently with generation of the geospatial coordinates 110 in operation 1416, and/or matches through a timestamp. Operation 1418 may determine whether a correction signal strength and/or quality is greater than a threshold quality. If the signal strength and/or quality (including without limitation a precision) is below the quality threshold, operation 1418 may proceed to operation 1420. Operation 1420 may optionally generate a correction signal alert that may be communicated to one or more users 101, for example through the coordination device 300, the support device 400, and/or the server 500. Operation 1420 may then proceed to operation 1422 which may automatically switch to a second correction source (e.g., a second instance of the reference source 260) and/or signal (e.g., a second instance of the correction signal 160). For example, a reference device 762 such as a base station may be utilized as a reference source 162A, which may then be switched to a correction source such as a cell phone tower (e.g., the terrestrial communication station 764) or a 1-band broadcasting satellite (e.g., the geosynchronous satellite 766).

Referring back to FIG. 7A through FIG. 7D and the accompanying text, in one or more embodiments, operation 1400 and/or operation 1414 may select any of the primary positioning sources illustrated or discussed, and/or operation 1402 and/or operation 1422 may select any of the reference sources illustrated or discussed.

Where the correction signal is above a signal strength and/or quality threshold, operation 1418 may proceed to operation 1424 which may store a geospatial coordinate (e.g., the geospatial coordinate 110) and optionally source data (e.g., the primary positioning source 250 utilized, and/or the reference source 260 utilized). Although not shown in association with the entry 312 of FIG. 3, in one or more embodiments the entry 312 may include and/or store such source data. Operation 1426 determines if data collection is complete. If data collection is ongoing, operation 1426 returns to operation 1406. Otherwise, operation 1426 may proceed to terminate.

In one or more embodiments, the signal strength and/or quality parameters may be stored in and/or dependent on a configuration file overlay. For example, in one or more embodiments, it may be specified that signal strength must be very strong within a wooded area to proceed with GPS, rather than switching to a position relay source (e.g., a position relay device 254). This may assist in ensuring quality data is generated, or that the team 600 is required to stop and set up the position relay device 254 where it is unlikely they will be productive with constant interruption of GPS signal or another primary positioning signal 150 incompatible with the terrain and/or local environment.

Figure 15:
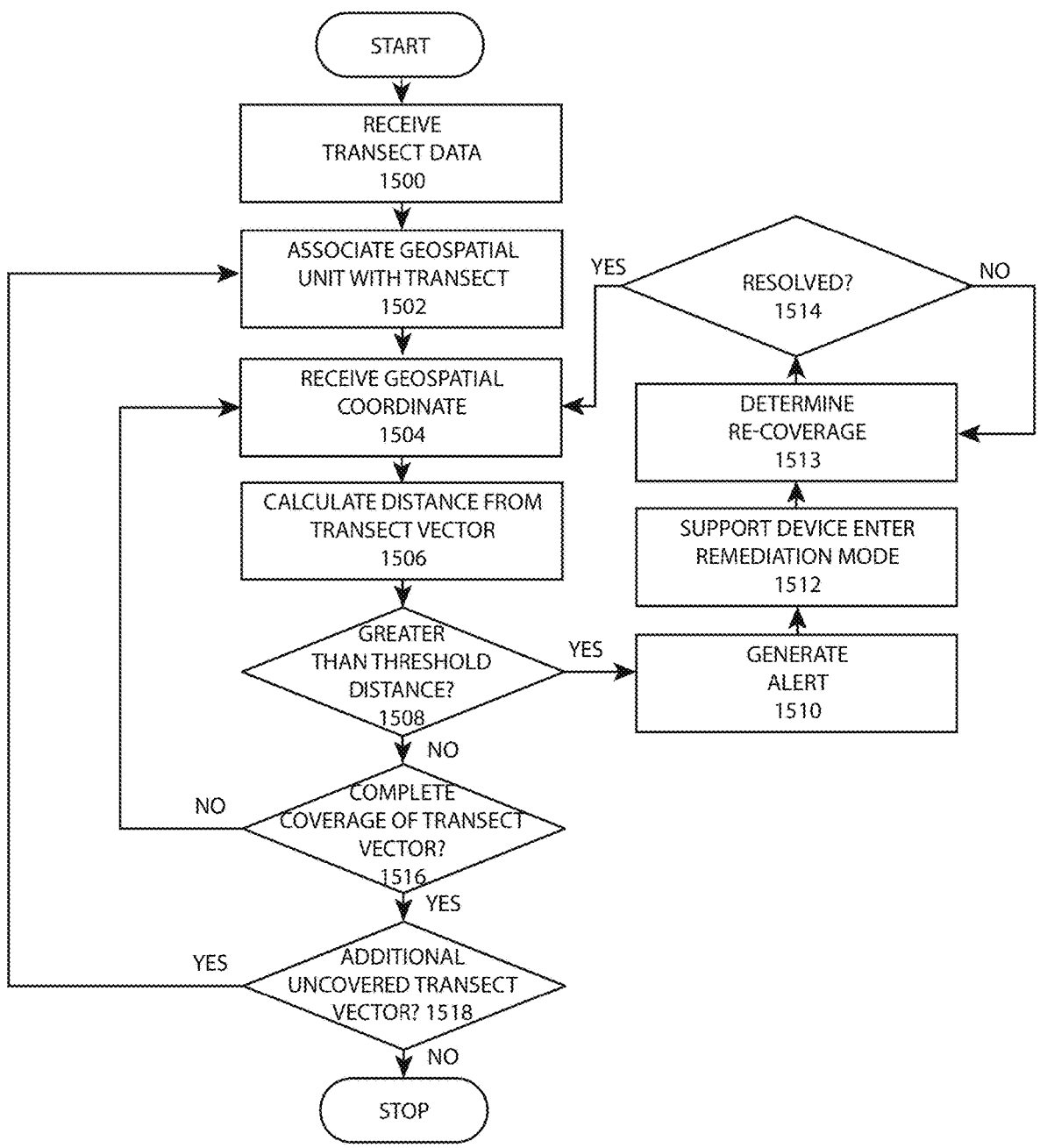
FIG. 15 illustrates deviation warning process flow in which a data quality alert can be generated, and optionally a radiation mode entered to resolve, a deviation of a geolocation unit from a transect vector, according to one or more embodiments.

FIG. 15 illustrates a deviation warning process flow 1550, according to one or more embodiments. Operation 1500 receives a transect data. The transect data may specify one or more transect vectors 142 associated with the geospatial area 106, and as may be plotted on the area map 318. An operation 1501, not shown, may optionally set a transect deviation parameter, for example within the project configuration file. Operation 1502 associates a geolocation unit 200 with a transect vector 142. The association may be predetermined (e.g., color coded transect vectors 142 assigned to a corresponding colored geolocation unit 200), may be manually defined (e.g., a user 101.2 selecting a transect vector 142 on the support device 400 which they are about to traverse, and/or a user 101.1 selecting a transect vector 142 on the coordination device 300 to assign the user 101.2 to traverse a transect vector 142), and/or may be automatically determined (e.g., by determining the user 101.2 has begun traveling along the transect vector 142 for a threshold distance and/or time).

Operation 1504 receives a geospatial coordinate 110. Operation 1504 may receive the geospatial coordinate 110 in the ordinary collection and/or generation of data from the geolocation unit 200. Operation 1506 calculates a distance from the transect vector 142. For example, a closest point on the transect vector 142 may be calculated to the geospatial coordinate 110, and the distance then determined. Operation 1508 determines if the distance from the geospatial coordinate 110 to the transect vector 142 is greater than a threshold distance, operation 1508 may proceed to operation 1510. If less than a threshold distance, in which case operation 1508 may proceed to operation 1516. As an example, in the field of UXO remediation, a threshold distance for a hand-held magnetometer may be 5 meters.

Operation 1510 may generate a data quality alert. The data quality alert may be communicated to the user 101.1 on the coordination device 300, the user 101.2 on the support device 400, and/or one or more other users 101 through the server 500.

Operation 1512 and operation 1514 may be a remediation mode. In one or more embodiments, a remediation mode may be a feedback process which may assist the operator 100, user 101.1 utilizing the coordination device 300, and/or the user 102.2 utilizing the geolocation unit 200 in finding and fixing a data quality issue. In one or more embodiments, the remediation mode may generally determine a data deficiency, alert one or more users 101, and provide real time feedback to the user 101.2 associated with a geolocation unit 200 to fix the data quality issue. In one or more embodiments and the embodiment of FIG. 15, the support device 400 may guide the user 101 to fix the transect deviation. Where the support device 400 includes a display (e.g., the display 404 of FIG. 4), the area map 318 may be displayed including geospatial data generated by the geolocation unit 200 and plotted on the area map 318. Where the support device 400 includes a device for vibration or other haptic alerts, the support device 400 may initiate a first intensity of vibration and/or pattern of vibration that may increase as the user 101 nears the location for remediation, engages in a second intensity of vibration and/or pattern of vibration when it is determined that the user 101 is actively remediating the data quality issue (e.g., calculated to be within the deviation threshold of the transect vector 142), and engage in a third intensity of vibration and/or pattern of vibration when all area that deviated from the transect vector 142 has been remediated. Other indicators may be visual but without a user interface (e.g., a color or intensity of an LED light, such as green for quality data and red for an area requiring remediation), or audible feedback, such as various tones, chimes, and/or melodies. Use of non-display visual, audible, and/or haptic feedback may assist the user 101 performing the search, rather than viewing a graphical user interface, which may itself be advantageous in ensuring proper search and/or inspection coverage by reducing visual distractions. Although transect deviation is utilized as an example of the remediation mode, in one or more embodiments it will be apparent that any geospatial data quality issue among the present embodiments may be similarly remediated, for example primary positioning signal 150 deficiencies, correction signal 160 deficiencies, non-overlap detection, and/or velocity violations.

In one or more embodiments and the present embodiment, operation 1512 initiates the remediation mode of the support device 400. Operation 1513 may determine re-coverage. Operation 1513 and operation 1514 may provide a continual feedback process in which the geospatial "re-coverage" is compared to the portion of initial geospatial coverage having the data quality issue and continual feedback provided to the user 101. Re-coverage may be determined, for example with comparison of an overlay of the original geospatial dataset to the new geospatial dataset, or in this case a distance calculation from the transect vector 142 to an offset calculated from a path 124 geospatial coordinates 110 the new geospatial dataset. Operation 1514 determines if the geospatial area having the data quality deficiency has been resolved. If resolved, operation 1514 proceeds to operation 1504. If not yet resolved, operation 1514 returns to operation 1512.

Where the distance from the transect vector is less than the threshold distance, operation 1508 may proceed to operation 1516. Operation 1516 may determine whether coverage of the transect vector 142 (e.g., traversal from one end to another) is complete. If not complete, operation 1516 returns to operation 1504. However, if complete, operation 1516 proceeds to operation 1518. Operation 1518 determines whether there is an additional uncovered transect vector 142 defined within the geospatial area 106 and/or nearby, in which case operation 1518 retunes to operation 1502. There may be a pause prior to the manual, automatic, and/or other assignment of a new transect vector 142 to the operator 100. Once no additional uncovered transect vectors 142 are present, operation 1518 may terminate.

Figure 16:
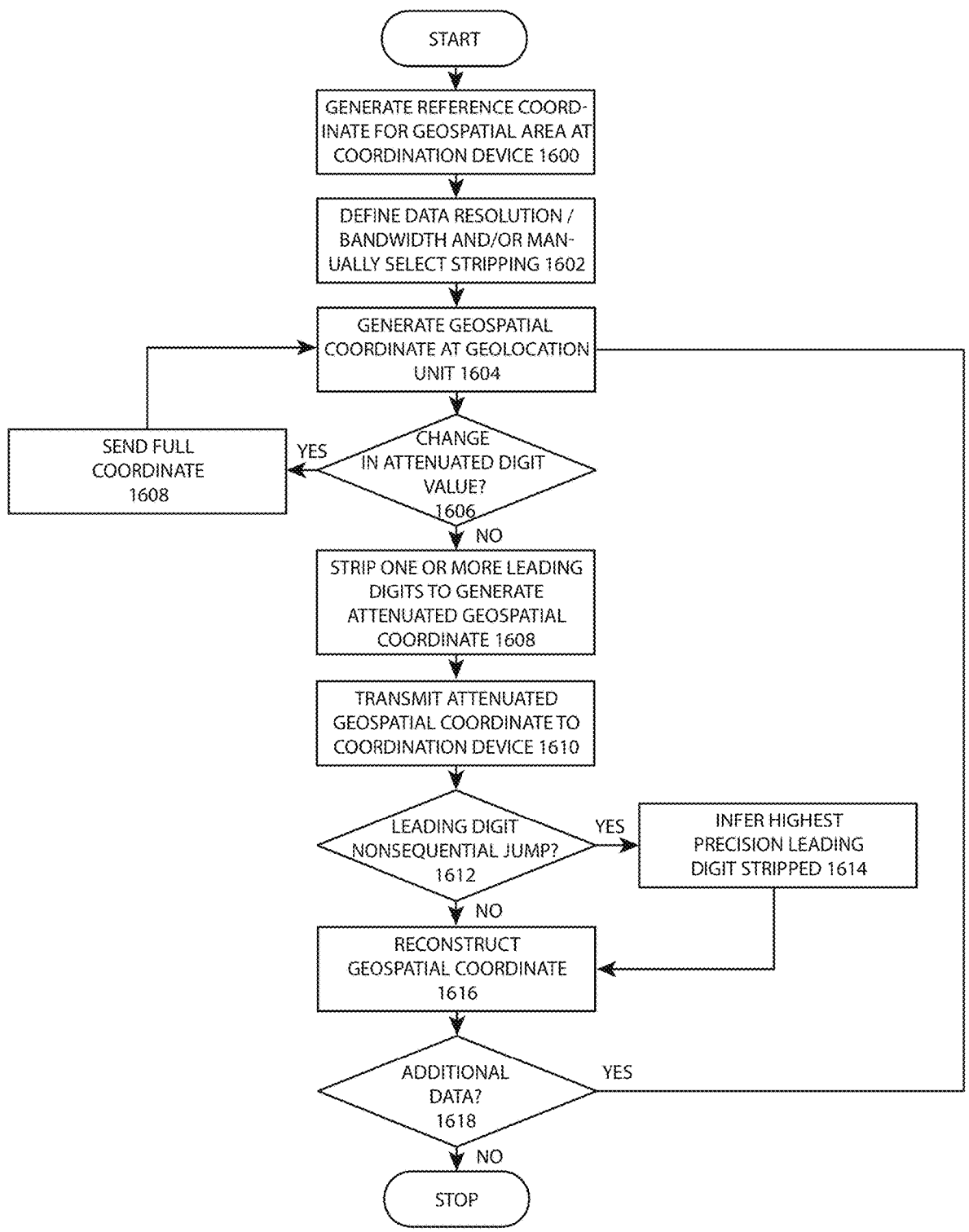
FIG. 16 illustrates a coordinate attenuation process flow in which geospatial coordinates may be attenuated and possibly reconstructed, for example to increase sample rate and/or data storage efficiency, according to one or more embodiments.

FIG. 16 illustrates a coordinate attenuation process flow 1650, according to one or more embodiments. Operation 1600 generates a reference coordinate for a geospatial area 106 at the coordination device 300. The reference coordinate may include a full NMEA string and/or other set of geospatial coordinates. In one or more embodiments, the NMEA string may be based on latitude and longitude coordinates, including for example hundreds' digit that may be utilized to determine latitude from longitude, a tens digit to a position of about 1,000 kilometers, a single digit (e.g., one decimal degree) able to determine a position up to about 111 kilometers (e.g., 60 nautical miles, about 69 miles), a first decimal place able to determine position up to about 11.1 km, and/or a second decimal place able to determine position up to about 1.1 km.

Operation 1602 may define a data resolution, bandwidth, and/or manually select a stripping requirement. Where a data resolution and/or bandwidth is detected, an appropriate stripping requirement may be automatically determined. As just one example, a full NMEA string may be approximately 82 bytes. An attenuated NMEA string with all values above a certain level removed (e.g., remove of the second decimal place and above) may reduce a size of the NMEA string to 27 bytes. Where bandwidth allocation may be 96 bytes to each instance of the coordination device 300 within the team 600, attenuation of the NMEA may result in a 30% of bandwidth, or a corresponding 200% increase in sample rate.

Stripping and attenuated coordinate evaluation may occur both on a geospatial data generation side (e.g., at the geolocation unit 200 and/or the support device 400), and/or at the geospatial data receipt side (e.g., at the coordination device 300 and/or the server 500). Operation 1606 and operation 1608 may be utilized on the generation side, whereas operation 1612 and operation 1614 may be utilized on a receipt side.

Operation 1604 generates a geospatial coordinate 110, for example at the geolocation unit 200. The geospatial coordinate 110 may have a specified digit which to attenuate to, as may be set by operation 1602. For example, the user 101.1 may select a level to which attenuation should occur (e.g., attenuation at or above the second decimal place of latitude and longitude coordinates). In one or more embodiments, operation 1602 may be executed on the coordination device 300 and communicated to each of one or more communicatively coupled instances of the geolocation units 200. The geolocation unit 200 may store the intended attenuation digit as a parameter in computer readable memory.

Operation 1606 and operation 1608 may determine a generation-side process for helping ensure attenuated digits can be reconstructed. Operation 1606 determines a change in an attenuated digit value, that is, a digit above the intended attenuation digit. For example, where the attenuation digit is at or above the second decimal place in latitude and longitude coordinates, operation 1606 would determine a change in an attenuated value where the value of the second decimal place changed when the geospatial coordinate 110 is compared to a previous geospatial coordinate 110.

If a nonsequential jump occurs in the leading digit, operation 1606 may proceed to operation 1608 which may send a full geospatial coordinate (e.g., a full NMEA string) and/or a less attenuated geospatial coordinate.

Where a nonsequential jump is not detected in a leading digit, operation 1606 may proceed to operation 1608, which may strip one or more leading digits to generate the attenuated geospatial coordinate 110. The leading digits may be striped to the intended attenuation digit. Operation 1610 may transmit the attenuated geospatial coordinate 110 to the coordination device 300 (and/or to the server 500). Operation 1612 may determine whether a nonsequential jump has occurred in a leading digit of the attenuated geospatial coordinate 110. A sequential change in the highest leading digit before attenuation (e.g., a change from "4" to "5", or "9" to "8", in the third decimal place) may indicate that no change in the next-highest attenuated digit occurred. In contrast, a nonsequential jump (e.g., a change from "0" to "9", or "9" to "0", or a large jump such as "4" to "8"), may indicate a change in the first attenuated digit may have occurred. If a nonsequential jump occurs in the leading digit, operation 1612 may proceed to operation 1614.

Operation 1614 may infer a highest precision leading digit that was stripped from the attenuated geospatial coordinate 110. For example, where the lowest precision digit of the attenuated geospatial coordinate 110 (e.g., the highest leading digit before attenuation occurs, the third place in the above example) is generally increasing, a non-sequential jump (e.g., "9" to "0") may indicate that the highest precision digit of the attenuated digits (e.g., the second decimal place in the above example) may have increased. Conversely, a non-sequential jump (e.g., "0" to "9") may indicate that the highest precision digit of the attenuated digits may have decreased. The highest precision digit of the attenuated digits may be inferred to have increased. Operation 1614 may then proceed to operation 1616.

Operation 1616 may reconstruct the geospatial coordinate from the attenuated geospatial coordinate. Operation 1616 may add the one or more attenuated digit values, for example as stored in operation 1602, and as may be modified by an inferred values in operation 1604 that may be passed to operation 1616. The reconstructed geospatial coordinate 110 may be stored in the geospatial database 310. Operation 1616 may then proceed to operation 1618. Operation 1618 may determine whether additional data is to be received, in which case operation 1618 returns to operation 1604. Otherwise, operation 1618 may terminate.

Depending on the attenuation selected, it may be uncommon to infer a value of more than the highest precision attenuated digit (e.g., the second decimal place, in the present example). However, it is possible to infer geospatial position change across several non-sequential jumps, and even a magnitude or more. For example, where three non-sequential jumps in the lowest precision digit before attenuation occurs (e.g., the value of the third decimal place moves from "9" to "0" three times), the value of highest precision digit that is attenuated may have increased three times (e.g., the value of the second decimal place may have increased by three).

Another form of data reduction is also possible. In one or more embodiments, a full and/or attenuated NMEA string may be reported along with relative position data, which may be referred to as an base coordinate with a set of tail coordinates. Referring back to the example, in the NMEA string may include a coordinate 4158.8441367, the full NMEA string could be reported, along with "138", "139", and "140", corresponding to 4158.8441378, 4158.8441390, and 4158.8441396, respectively. Where multiple teams 600 are deployed (e.g., a team 600A, a team 600B), each of which may communicate to one or more coordination device 300, bandwidth may be conserved depending on radio frequency or other channels available through time-sharing of bandwidth and reporting the base coordinate with associated tail coordinates in batches within an allocated time slice. This may enable scaling to multiple teams 600 while utilizing a relatively narrow set of bandwidth or other limited communication link.

Figure 17:
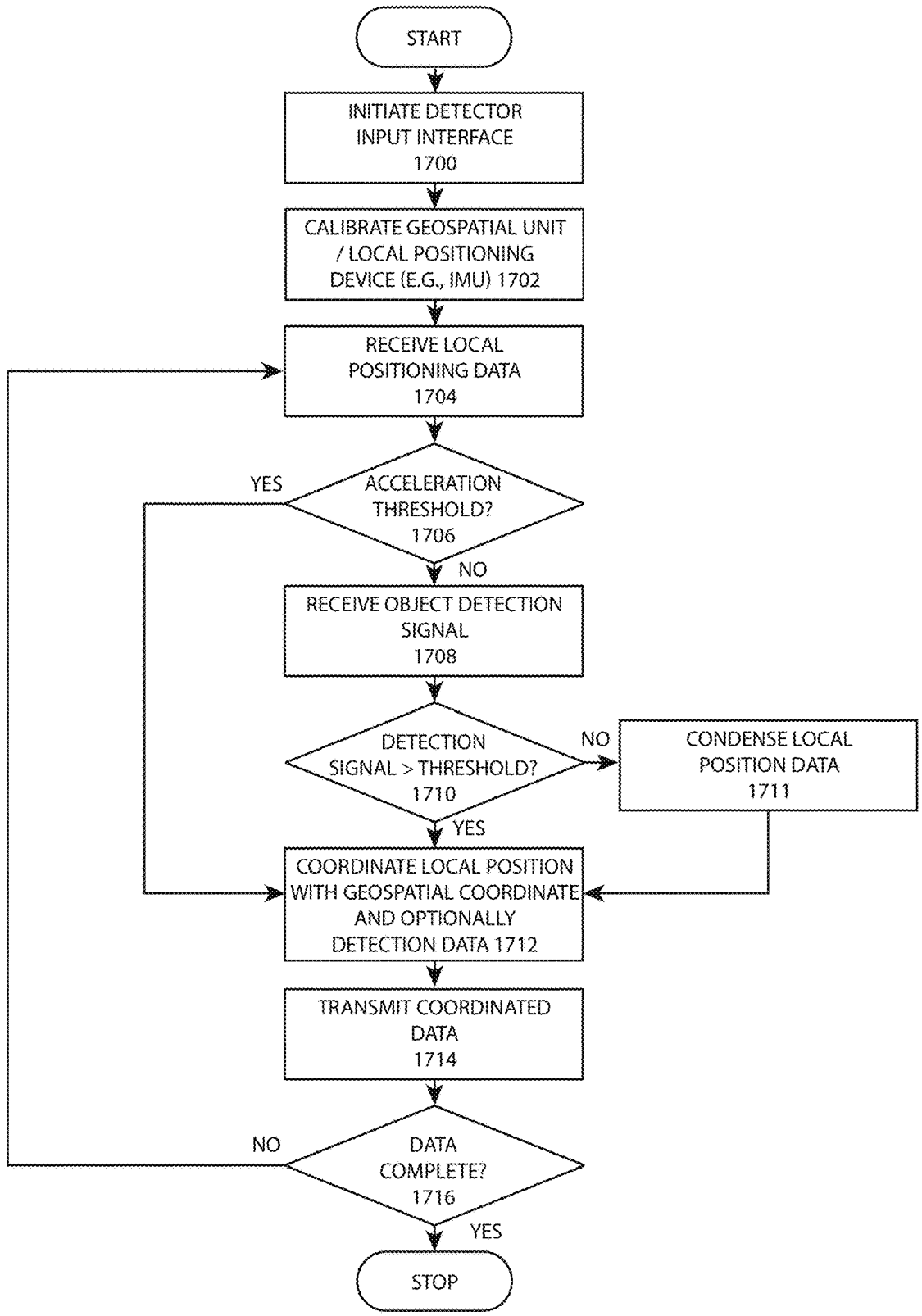
FIG. 17 illustrates a detector position process flow illustrating coverage tracking of the detector, including for example localized tracking relative to the geolocation unit to greatly increase precision of search coverage data, according to one or more embodiments.

FIG. 17 illustrates a detector position process flow 1750, according to one or more embodiments. Operation 1700 initiates a detector input interface (e.g., the detector interface 212). In one or more embodiments, the detector 102 may be a position detector 103. In one or more embodiments the detector 102 and the geolocation unit 200 (and/or support device 400) may communicate through Bluetooth® or another wireless network protocol.

Operation 1702 calibrates the geolocation unit 200 and a local positioning device, for example the position detector 103, such as an accelerometer and/or an inertial measurement unit. As one example, a point on the detector 102 may be placed on, touched to, or otherwise placed in reference to a control point having a fixed association with the geolocation unit 200. For example a survey control pin and/or NOAA benchmark may be utilized. In one or more other embodiments, one or more emitter-detector pairs for visible light, infrared or other electromagnetic radiation may be utilized to detect a location the detector 102 relative to the geolocation unit 200, where an IMU may optionally maintain a local position during any loss of visibility between emitter and detector and/or emitter-reflector-detector.

Operation 1704 may receive a local positioning data, for example from the local positioning device. The local positioning data may be in an appropriate coordinate system as will be evident to one skilled in the art, including 2D and/or 3D coordinates relative to the geolocation unit 200. Operation 1706 may determine whether an acceleration is greater than a threshold value, which may indicate a change in direction of the detector 102. Where the threshold is exceeded, operation 1706 may proceed to operation 1712. Where the threshold is not exceeded, operation 1706 may proceed to operation 1708, which may receive a detection signal (e.g., the detection signal 170). The detection signal 170 may be, for example, a wave form from a magnetometer, a video stream to be input into a machine learning and/or AI image recognition system, a digitized count of detection events from a Geiger counter, etc.

Operation 1710 determines whether the detection signal 170 is greater than a detection threshold. Where it is not greater than the detection threshold, operation 1710 may proceed to operation 1711, which may optionally condense local position data. Condensed local position data may reduce local position data to one or a few values describing the relative position of the detector 102, which may then be paired with a geospatial coordinate 110 in operation 1712, as described below. Where the detection signal is above the threshold, operation 1710 may proceed to operation 1712.

Operation 1712 coordinates a local position (e.g., as received in the local positioning data) with a geospatial coordinate (e.g., generated by the geolocation unit 200), and optionally a detection signal 170 and/or data of a detection signal 170. For example, the geospatial coordinate 110 may be stored in association with the detector position data 181, and/or the detection data 171 as shown and described in conjunction with FIG. 2. A reduced detection data 172 may also be stored, for example reducing a complex waveform to a strength level, a positive or negative detection value, a fast Fourier transform isolating one or more frequencies, etc. Operation 1714 transmits the coordinated data (e.g., any of the coordinated data in operation 1712), for example from the geolocation unit 200 and/or the support device 400 to the coordination device 300 and/or the server 500. Operation 1716 determines if data collection is complete. If more data is to be received, operation 1716 returns to operation 1704. If data collection is complete, operation 1716 may terminate.

FIG. 17 illustrates a volumetric coverage tracking view 1850, according to one or more embodiments. In one or more embodiments, a detector 102A (e.g., a magnetometer) may have an estimated coverage volume 1822, for example a hemisphere centered and/or offset form the detector 102 having a 0.5 meter radius (e.g., which may be the same or similar to the radius parameter 121). An inferred coverage volume 1826A may be determined by calculating surfaces connecting each estimated coverage volume 1822, and/or by offsetting the path 124A with a volumetric shape (e.g., a cylinder, a semi-circle extended into a third dimension along a direction of the path 124A, etc.).

In one or more embodiments, there may be different detectors 102, different parameters for the same detector 102, and/or different parameters for two or more different operators 100. In such case, the estimated coverage area 122 and/or estimated coverage volume 1822 may differ. In one or more embodiments, and as illustrated in FIG. 18, the estimated coverage volume 1822B of a detector 102B may be a cylinder, where each cylinder may be connected through surfaces to form the inferred coverage volume 1826B.

To further illustrate, in the present example the detector 102A may be a handheld magnetometer, and the detector 102B may be ground penetrating radar on a vehicle such as an MRAP or boat, with the cylinder extending two to four meters below the ground or water.

In one or more embodiments, gap detection, transect deviation, and other geospatial data quality determinations may be made by comparing coverage of varying detectors 102. For example, gaps may be determined both on the surface (e.g., comparison of the circle representing the top surface of the cylinder and the circle representing the top surface of the hemisphere), and/or volumetrically, for example through calculation and/or comparison of geometric solids in virtual space and/or approximations simplified for data analysis and computational efficiency purposes.

FIG. 18 additionally illustrates a configuration overlay 1800 which may specify configuration parameters for a sub-area of the geospatial area 106. The configuration overlay 1800 may be specified as a layer of the area map 318, according to one or more embodiments. The configuration overlay 1800 may, for example, specify any data quality requirements or regulations, for example velocity thresholds, gap detection thresholds, transect deviation, a type of required and/or a priority designation for primary position signal 150 and/or correction signal 160. As just one example, a type of required network connection, and/or a priority designation for network connection (e.g., to the network 108 and/or a communication link thereof), sample rate, geospatial data attenuation requirements, and/or other operation parameters or requirements.

In the present example, the configuration overlay 1800 may represent an area of concern, for example an area with known hazardous instances of the object 104 in high concentration. The configuration overlay 1800 or portions thereof may be stored on one or more of the server 500, the support device 400, the coordination device 300, and/or on the geolocation unit 200. The Configuration overlay 1800 may specify a reduced radius parameter 121 (e.g., resulting in a reduced instance of the estimated coverage area 122 and a reduced instance of the estimated coverage volume 1822). The Configuration overlay 1800 may further specify a reduction in one or more velocity thresholds, requiring the operator 100 such as the user 101 to slow down (e.g., from 0.5 meters per second to 0.25 meters per second). A notification may be provided to the operator 100, for example on the support device 400, that the operator 100 has entered the sub-area designated with the configuration overlay 1800. Where the operator 100 is remotely controlled and/or autonomous (e.g., a UAV), the configuration overlay 1800 and associated data may be referenced to automatically adjust or limit the motion, data gathering mode, or other behavior of the operator 100.

Although throughout the present embodiments geometric shapes and geometric solids are illustrated which included delineations, it will be appreciated that they may be replaced with probability maps for estimated and/or inferred detection. For example, the estimated coverage area 122 and/or the estimated coverage volume 1822 may be a probability map, where gap and/or non-overlap detection results in a probability in which a non-detection occurred in an area or volume, and where the threshold for gap detection and/or non-overlap may be made upon a probability.

Although not shown, the geolocation unit 200 may include any aspects of the support device 400, for example the precision detection location engine 410, as further shown and described in FIG. 4. In such case, the detection position signal 180 may be further parsed and/or paired with geospatial coordinates 110 by the processor 201 of the geolocation unit 200.

Although the detector 102 is illustrated, the detector 102 can be omitted. For example, in one or more embodiments the "detector" may be the eyes of a user 101 who is inspecting or learning for objects 104 within the geospatial area 106. This may be appropriate, for example, where a user 101 is an inspector checking equipment wear and tear in a petroleum refinery, or a guard for a government facility patrolling a route. In one or more embodiments, it will be recognized that rather than an object 104, the devices, systems, and/or methods described herein may be utilized to recognize or detect a condition of an object 104 (e.g., a leaking underground pipe, an oxidizing equipment joint, a tree suffering from bark beetle infestation, etc.).

In one or more embodiments, it should be noted that the objects 104 need not be the same time of object 104 that is detectable by the same devices, systems, and/or methods. For example, in one or more embodiments, the geolocation unit 200 and/or the coordination device 300 may be used to track coverage for the search of evidence at a crime scene, where evidence gathered may include locations of interest that require photographing, collection of forensic evidence (e.g., hair, other sources of DNA), and other important evidentiary needs.

Although the present embodiments have been described with reference to specific example embodiments, it will be evident that various modifications and changes may be made to these embodiments without departing from the broader spirit and scope of the various embodiments. For example, the various devices, engines, agent, routines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., the detector 102, the geolocation unit 200, the coordination device 300, the support device 400, the server 500) Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable sub-combination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the geospatial tracking system 190 according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for tracking search coverage of a geospatial area, the method comprising:
communicatively coupling a coordination device to a first geolocation unit through a communication link;
wherein the coordination device comprising a display of the coordination device, a graphical user interface, and a memory storing an area map of the geospatial area,
wherein the first geolocation unit comprising a first signal receiver for determining a geospatial coordinate associated with a location of the first geolocation unit within the geospatial area,
initiating a geospatial database comprising a geospatial coordinate attribute, a geolocation unit ID attribute, and a timestamp attribute;
receiving the geospatial coordinate associated with the location of the first geolocation unit and a timestamp associated with generation of the geospatial coordinate associated with the location of the first geolocation unit;
recording the geospatial coordinate of the first geolocation unit in the geospatial database along with a geolocation unit ID and a first timestamp; and
overlaying in real time the geospatial coordinate of the first geolocation unit on the area map within the graphical user interface to provide instant feedback to an operator of the coordination device as to the location of the first geolocation unit within the geospatial area.

2. The method of claim 1, further comprising:
communicatively coupling the coordination device with a second geolocation unit;
reading a radius parameter and calculating a first radius around the geospatial coordinate of the first geolocation unit and a second radius around the geospatial coordinate of the second geolocation unit;
rendering the first radius around the geospatial coordinate of the first geolocation unit and the second radius around the geospatial coordinate of the second geolocation unit on the area map within the graphical user interface to provide the instant feedback to the operator of the coordination device as to overlapping coverage of the first geolocation unit with the second geolocation unit within the geospatial area;
determining that the first radius around the geospatial coordinate of the first geolocation unit and the second radius around the geospatial coordinate of the second geolocation unit overlap through at least one of (i) an adjacency designation, (ii) adjacent travel within the area over a threshold distance of adjacent travel, and (iii) adjacent positioning within the area for a threshold time;
determining a non-overlap in the first radius of the geospatial coordinate of the first geolocation unit and the second radius of the geospatial coordinate for at least one of a different threshold distance and a threshold area; and
generating a coverage alert on the graphical user interface of the coordination device and optionally designating a portion of the area map as uncovered on the graphical user interface of the coordination device.

3. The method of claim 2, further comprising:
recording two or more geospatial coordinates of the first geolocation unit in the geospatial database along with the geolocation unit ID and a second timestamp;
determining an elapse time between a first geospatial coordinate of the two or more geospatial coordinates and a second geospatial coordinate of the two or more geospatial coordinates;
calculating a distance between the first geospatial coordinate and the second geospatial coordinate;
determining an instantaneous velocity of the first geolocation unit;
determining an average velocity of the first geolocation unit over the first geospatial coordinate of the two or more geospatial coordinates and the second geospatial coordinate of the two or more geospatial coordinates;
determining the average velocity exceeds a velocity parameter; and generating a quality alert on the graphical user interface of the coordination device and optionally designating a different portion of the area map as inadequately covered on the graphical user interface.

4. The method of claim 3,
wherein the first signal receiver is a GPS received,
wherein the first geolocation unit coupled to a detector, and
wherein the detector is at least one of a magnetometer, a ground penetrating radar, an infrared sensor, an optical sensor, and a LIDAR sensor.

5. The method of claim 4, further comprising:
communicatively coupling a support device with at least one of the first geolocation unit and the coordination device;
associating a device ID of the first geolocation unit with a device ID of the support device; and
receiving a location of interest data from the support device comprising a third geospatial coordinate and optionally at least one of a text description generated by an operator of the support device and a photo data generated by the operator of the support device.

6. The method of claim 5,
wherein an accuracy of the first geospatial coordinate and the second geospatial coordinate is within 3 centimeters,
wherein the first geolocation unit includes a fastener for mounting to a human operator,
wherein the fastener for mounting to the human operator permits fastening to at least one of the back of the human operator, a vest of the human operator, a head of the human operator, and an extremity of the human operator,
wherein the first geolocation unit further includes a fastener for mounting to the detector,
wherein the two or more geospatial coordinates are stored in a velocity array receiving and removing data as first-in-last-out and the average velocity is calculated as a rolling average of each of the two or more geospatial coordinates stored in the velocity array,
wherein the first geospatial coordinate of the two or more geospatial coordinates is an initial coordinate in the velocity array and the second geospatial coordinate of the two or more geospatial coordinates is a final coordinate in the velocity array, and
wherein the communication link is a satellite communication link.

7. The method of claim 6, further comprising:
communicatively coupling a reference device to the first geolocation unit,
generating a correction data and transmitting the correction data to the first geolocation unit, and
adjusting the geospatial coordinate associated with the location of the first geolocation unit within the geospatial area with the correction data.

8. The method of claim 7, further comprising:
determining the first geospatial coordinate is greater than a threshold distance from a fourth geospatial coordinate of a transect vector data closest to the first geospatial coordinate;
generating a deviation alert;
wherein the deviation alert comprising a low audible tone on a speaker for deviation on a first side of a transect vector and a high audible tone on the speaker for deviation on a first side of the transect vector;

determining a loss of signal between any two of the first geolocation unit, the coordination device, the support device, and the reference device;
generating a signal alert;
determining a precision value associated with the first geospatial coordinate is below a threshold precision value; and
generating a precision alert,
wherein the geospatial database further comprising a precision field.

9. The method of claim 8, further comprising:
generating a path data from a set of geospatial coordinates generated by the first geolocation unit and plotting the path data on a digital image as a first image overlay;
generating a path data from a set of geospatial coordinates generated by the second geolocation unit on the digital image as a second image overlay; and
determining the non-overlap based on one or more uncovered pixels in the first image overlay and the second image overlay to decrease computational load associated with geospatial data.

10. The method of claim 9, further comprising:
stripping one or more leading digits in the third geospatial coordinate to reduce a data transmission size of the third geospatial coordinate generated by the first geolocation unit to an attenuated geospatial coordinate of the third geospatial coordinate;
comparing the third geospatial coordinate a reference coordinate of the geospatial area;
reconstituting the leading digits in the third geospatial coordinate and storing the third geospatial coordinate in the geospatial database;
stripping one or more leading digits in a fourth geospatial coordinate to an attenuated geospatial coordinate of the fourth geospatial coordinate;
determining a nonsequential jump in a leading digit of the attenuated geospatial coordinate of the third geospatial coordinate of the third geospatial coordinate compared to a leading digit of the attenuated geospatial coordinate of the third geospatial coordinate of the third geospatial coordinate compared to within at least one of a different threshold time and a threshold index number; and
reconstituting the leading digits in the fourth geospatial coordinate and storing the fourth geospatial coordinate in the geospatial database,
wherein the support device comprising a display of the support device and a graphical user interface of the support device, and
wherein the support device is at least one of a smartphone, a tablet, a laptop computer, and a wearable device.

11. A device for tracking search coverage of a geospatial area, the comprising:
a housing;
a first signal receiver for determining a geospatial coordinate associated with a location of the device within the geospatial area;
a first wireless network interface controller;
a processor communicatively coupled to the first wireless network interface controller;
a memory communicatively coupled to the processor, the memory storing computer readable instructions that when executed:
receive the geospatial coordinate from the first signal receiver, generate a timestamp and a device ID, and retransmit the geospatial coordinate, the timestamp, and the device ID through the first wireless network interface controller; and a power source electrically coupled to the first signal receiver, the first wireless network interface controller, the processor, and the memory.

12. The device of claim 11, wherein a correction data is received through a correction signal on the first signal receiver, and the device further comprising:

a second signal receiver, wherein a correction signal coordination routine comprising computer readable instructions that when executed:

determine the correction signal is at least one of below a threshold for a signal strength of the correction signal, a intermittent connectivity, and a correction precision, and switch to at least one of a second correction signal and the second signal receiver, wherein the second signal receiver is at least one of an L-band receiver, a GPS receiver, and a cellular receiver; and a second wireless network interface controller, wherein a position signal coordination routine comprising computer readable instructions that when executed:

determine at least one of a signal strength of the first communication link, and a connectivity of the first communication link is below a threshold value, and switch to a second wireless network interface controller.

13. The device of claim 12, further comprising:

a coordinate attenuator stored on the memory comprising computer readable instructions that when executed strip one or more leading digits in the geospatial coordinate to reduce a data transmission size to an attenuated geospatial coordinate of the third geospatial coordinate and boost at least one of sampling rate and resolution over at least one of the first communication link and the second communication link, wherein the one or more leading digits comprise at least one of: (i) all digits great than a $\frac{1}{10}°$ latitude value or longitude value; and (ii) all digits greater than a 1000 meter northing value or easting value.

14. The device of claim 13, further comprising:

a detector interface for receiving at least one of an accelerometer signal and a detection signal, wherein the detector interface comprising a third wireless interface controller configured for wireless communication with a detector; and a fastener for mounting to a human operator, wherein the fastener permits fastening to at least one of the back of the human operator, a vest of the human operator, a head of the human operator, and an extremity of the human operator, wherein the first signal receiver is at least one of the GPS receiver and a different GPS receiver generating a NMEA data string comprising the geospatial coordinate and the coordinate attenuator reduces at least a decimal minutes to a sixth digit of accuracy.

15. A system for tracking search coverage of a geospatial area, the comprising:

a first geolocation unit, comprising:

a housing of the first geolocation unit, a first signal receiver of the first geolocation unit for determining a geospatial coordinate associated with a location of the first geolocation unit within the geospatial area, a wireless network interface controller of the first geolocation unit, a processor of the first geolocation unit configured to:
transmit the geospatial coordinate, a timestamp, and a device ID; and a coordination device communicatively coupled to the first geolocation unit through the wireless network interface controller of the first geolocation unit and configured to receive the geospatial coordinate, the timestamp, and the device ID, the tracking coordination device comprising:

a housing of the coordination device, a wireless network interface controller of the coordination device, a display of the coordination device, a graphical user interface, a processor of the coordination device, and a memory of the coordination device comprising:

the graphical user interface;

an area map of the geospatial area;

a geospatial database comprising a geospatial coordinate attribute, a geolocation unit ID attribute, and a timestamp attribute;

coordinate intake module comprising computer readable instructions that when executed receive the geospatial coordinate associated with the location of the first geolocation unit and a different timestamp associated with generation of the geospatial coordinate associated with the location of the first geolocation unit;

a coordinate recording module comprising computer readable instructions that when executed record the geospatial coordinate of the first geolocation unit in the geospatial database along with a geolocation unit ID and a first timestamp; and a coverage plotting routine comprising computer readable instructions that when executed overlay in real time the geospatial coordinate of the first geolocation unit on the area map within the graphical user interface to provide instant feedback to an operator of the coordination device as to the location of the first geolocation unit within the geospatial area.

16. The system of claim 15, wherein the memory of the coordination device further comprising:

a velocity evaluation routine comprising computer readable instructions that when executed:

record two or more geospatial coordinates of the first geolocation unit in the geospatial database along with the geolocation unit ID and a second timestamp;

determine an elapse time between a first geospatial coordinate of the two or more geospatial coordinates and a second geospatial coordinate of the two or more geospatial coordinates;

calculate a distance between the first geospatial coordinate and the second geospatial coordinate;

determine an instantaneous velocity of the first geolocation unit; and determine an average velocity of the first geolocation unit over the first geospatial coordinate of the two or more geospatial coordinates and the second geospatial coordinate of the two or more geospatial coordinates, and
a velocity warning subroutine comprising computer readable instructions that when executed:
determine the average velocity exceeds a velocity parameter; and
generate a quality alert on the graphical user interface of the coordination device and optionally designating a portion of the area map as inadequately covered on the graphical user interface.

17. The system of claim 16, further comprising:
a second geolocation unit, comprising:
a first signal receiver of the second geolocation unit for determining a geospatial coordinate associated with a location of the second geolocation unit within the geospatial area,
wherein the first geolocation unit at least one of comprises and is coupled to a first visual identifier for identifying an operator of the first geolocation unit and the second geolocation unit at least one of comprises and is coupled to a second visual identifier for identifying an operator of the second geolocation unit,
wherein the first visual identifier and the second visual identifier are visible at a distance of at least 100 feet with 20/20 vision,
wherein the coordination device further comprising a field rendering module associating the first visual identifier with a graphical overlay of the first geospatial coordinate on the area map and the second visual identifier with the second geospatial coordinate of the second geolocation unit, and
wherein the first visual identifier is a first color coordinated with an overlay color of the first geospatial coordinate on the area map.

18. The system of claim 17, wherein the memory of the coordination device further comprising:
radius detection subroutine comprising computer readable instructions that when executed read a radius parameter and calculate a first radius around the geospatial coordinate of the first geolocation unit and a second radius around the geospatial coordinate of the second geolocation unit;
point buffer subroutine comprising computer readable instructions that when executed render the first radius around the geospatial coordinate of the first geolocation unit and the second radius around the geospatial coordinate of the second geolocation unit on the area map within the graphical user interface to provide the instant feedback to the operator of the coordination device as to overlapping coverage of the first geolocation unit with the second geolocation unit within the geospatial area;
adjacency determination subroutine comprising computer readable instructions that when executed determine that the first radius around the geospatial coordinate of the first geolocation unit and the second radius around the geospatial coordinate of the second geolocation unit overlap through at least one of (i) an adjacency designation, (ii) adjacent travel within the area over a threshold distance, and (iii) adjacent positioning within the area for a threshold time;
overlap evaluation routine comprising computer readable instructions that when executed determine a non-overlap in the first radius of the geospatial coordinate of the first geolocation unit and the second radius of the geospatial coordinate for at least one of a different threshold distance and a threshold area; and
overlap warning subroutine comprising computer readable instructions that when executed generate a coverage alert on the graphical user interface of the coordination device and optionally designating a different portion of the area map as uncovered on the graphical user interface of the coordination device.

19. The system of claim 18, further comprising:
a reference device comprising:
a signal receiver of the reference device,
a processor of the reference device,
a wireless network interface controller of the reference device,
a memory of the reference device storing computer readable instructions that when executed:
generate a correction data and,
transmit the correction data to the first geolocation unit, and
wherein the first geolocation unit further comprising a correction routine comprising computer readable instructions that when executed adjust the geospatial coordinate associated with the location of the first geolocation unit within the geospatial area with the correction data.

20. The system of claim 19, further comprising:
a support device communicatively coupled to at least one of the first geolocation unit and the coordination device, the support device comprising:
a display of the support device,
a graphical user interface of the support device,
a processor of the support device, and
a location marking routine comprising computer readable instructions that when executed generate a location of interest data from the support device comprising the second geospatial coordinate and optionally at least one of a text description generated by an operator of the support device and a photo data generated by the operator of the support device,
wherein the support device is at least one of a smartphone, a tablet, a laptop computer, and a wearable device; and
wherein the coordination device further comprising:
path buffer subroutine comprising computer readable instructions that when executed:
generate a path data from a set of geospatial coordinates generated by the first geolocation unit and plotting the path data from the set of geospatial coordinates generated by the first geolocation unit on a digital image as a first image overlay, and
generate a path data from a set of geospatial coordinates generated by the second geolocation unit on the digital image as a second image overlay; and
graphical adjacency subroutine comprising computer readable instructions when executed determine the non-overlap based on one or more uncovered pixels in the first image overlay and the second image overlay to decrease computational load associated with geospatial data,
wherein the first geolocation unit further comprising a coordinate attenuator stored on the memory comprising computer readable instructions that when executed strip one or more leading digits in the geospatial coordinate to reduce a data transmission size to an attenuated geospatial coordinate of the third geospatial coordinate and boost at least one of sampling rate and resolution over at least one of the first communication link and the second communication link;

wherein the memory of the coordination device further comprising:

an attenuation zone detection subroutine comprising computer readable instructions that when executed determine a nonsequential jump in a leading digit of the attenuated geospatial coordinate compared to a leading digit of a previously generated attenuated geospatial coordinate occurring within at least one of a different threshold time and a threshold index number, and a coordinate reassembly subroutine comprising computer readable instructions that when executed reconstitute the leading digits in the geospatial coordinate and store the geospatial coordinate in the geospatial database.

* * * * *